United States Patent [19]

Notarianni et al.

[11] Patent Number: 5,461,717
[45] Date of Patent: Oct. 24, 1995

[54] APPARATUS FOR TRANSFERRING DATA BETWEEN A HOST DEVICE AND PORTABLE COMPUTERS OF VARIOUS SIZES AND FOR RECHARGING THE BATTERIES OF SAME

[75] Inventors: John Notarianni, Massapequa; Jerry Cohen, Plainview; John P. D'Ambrosio, Bayport, all of N.Y.

[73] Assignee: Cad Forms Technology Inc., Farmingdale, N.Y.

[21] Appl. No.: 901,431

[22] Filed: Jun. 19, 1992

Related U.S. Application Data

[63] Continuation-in-part of Ser. No. 718,358, Jun. 21, 1991, Pat. No. 5,301,346.

[51] Int. Cl.[6] .................................................. G06F 13/00
[52] U.S. Cl. ..................... 395/200; 395/750; 364/DIG. 1; 364/550; 361/727; 361/731
[58] Field of Search ..................................... 361/724, 727, 361/728–731; 395/800, 750, 200, 500

[56] References Cited

U.S. PATENT DOCUMENTS

| | | | |
|---|---|---|---|
| 2,880,379 | 3/1959 | Stoddart et al. | 361/724 |
| 2,895,087 | 7/1959 | Lieb et al. | 361/724 |
| 3,014,160 | 12/1961 | Brogden | 361/727 |
| 3,048,747 | 8/1962 | Errichiello | 361/730 |
| 3,184,647 | 5/1965 | Godley | 361/727 |
| 4,143,417 | 3/1979 | Wald et al. . | |
| 4,553,081 | 11/1985 | Koenck . | |
| 4,555,523 | 6/1984 | Koenck . | |
| 4,709,202 | 11/1987 | Koenck . | |
| 4,716,498 | 12/1987 | Ellis . | |
| 4,737,702 | 4/1988 | Koenck . | |
| 4,742,477 | 5/1988 | Phillips et al. | 361/737 |
| 4,754,397 | 6/1988 | Varaiya et al. . | |
| 4,775,931 | 10/1988 | Dickie et al. . | |
| 4,835,372 | 5/1989 | Gombrich et al. . | |
| 4,866,646 | 9/1989 | Nakamura et al. . | |
| 4,885,523 | 12/1989 | Koenck . | |
| 4,939,622 | 7/1990 | Weiss et al. | 361/727 |
| 4,953,113 | 8/1990 | Chadima, Jr. et al. . | |
| 4,971,563 | 11/1990 | Wells, III | 439/61 |
| 5,052,031 | 10/1991 | Davis . | |
| 5,063,600 | 11/1991 | Norwood . | |
| 5,067,573 | 11/1991 | Uchida . | |
| 5,150,031 | 9/1992 | James et al. . | |
| 5,195,183 | 3/1993 | Miller et al. . | |
| 5,202,817 | 4/1993 | Koenck et al. . | |

OTHER PUBLICATIONS

Wolfe, Ron, "VXI Bus Instrumentation," pp. 321–324, 1988.

*Primary Examiner*—William M. Treat
*Attorney, Agent, or Firm*—Hoffmann & Baron

[57] ABSTRACT

An electrical system for transferring data concurrently between pen based computers and a host computer includes a multiple computer receptacle device for receiving a plurality of pen based computers. The multiple computer receptacle device includes a housing, and a support frame mounted in the housing for supporting the plurality of pen based computers. The support frame includes a plurality of spaced apart parallel divider panels, where adjacent divider panels define between them a slot for receiving a respective pen based computer. The support frame includes a back panel mounted on the divider panels, a plurality of data input/output connectors mounted on the back panel, and a plurality of power connectors also mounted on the back panel. The data input/output connectors and the power connectors are positioned between adjacent divider panels and are adapted to mate with corresponding data and power connectors mounted on the pen based computers.

10 Claims, 43 Drawing Sheets

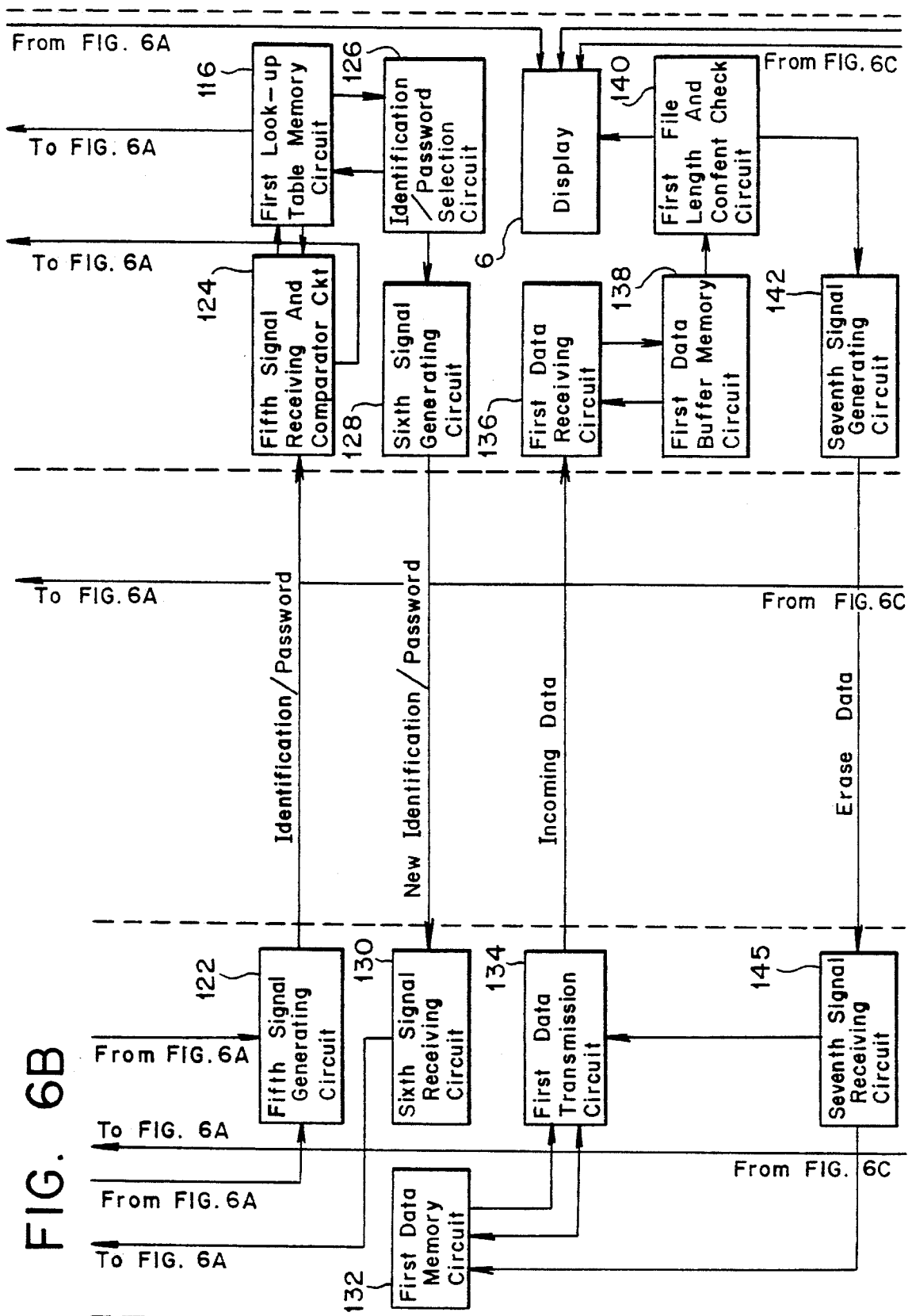

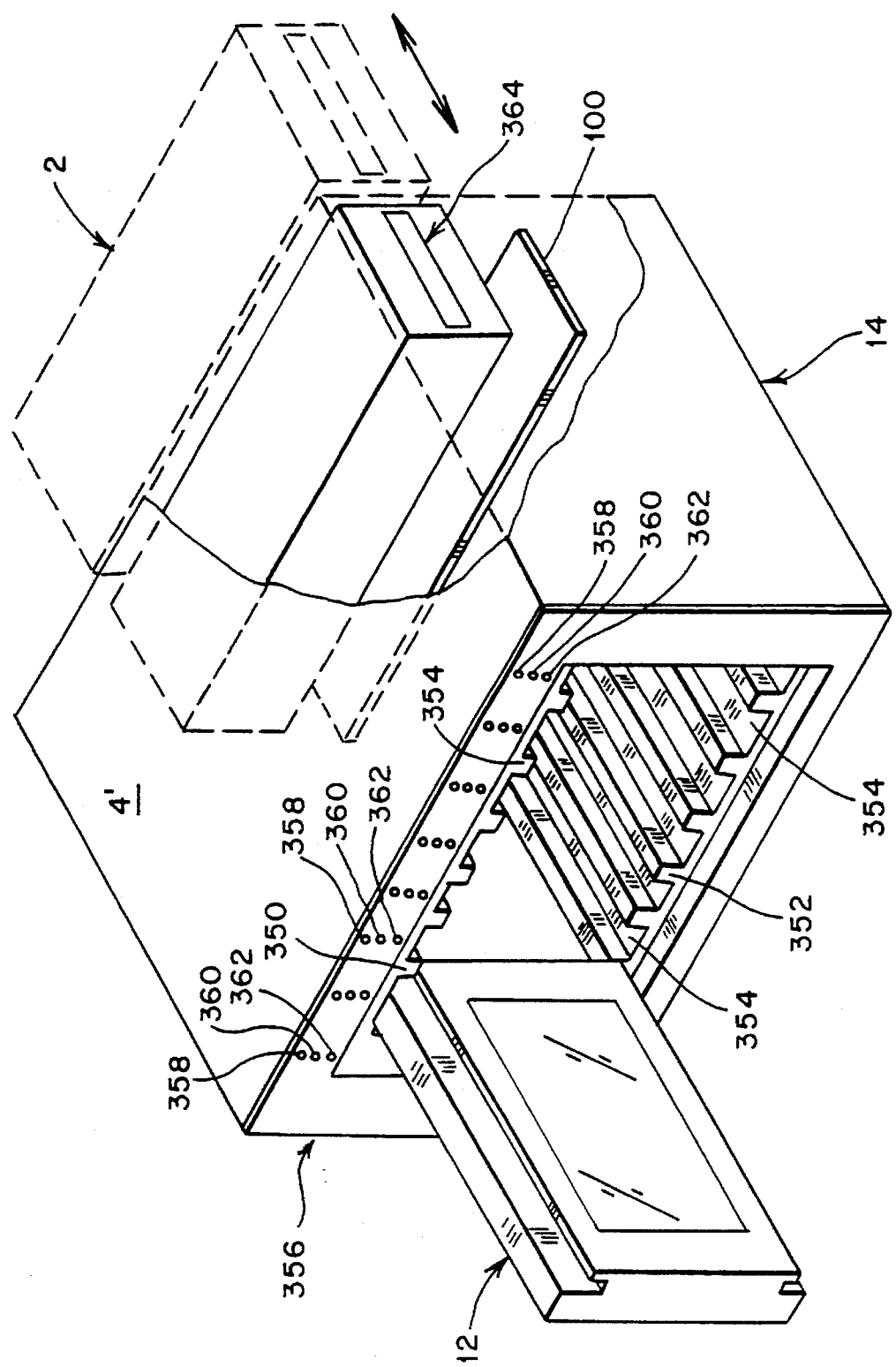

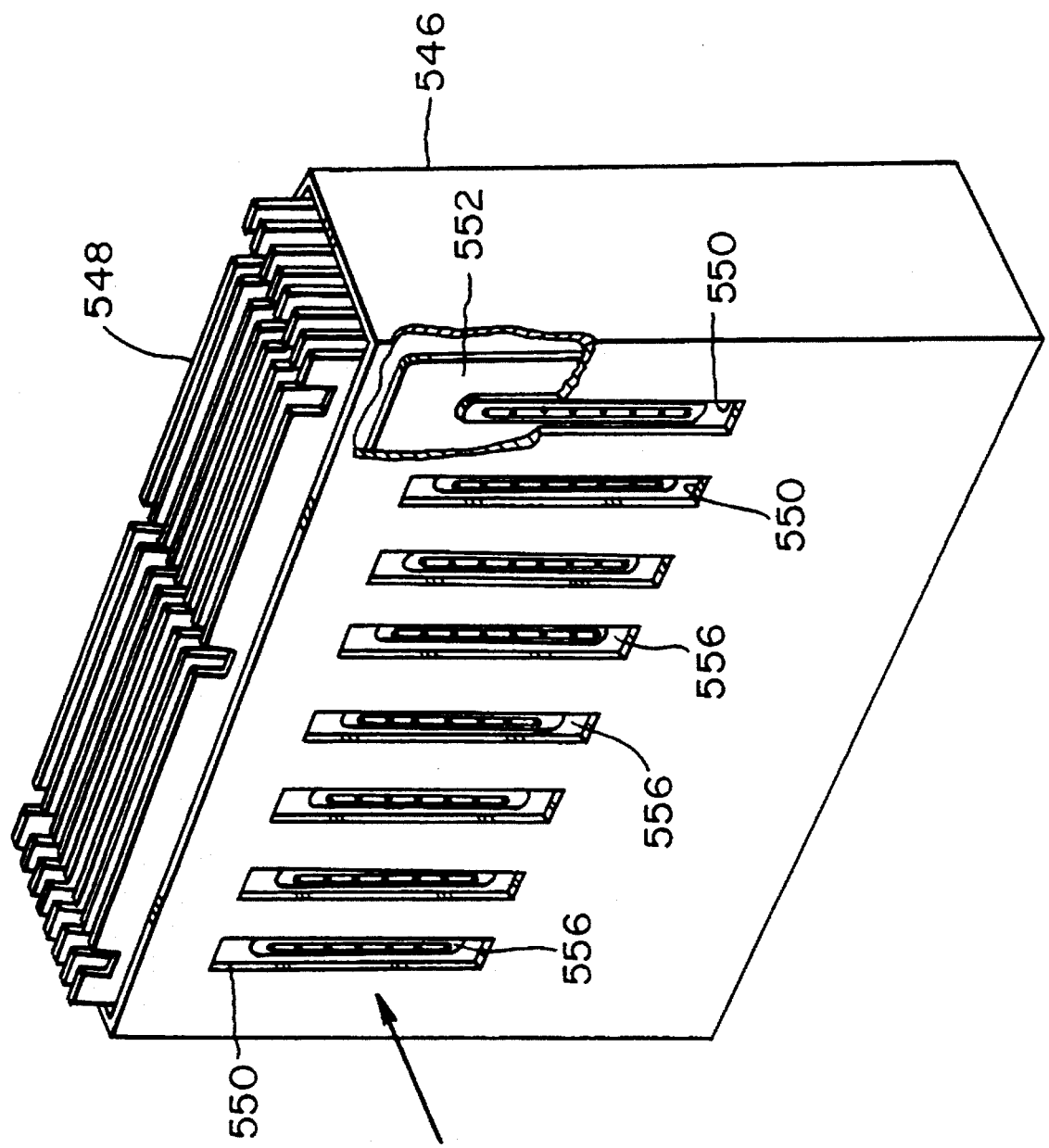
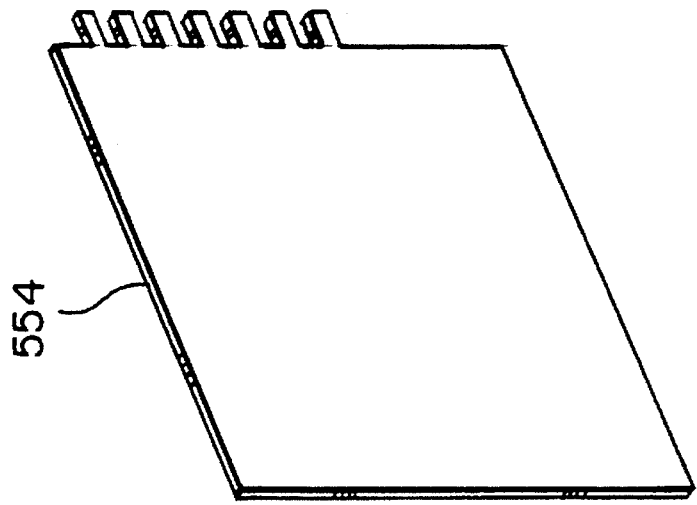
FIG. 18

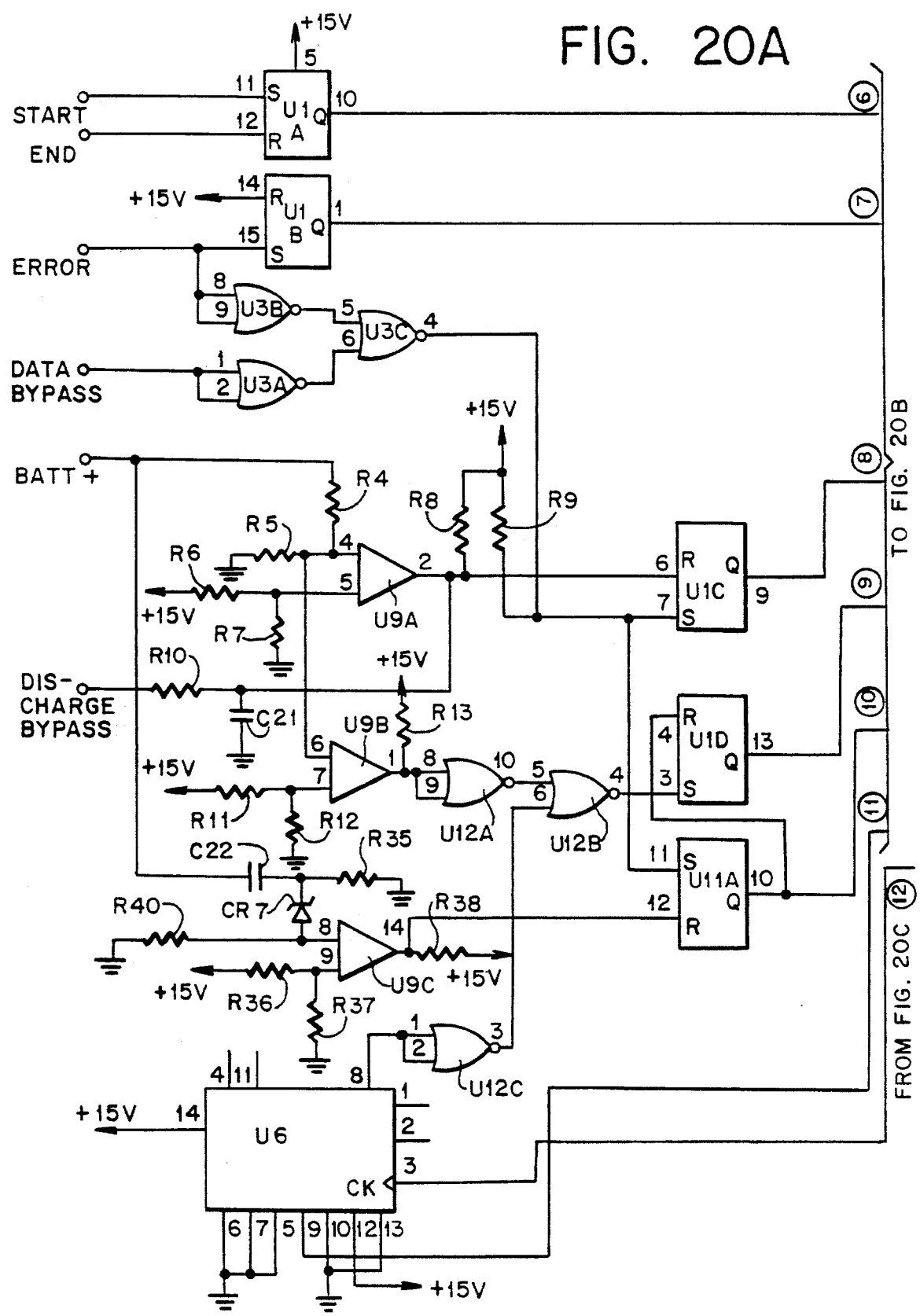

5,461,717

APPARATUS FOR TRANSFERRING DATA BETWEEN A HOST DEVICE AND PORTABLE COMPUTERS OF VARIOUS SIZES AND FOR RECHARGING THE BATTERIES OF SAME

CROSS REFERENCE TO RELATED APPLICATIONS

This application is a continuation-in-part of U.S. patent application Ser. No. 07/718,358, filed Jun. 21, 1991, now U.S. Pat. No. 5,301,346, which issued on Apr. 5, 1994.

BACKGROUND OF THE INVENTION

1. Field of the Invention

This invention relates to portable computers, and more particularly relates to circuitry which interfaces with portable computers. Even more specifically, this invention relates to a method and apparatus for concurrently transferring data between a host device and a plurality of pen based portable computers.

2. Description of the Prior Art

Pen based computers, which are commonly referred to as electronic clipboards, have become increasingly popular forms of portable computers. Such computers basically include a liquid crystal display and an integral tethered pen for hand-written input of information on the display. The pen based computer may be programmed to display a form or a chart with blanks provided for completion by the user who hand writes the information in the appropriate places on the form displayed. Such pen based computers are particularly adapted for use by non-technically trained personnel, as the user merely has to follow the form or instructions displayed on the computer. These pen based computers may be used by an electric utility, for example, by its meter readers, or may be used in a power plant or manufacturing facility, where gauges may have to be periodically monitored and their readings recorded.

The information inputted by the user to the pen based computer is retained in a memory or storage device in the computer until the data is transferred to a peripheral printer or main computer for analysis or display. The user, who is typically not technically trained, may find it difficult or not understand how to connect the pen based computer to the peripheral equipment or main computer and activate the main computer and pen based computer to output or "dump" the data. If an incorrect procedure is followed in transferring the data, some of the data may be irretrievably lost. Accordingly, either the user must be technically trained to carry out the procedure, or a computer operator must become involved in the data transferring operation.

Furthermore, such data transfer operation usually occurs on an individual basis. That is, only a single pen based computer is connected to the main computer at a time. This, of course, may cause the data transfer operation to take a considerable amount of time, especially when a plurality of pen based computers need to have their data transferred to the main computer.

Similarly, charging the batteries in the pen based computers and transferring data into the pen based computers from the main computer is done on an individual basis, one computer at a time.

OBJECTS AND SUMMARY OF THE INVENTION

It is an object of the invention to provide a method and apparatus for transferring data concurrently from a plurality of portable computers.

It is another object of the present invention to provide apparatus for receiving a plurality of pen based computers and for transferring data between a main computer and the pen based computers.

It is a further object of the present invention to provide apparatus for holding a plurality of portable computers and for automatically attending to housekeeping functions with respect to the portable computers, such as file management, and charging the batteries of the portable computers or loading data into the portable computers.

It is still a further object of the present invention to provide a method and apparatus for transferring data concurrently from a plurality of portable computers and for checking the data transferred from the computers for accuracy.

It is yet another object of the present invention to provide an electrical system for transferring data signals concurrently between a host device and a plurality of pen based portable computers.

It is yet a further object of the present invention to provide apparatus for receiving a plurality of pen based computers which is modular in construction so that it is readily adaptable to accept different sized and electrically configured pen based computers of various manufacturers.

In one form of the present invention, apparatus (also referred to herein as a multiple computer receptacle device) for transferring data from a plurality of pen based computers includes a housing and a plurality of spaced apart parallel divider panels situated within the housing. Adjacent divider panels define between them a slot for receiving a respective pen based computer.

The apparatus further includes a back panel. The back panel is mounted in the housing and disposed transversely to the divider panels. A plurality of data input/output connectors are further included. The data connectors are floatingly mounted on the back panel and positioned between adjacent divider panels so as to be adapted to mate with corresponding data connectors mounted on the pen based computers.

The apparatus also includes a plurality of power connectors. The power connectors are floatingly mounted on the back panel and positioned between adjacent divider panels so as to be adapted to mate with corresponding power connectors mounted on the pen based computers.

In a preferred form of the invention, the apparatus for transferring data further includes a plurality of Teflon (TM) or Delrin (TM) guide brackets. Each of the guide brackets is situated adjacent to a divider panel within a respective slot defined by adjacent divider panels. The guide brackets engage an edge of the pen based computers to facilitate insertion of the pen based computers into respective receiving slots.

Also, the apparatus may include a plurality of anti-friction strip members. The anti-friction strip members are mounted on the divider panels. The strip members have a surface which is exposed within the computer receiving slot for engagement with a pen based computer situated in the slot.

In an alternative form of the invention, the apparatus may include top and bottom plates mounted in the housing. The plates have formed in them recesses to define channels for receiving the pen based computers.

In a further aspect of the present invention, an electrical system for transferring data concurrently between at least one pen based computer received by a multiple computer receptacle device and a main data gathering and dispatching circuit (also referred to herein as a host device) includes a first signal generator, the first signal generator being situated on the multiple computer receptacle device. The first signal generator provides a first signal indicating that at least one pen based computer is received by the multiple computer receptacle device. The multiple computer receptacle device defines a plurality of slots for receiving a plurality of pen based computers.

The electrical system further includes a second signal generator which is responsive to the first signal. The second signal generator is situated on the main data gathering and dispatching circuit and provides a second signal to the multiple computer receptacle device to determine which one of the slots of the multiple computer receptacle device has the pen based computer.

The electrical system further includes a first memory for storing a plurality of logic identification codes. The first memory is situated on the main data gathering and dispatching circuit and has stored therein a plurality of logic identification codes. Each identification code corresponds to one of the plurality of pen based computers.

The electrical system further includes a third signal generator. The third signal generator is situated on the main data gathering and dispatching circuit and provides a third signal to the multiple computer receptacle device. The third signal corresponds to at least one of the identification codes stored in the first memory.

A second memory is also included. The second memory is situated on the pen based computer and has stored therein a predetermined identification code which corresponds to the pen based computer.

A third signal receiver and comparator circuit is situated on the pen based computer. The receiver and comparator circuit receives the third signal and compares logic data corresponding to the third signal with the predetermined identification code stored in the second memory.

The pen based computer also includes a third memory for storing logic data inputted to the computer by a user of the computer. The third memory is situated on the computer. A transmitter is coupled to the third memory and transmits first data signals which correspond to the logic data stored in the third memory. The first data signals are transmitted to the main data gathering and dispatching circuit.

A receiver on the main data gathering and dispatching circuit receives the first data signals, and a fourth memory on the main data gathering and dispatching circuit stores the first data signals as logic data. Thus, this logic data represents information which the user of the pen based computer inputs to the computer. This data is accordingly transferred to the main data gathering and dispatching circuit, where it can be later displayed or utilized by the operator of the main data gathering and dispatching circuit.

Data can also be transferred from the main data gathering and dispatching circuit to the individual pen based computers received by the multiple computer receptacle device. For this purpose, a fifth memory is situated on the main data gathering and dispatching circuit for storing logic data inputted to the circuit by an operator of the circuit. The main data gathering and dispatching circuit further includes a transmitter for transmitting second data signals to the pen based computers and received by the multiple computer receptacle device, the second data signals corresponding to the logic data stored in the fifth memory.

The pen based computer includes a receiver for receiving the second data signals, and a sixth memory for storing logic data corresponding to the second data signals dispatched to the pen based computer by the main data gathering and dispatching circuit.

The electrical system further includes a keyboard which is coupled to the main data gathering and dispatching circuit so that data may be inputted to the dispatching circuit by an operator.

The first through sixth memories mentioned previously may be separate memories or may form portions or "slots" of single memory circuits respective to the pen based computers and the main data gathering and dispatching circuit. Furthermore, the individual components mentioned previously, such as the signal receivers, signal generators and memories, may be realized by circuitry existing on each pen based computer and programmed to perform that particular function described above. Each pen based computer contains a random access memory (RAM) or a RAM card having a RAM (random access memory) which may be programmed so that the pen based computers will perform the desired functions. Similarly, the main data gathering and dispatching circuit may be formed from individual components, such as the signal generators, signal receivers and memories described previously, or may be a host computer which is programmed to perform the functions described above.

In a preferred form of the invention, the electrical system for concurrently transferring data between the pen based computers and the main data gathering and dispatching circuit may include a charge and discharge circuit. The charge and discharge circuit is preferably mounted on the multiple computer receptacle device and is coupled to the power supply of each pen based computer received by the receptacle device. Since most pen based computers operate with nickel cadmium (Ni-Cad) batteries, it is well known to fully discharge the batteries before recharging them in order to prolong their life and cycle depth. The charge and discharge circuit of the present invention senses the charge remaining on the battery of each pen based computer received by the multiple computer receptacle device and, after the data transfer operation has been completed, automatically discharges the batteries of the pen based computers to a predetermined level and, subsequently, recharges the batteries to a second predetermined level so that the pen based computers will be ready for use.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 6A–6C is an alternative form of an electrical system of the present invention for transferring data concurrently between a main data gathering and dispatching circuit and a plurality of pen based computers.

FIG. 8 is a partially broken away, perspective view of an alternative form of a multiple computer receptacle device formed in accordance with the present invention.

FIG. 18 is a partially exploded view, in perspective, of a third portion of the multiple computer receptacle device shown in FIG. 15, and with the housing thereof partially broken away.

FIGS. 20A–E are a schematic diagram of portions of the electrical circuit shown in FIG. 19.

DETAILED DESCRIPTION OF THE PREFERRED EMBODIMENTS

Figure 1:
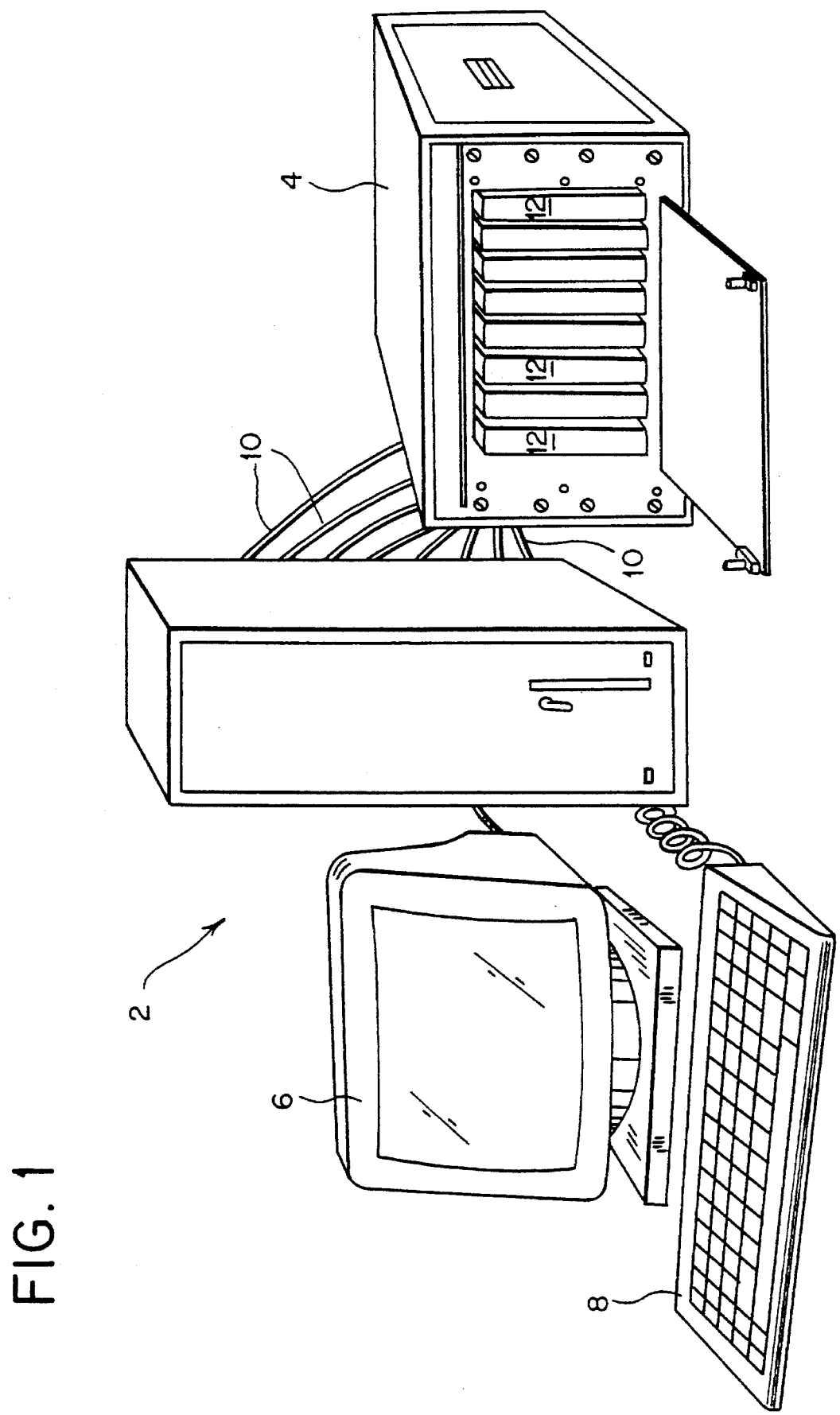
FIG. 1 is a perspective view of a system formed in accordance with the present invention for transferring data between a plurality of pen based computers and a host device or main data gathering and dispatching circuit.

The present invention allows a plurality of pen based computers to be electrically coupled to a host device such as a computer or a main data gathering and dispatching circuit so that the data stored in the memory of the pen based computers may be transferred concurrently to the host device rather than each pen based computer individually transferring its data to a host device. The present invention also allows data to be transferred to each of the pen based computers.

As an example of one application of the present invention, a utility may use the system and issue each of its meter readers one pen based portable computer. In performing their duties, the meter readers input data into the pen based computers regarding the electrical power or gas consumption of different residences or locations, which residence addresses are preprogrammed into the pen based computer. At the end of the day, the utility meter reader inserts his pen based computer into a multiple computer receptacle device, which will be described in greater detail. The multiple computer receptacle device is coupled to a host computer or main data gathering and dispatching circuit. After normal business hours, the system of the present invention will automatically transfer the data inputted by the meter readers to the pen based computers to the host computer or device. The host computer will also transfer data, such as a new list of residences to be checked for power consumption, to each pen based computer. The system of the present invention will also attend to housekeeping functions with regard to the pen based computers, such as recharging the nickel-cadmium batteries of the pen based computers.

The next morning, the meter readers will remove their pen based computers from the multiple computer receptacle device, each pen based computer having been reprogrammed with a new listing of residences to check for power consumption. The pen based computer batteries will also be recharged and ready for use.

Referring initially to FIGS. 1–4 of the drawings, it can be seen that the electrical system of the present invention includes a main data gathering and dispatching circuit 2 in the preferred form of a host computer, and a multiple computer receptacle device 4 coupled to the host computer 2. The host computer 2 preferably includes a display 6 and a keyboard 8 for entering data into the host computer by an operator. The host computer 2 is coupled to the multiple computer receptacle device 4 through a plurality of data signal cables 10.

Figure 3:
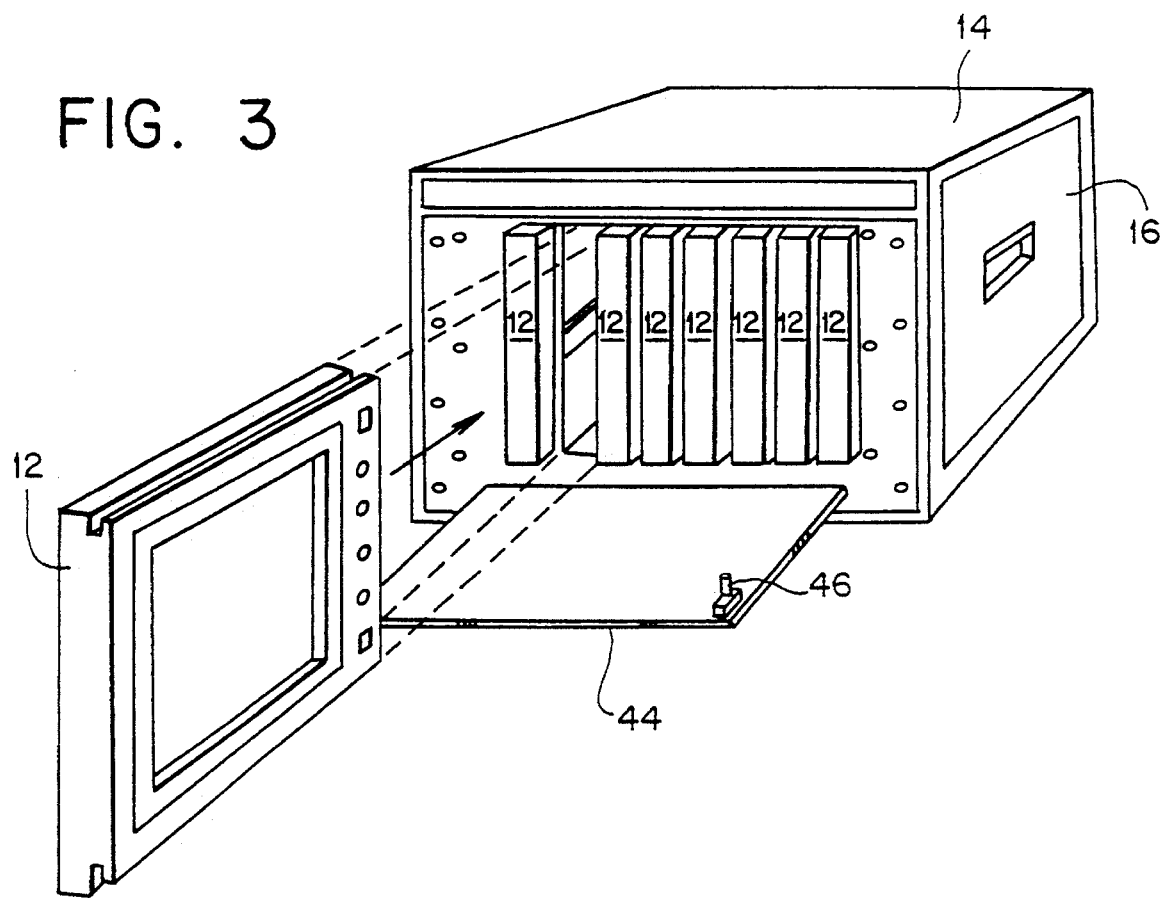
FIG. 3 is a front perspective view of the multiple computer receptacle device shown in FIG. 2 and illustrating the insertion of pen based computers into the receptacle device.
Figure 4:
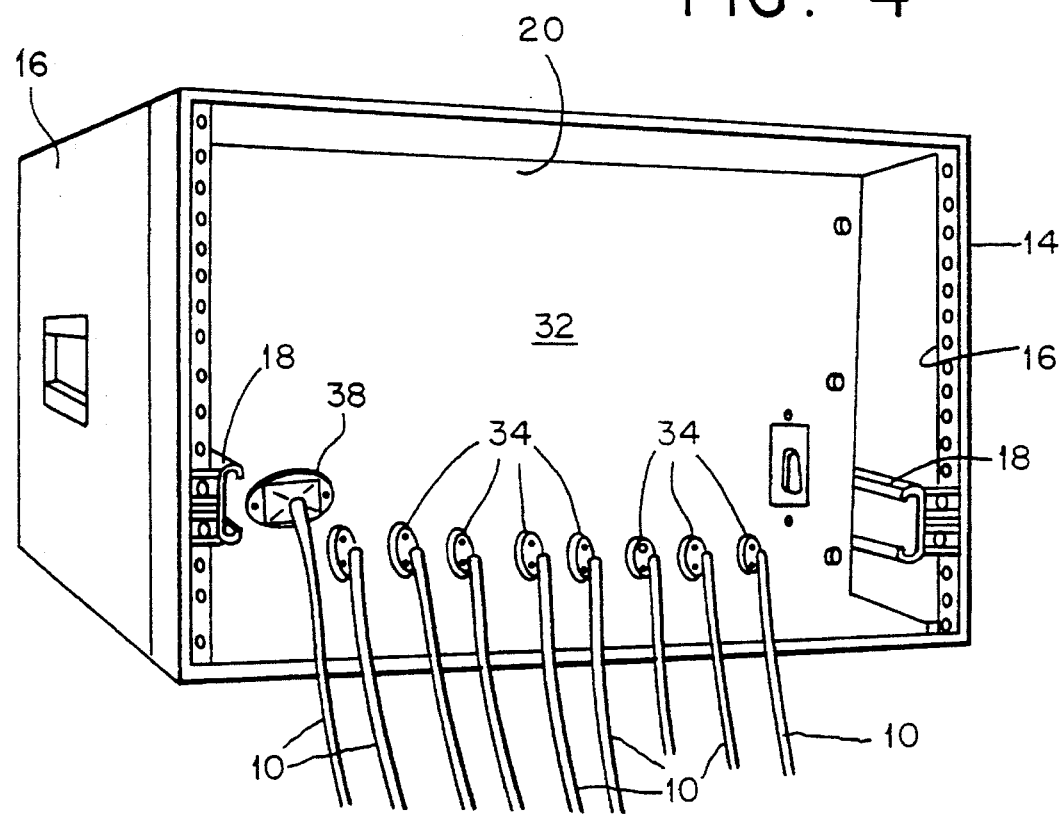
FIG. 4 is a rear perspective view of the multiple computer receptacle device shown in FIG. 2.

A plurality of pen based computers 12 are received by the multiple computer receptacle device 4. A typical pen based computer 12 is illustrated by FIG. 3. The pen based computer typically includes an integral tethered pen (not shown) for handwriting input. A suitable pen based computer which may be used with the electrical system of the present invention is a Grid Pad (TM) computer manufactured by Grid Systems Corporation in Fremont, Calif.

The multiple computer receptacle device 4 basically includes a housing 14 having opposite side walls 16 on which are mounted slide brackets 18. A chassis or support frame 20 for the pen based computers is mounted on the slide brackets 18 within the housing. The support frame 20 may be slidably removed from the housing 14 to allow access to the circuitry and connectors mounted on the frame, as will be explained.

The support frame 20 includes a plurality of spaced apart parallel divider panels 22. Adjacent divider panels 22 define between them a slot 24 for receiving a respective pen based computer 12. An inner back panel 26 is mounted to the rear edges of the divider panels 22 and is disposed transversely to the divider panels. The inner back panel 26 includes a plurality of data input/output connectors 28. The input/output connectors 28 are mounted on the inner back panel with a floating mount and positioned between adjacent divider panels 22 so that they are adapted to mate with a corresponding data connector mounted on the pen based computers received by the slots 24 of the multiple computer receptacle device.

Also, a plurality of power connectors 30 are mounted on the inner back panel 26 using a floating mount. The power connectors 30 are also positioned between adjacent divider panels 22 so as to be adapted to mate with a corresponding power connector mounted on each pen based computer.

The support frame 20 of the multiple computer receptacle device further includes an outer back panel 32 which is spaced apart and parallel to the inner back panel 26. The outer back panel 32 includes a plurality of connectors 34 which are electrically coupled to the corresponding data connectors 28 mounted on the inner back panel 26 and which further include cables 10 which are coupled to the host computer 2 or main data gathering and dispatching circuit, as will be described. An AC line voltage power connector 38 is also mounted on the outer back panel 32 of the support frame. AC power is provided to the multiple computer receptacle device to power the electronic circuitry mounted on the device, as will be explained. The electronic circuitry is preferably disposed in the spacing between the inner and outer back panels 26, 32.

A plurality of Teflon (TM) or Delrin (TM) guide brackets 40 are preferably mounted in the slots 24 which receive the pen based computers. More specifically, each of the guide brackets 40 is mounted on a divider panel 22 within a respective slot. The guide brackets 40 are preferably L-shaped in cross section, and include an exposed surface which engages an edge of the pen based computers to facilitate insertion of the pen based computers 12 into respective receiving slots.

A plurality of anti-friction strip members 42 are also preferably included. The anti-friction strip members 42 are mounted on the divider panels 22 and include an exposed surface within the pen based computer receiving slot 24 in which they are mounted for engagement with a pen based computer situated in the slot. The anti-friction strip members 42 also facilitate the insertion of the pen based computers into their respective receiving slots in the multiple computer receptacle device and, like brackets 40, may also be formed from a Teflon (TM) or Delrin (TM) material.

In a preferred form, the multiple computer receptacle device 4 also includes a transparent dust cover 44 which is mounted on the support frame 20 by hinges (not shown) and pivotable to cover and uncover the open ends of the receiving slots 24. A latch or other mechanism 46 may be mounted on the dust cover 44 and engageable with a surface of the support frame 20 to ensure that the dust cover remains in the closed position covering the slots 24 and the pen based computers 12 mounted in the multiple computer receptacle device.

Figure 2:
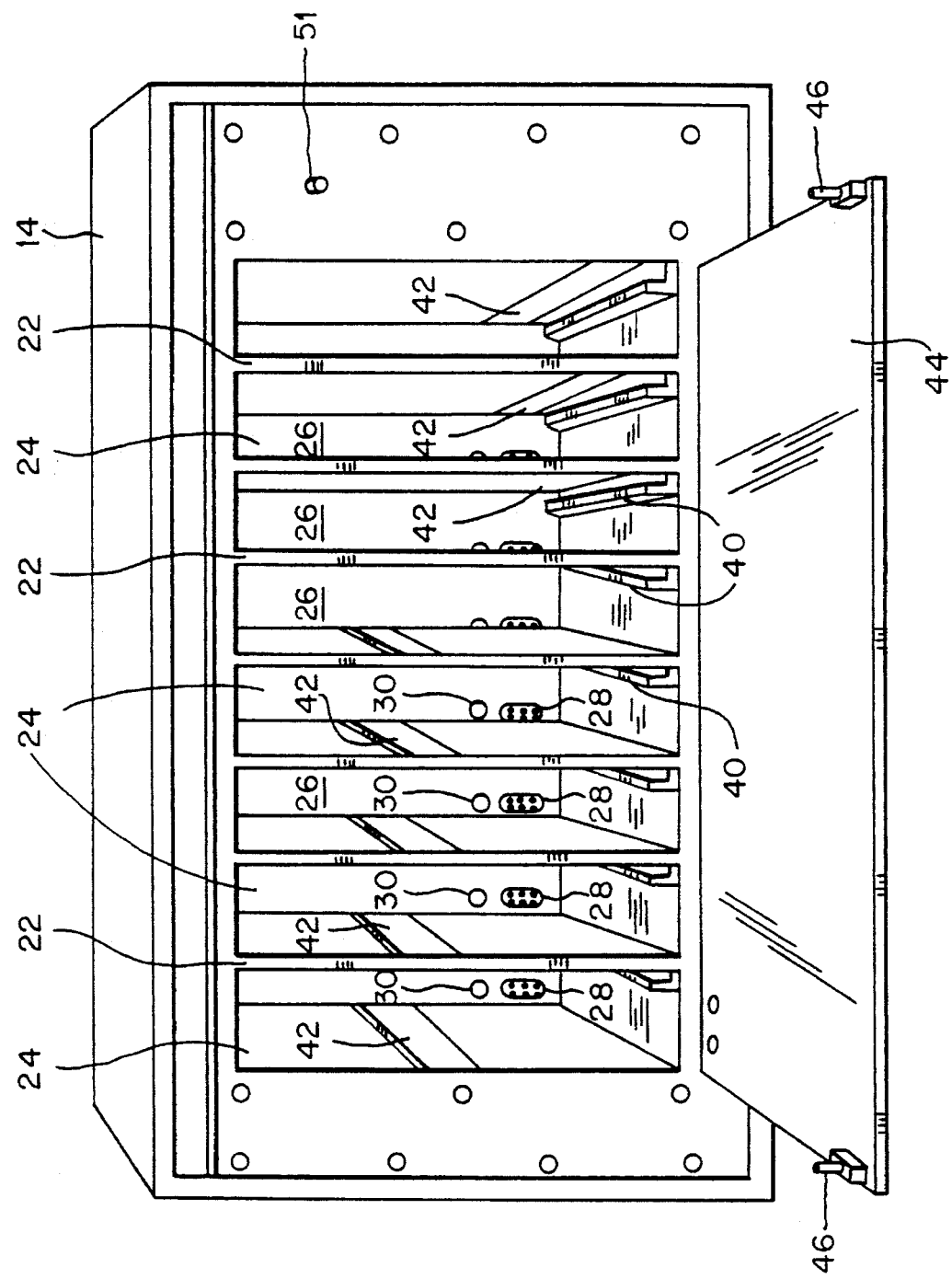
FIG. 2 is a front perspective view of a multiple computer receptacle device formed in accordance with the present invention.

The multiple computer receptacle device 4 illustrated by FIGS. 2 and 3 of the drawings is designed to accept eight pen based computers 12. However, it is envisioned to be within the scope of the invention to construct a multiple rack-type housing having a plurality of sliding brackets, which housing is adapted to receive a number of computer support frames, as described, in a vertical arrangement. Accordingly, a multiple computer receptacle device may be constructed to accept 32 pen based computers, for example, in four vertical sections (such as device 386 shown in FIG. 10), and such a device may be expandable to accept additional pen based computers as demand requires.

An electrical system for transferring data concurrently from a plurality of pen based computers 12 to a host device or a main data gathering and dispatching circuit 2 will now be described. One form of the electrical system is illustrated by the block diagram of FIG. 5. The basic system includes a main data gathering and dispatching circuit 2 (or, alternatively, a host computer), the multiple computer receptacle device 4, as previously described, and the pen based computers 12. The main data gathering and dispatching circuit 2 is coupled to the pen based computers mounted in the multiple computer receptacle device through the mating data connectors 28 of the multiple computer receptacle device 4.

The electrical system first includes a first signal generator 50. The first signal generator 50 is situated on the multiple computer receptacle device 4. The first signal indicates when one or more pen based computers 12 are received by the multiple computer receptacle device. In its most simplest form, the first signal generator 50 may be a push button switch 51 mounted on the multiple computer receptacle device. When the operator has loaded one or more pen based computers into the receptacle device 4, he presses the switch which sends the first signal to the main data gathering and dispatching circuit 2.

The main data gathering and dispatching circuit 2 includes a second signal generator 52 which, in response to the first signal, provides a second signal to the multiple computer receptacle device 4. The second signal is provided for determining which one of the slots 24 of the multiple computer receptacle device has a pen based computer mounted in it. The pen based computers 12 include a second signal receiver 54 to receive this signal, and a return signal generator 56 to generate a return signal to the main data gathering and dispatching circuit 2, which includes a return signal receiver 57, so that the main data gathering and dispatching circuit can recognize which slot 24 of the multiple computer receptacle device 4 has a pen based computer mounted in it.

The main data gathering and dispatching circuit 2 further includes a first memory 58 for storing a plurality of logic identification codes. More specifically, a list of identification codes are stored in the memory 58, each identification code corresponding to one of a plurality of pen based computers 12.

The main data gathering and dispatching circuit 2 further includes a third signal generator 60 which is coupled to the first memory 58 and which provides a third signal to the multiple computer receptacle device 4, the third signal corresponding to at least one of the identification codes stored in the first memory.

Each pen based computer 12 includes a second memory 62. The second memory 62 stores a predetermined logic identification code which is preprogrammed and specific to each pen based computer. A third signal receiver 64 situated on each pen based computer receives the third signal corresponding to the identification codes stored in the first memory 58 of the main data gathering and dispatching circuit, and compares logic data corresponding to this third signal with the predetermined identification code stored in the second memory 62 of the pen based computer. If the two identification codes match, the transfer of data between the pen based computer 12 and the main data gathering and dispatching circuit 2 will proceed.

Each pen based computer 12 further includes a third memory 66 for storing logic data inputted to the pen based computer by a user of the computer. As in the case of the utility, for example, the meter reader will input the gas or electric meter readings by using the tethered pen of the pen based computer. This data corresponding to the meter readings will be stored in the third memory 66.

A transmitter 68 situated on the pen based computer 12 will transmit first data signals corresponding to the logic data stored in the third memory 66 to the main data gathering and dispatching circuit 2. A receiver 70 on the main data gathering and dispatching circuit will receive the first data signals and store the signals as logic data in a fourth memory 72 constituting part of the main data gathering and dispatching circuit. Accordingly, the data from the pen based computers 12 is transferred to the main data gathering and dispatching circuit 2 or host computer for further processing or analysis.

The electrical system of the present invention further has the capability of transferring data from the host computer or main data gathering and dispatching circuit 2 to one or more of the pen based computers 12 mounted in the multiple computer receptacle device 4. In the case of an electric or gas utility, for example, each pen based computer 12 may be programmed by the host computer or main data gathering and dispatching circuit 2 with a list of residences to be checked by the meter reader the following business day. To input data to the main data gathering and dispatching circuit 2, a keyboard 8 is included and coupled to the circuit.

Accordingly, the main data gathering and dispatching circuit 2 includes a fifth memory 74 for storing logic data inputted to the main data gathering and dispatching circuit by an operator, and a transmitter 76 coupled to the fifth memory 74 for transmitting second data signals corresponding to the logic data stored in the fifth memory 74 to the pen based computers.

The pen based computers include a receiver 78 for receiving the second data signals, and a sixth memory 80 coupled to the receiver 78 for storing logic data corresponding to the second data signals provided to the pen based computers by the main data gathering and dispatching circuit.

Figure 5:
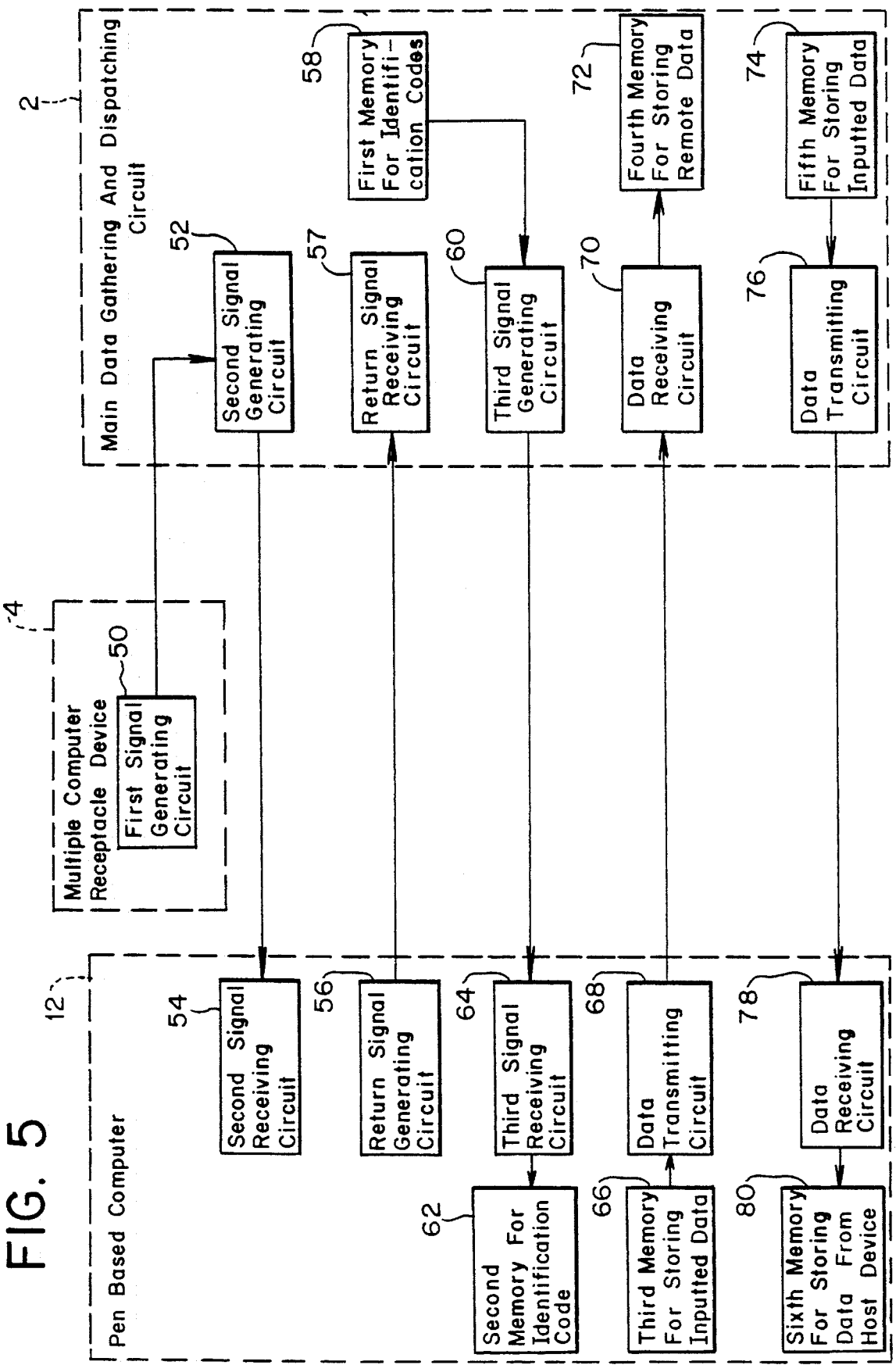
FIG. 5 is a block diagram of an electrical system for transferring data concurrently between a main data gathering and dispatching circuit and a plurality of pen based computers, in accordance with the present invention.
Figure 6A:
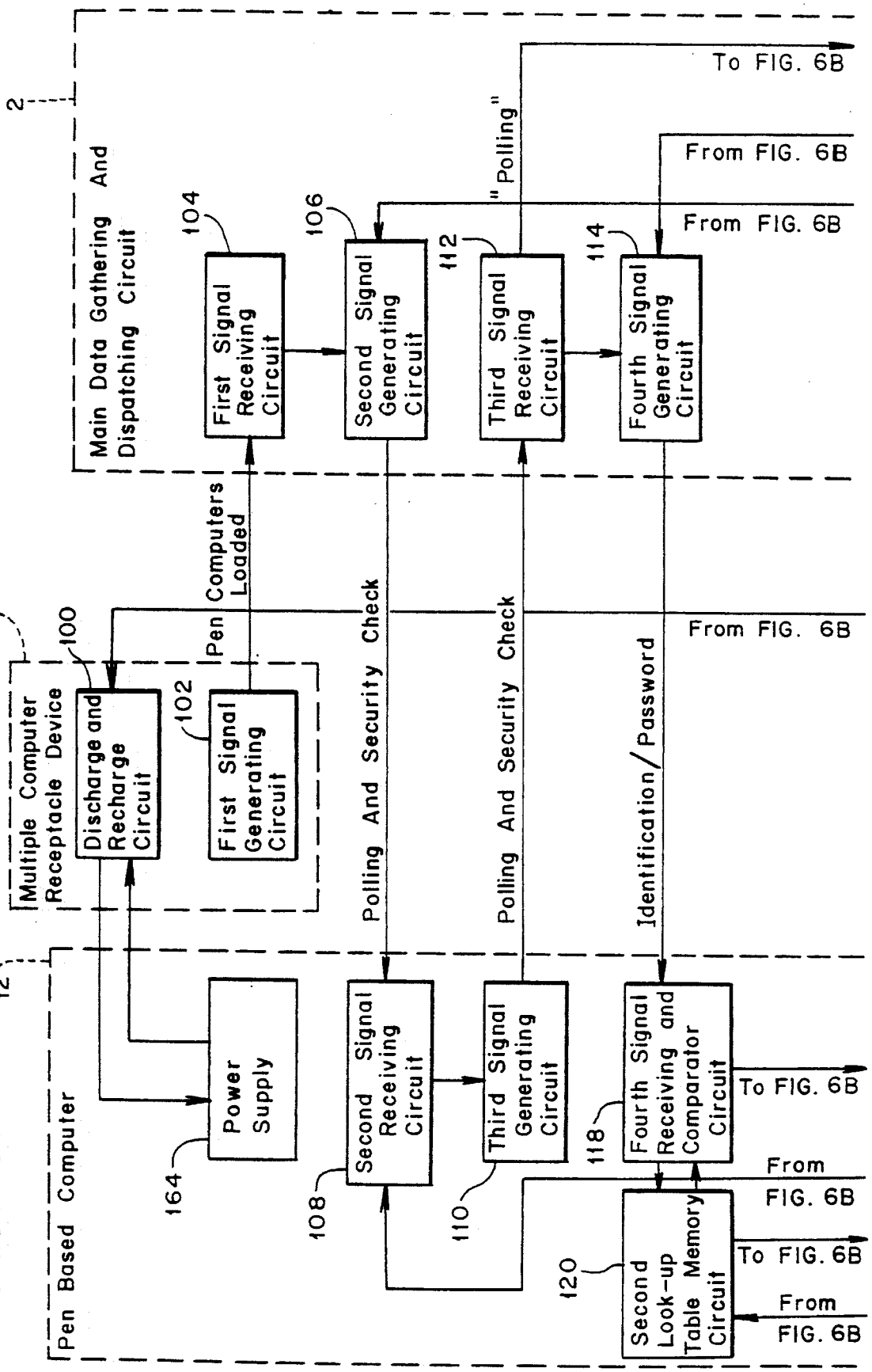
Figure 6C:
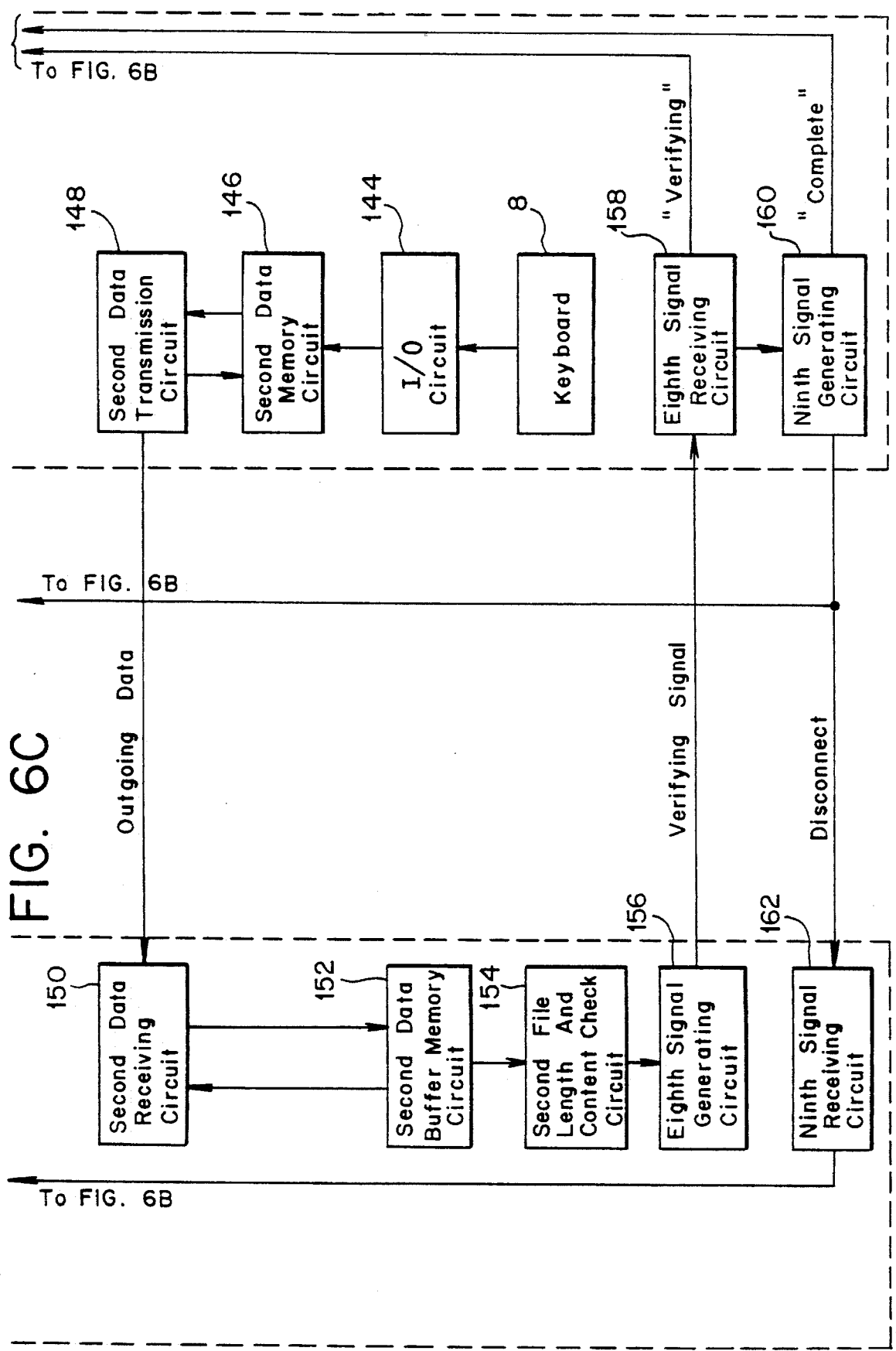
Figure 7A:
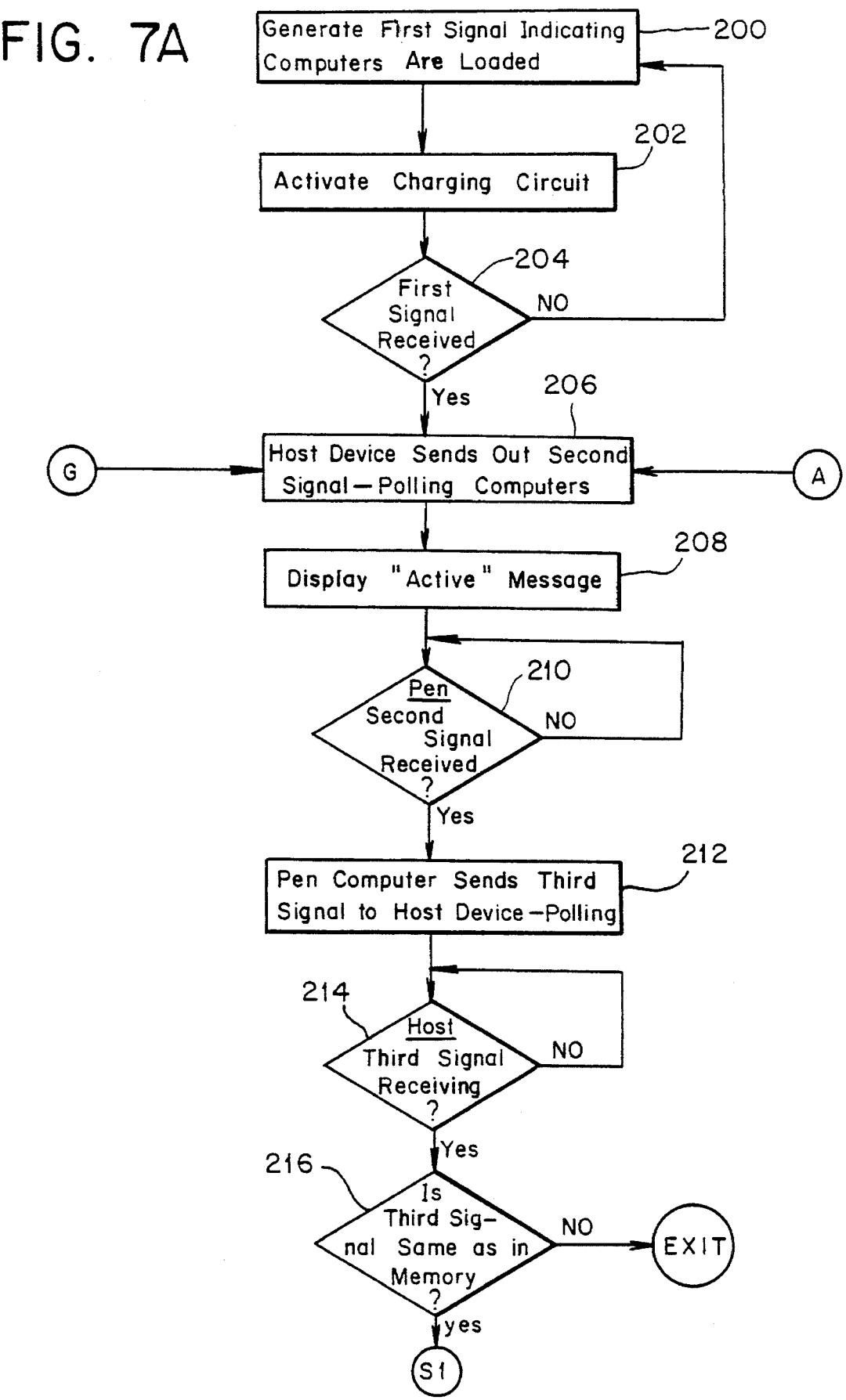
FIGS. 7a–7h are a flow chart illustrating the operation of the electrical system of the present invention.
Figure 7B:
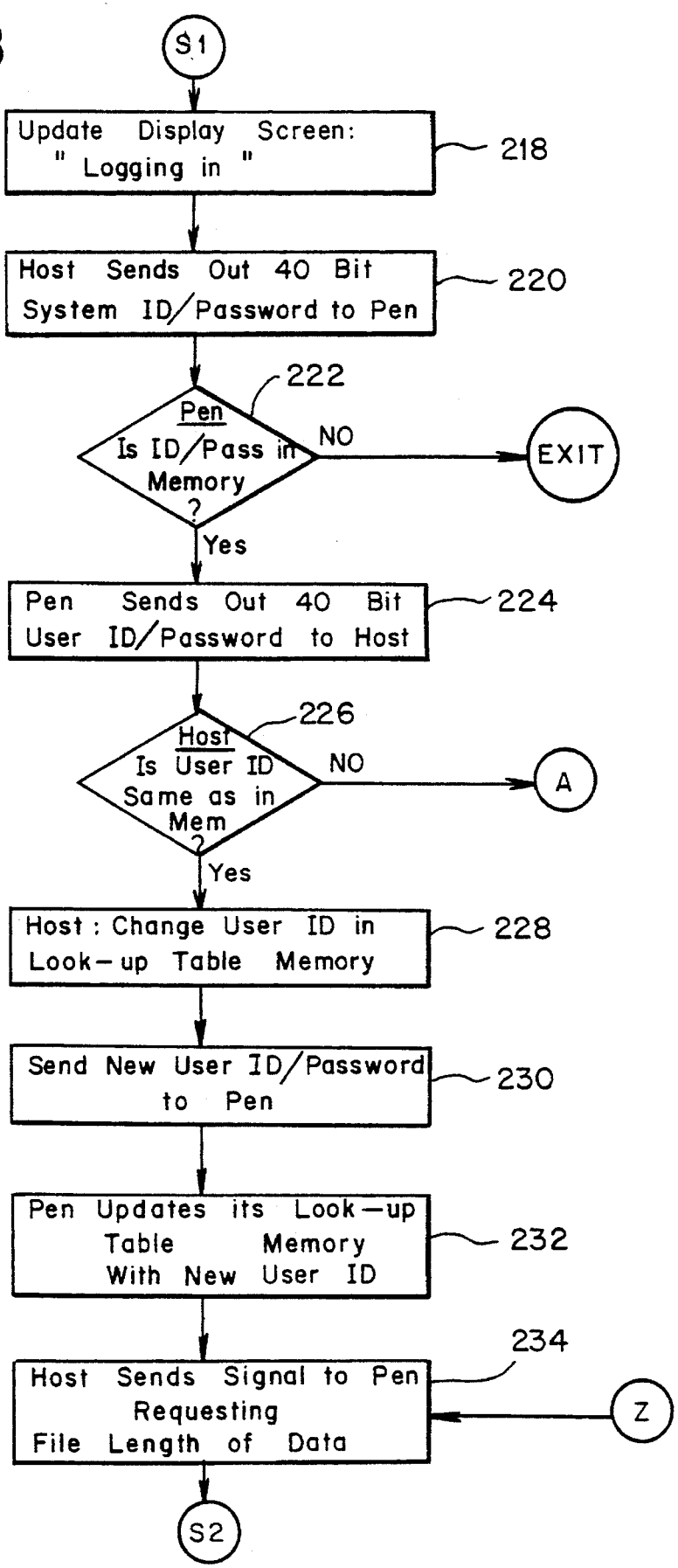
Figure 7C:
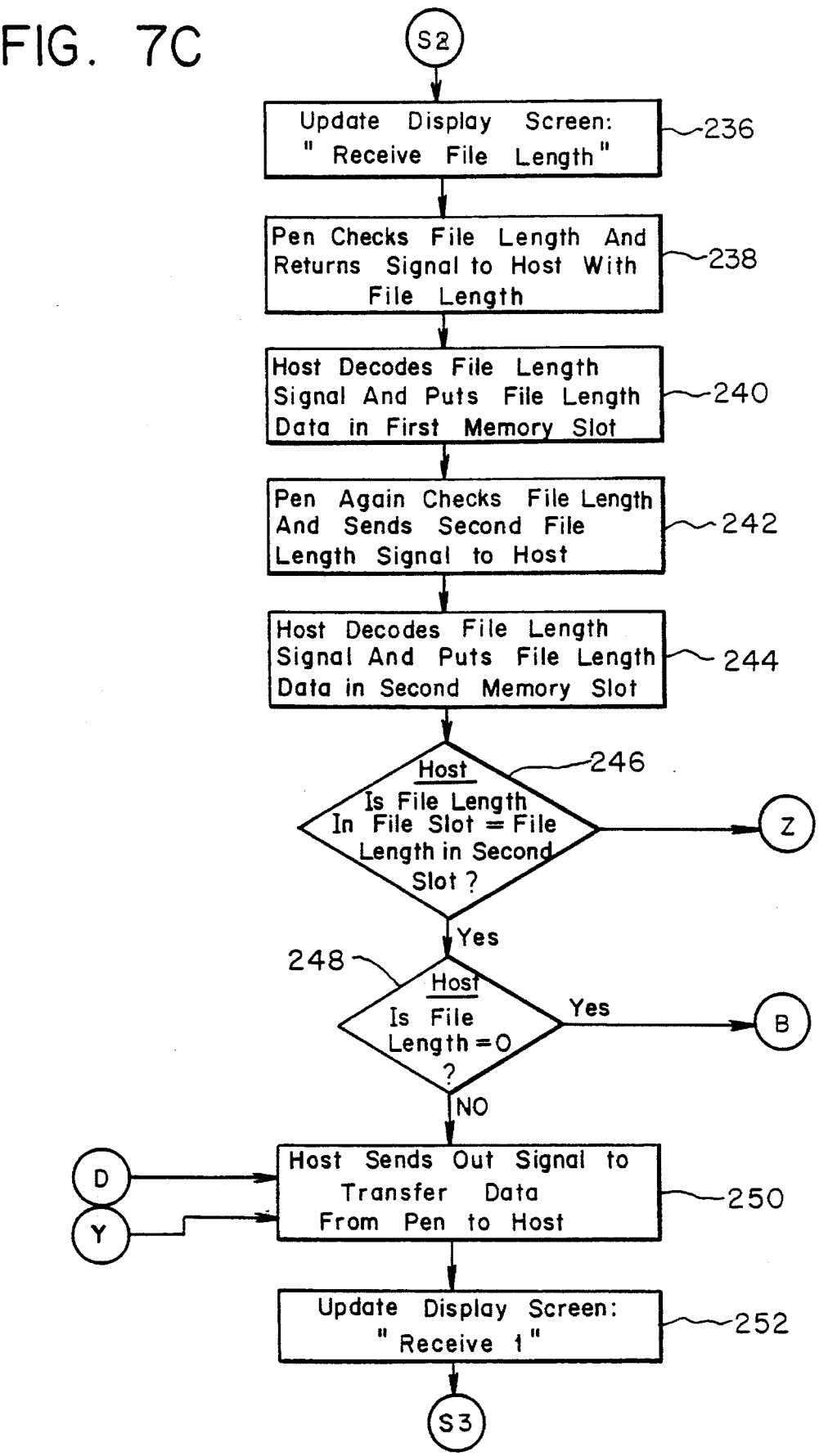
Figure 7D:
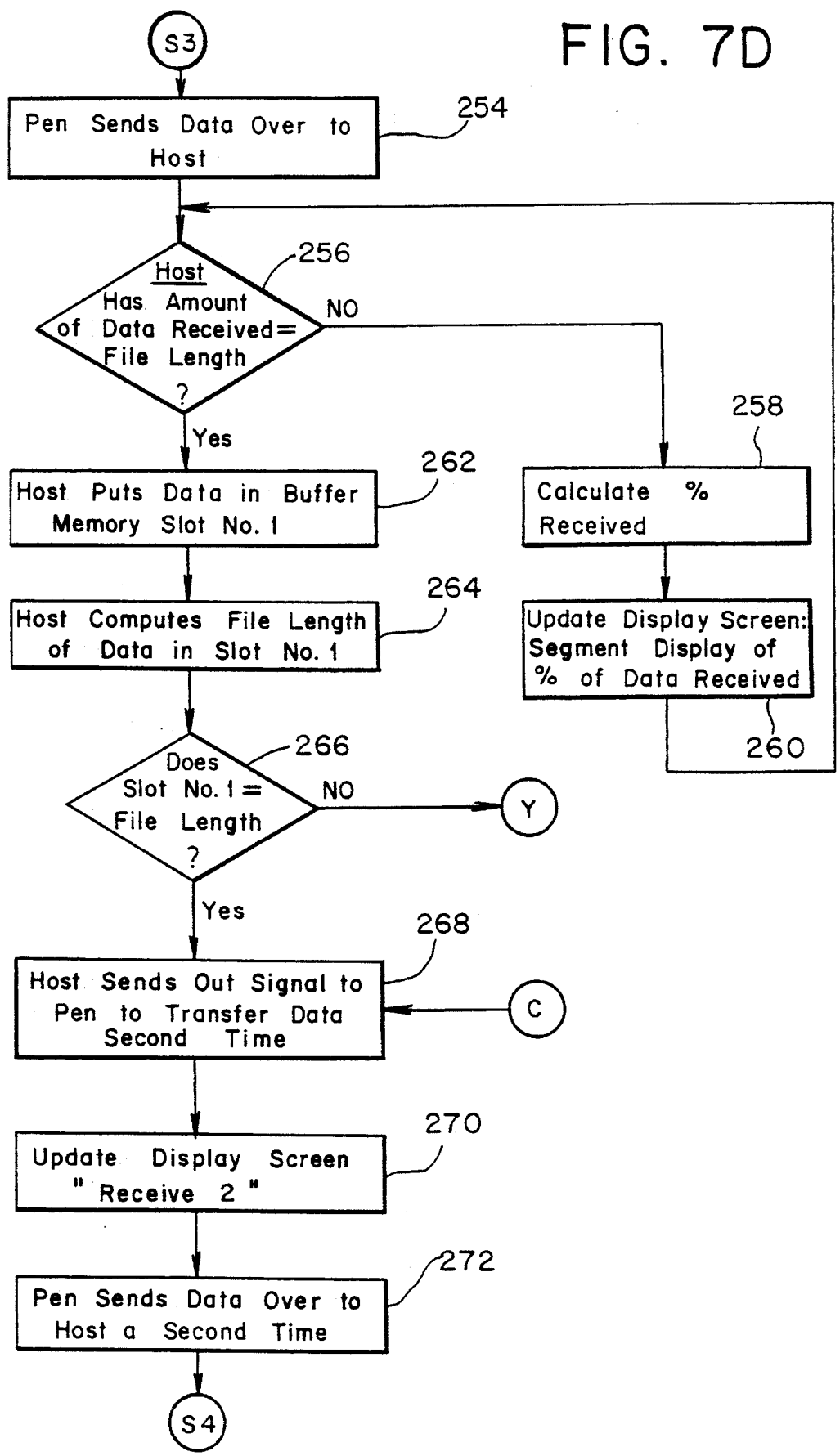
Figure 7E:
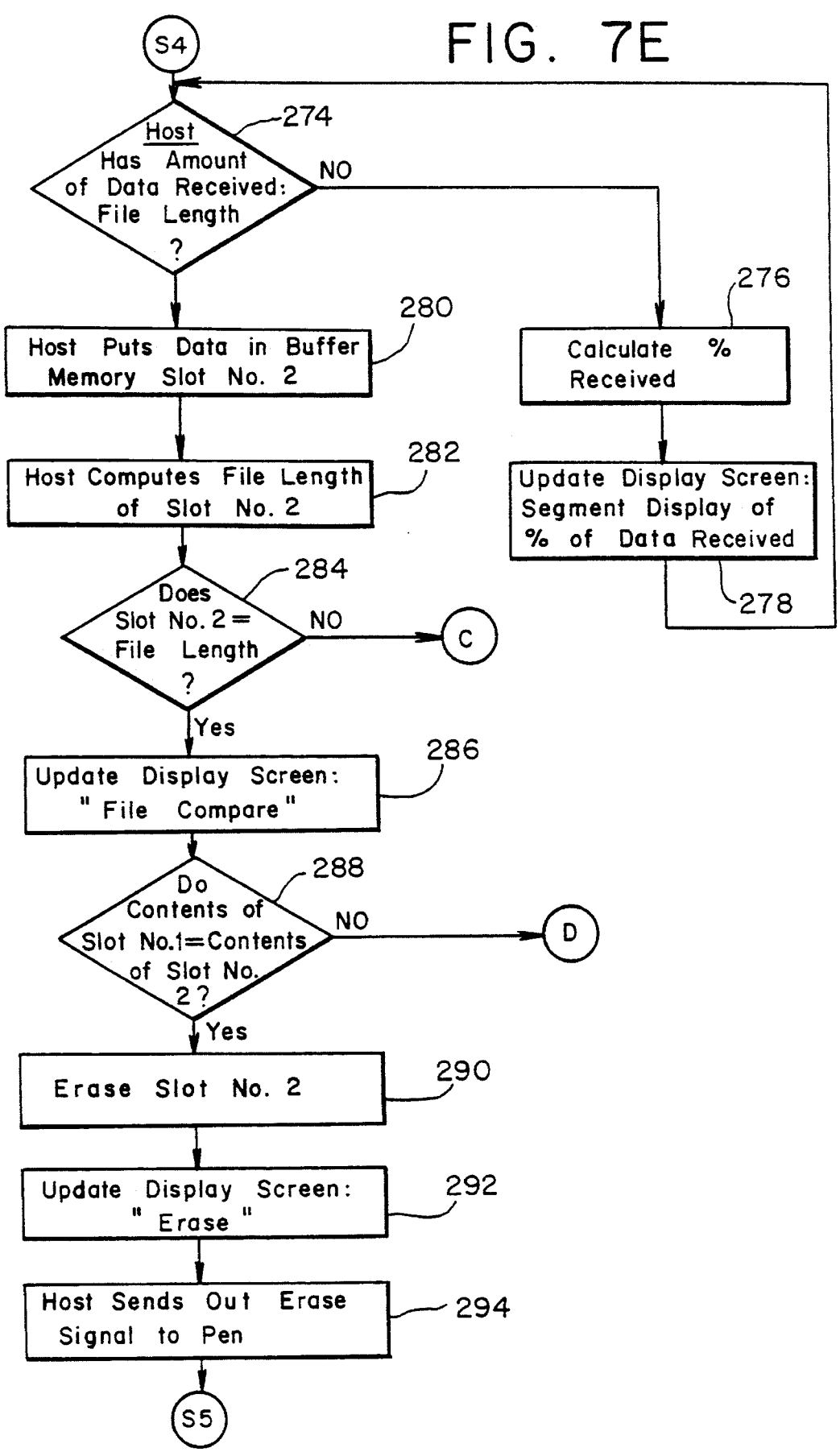
Figure 7F:
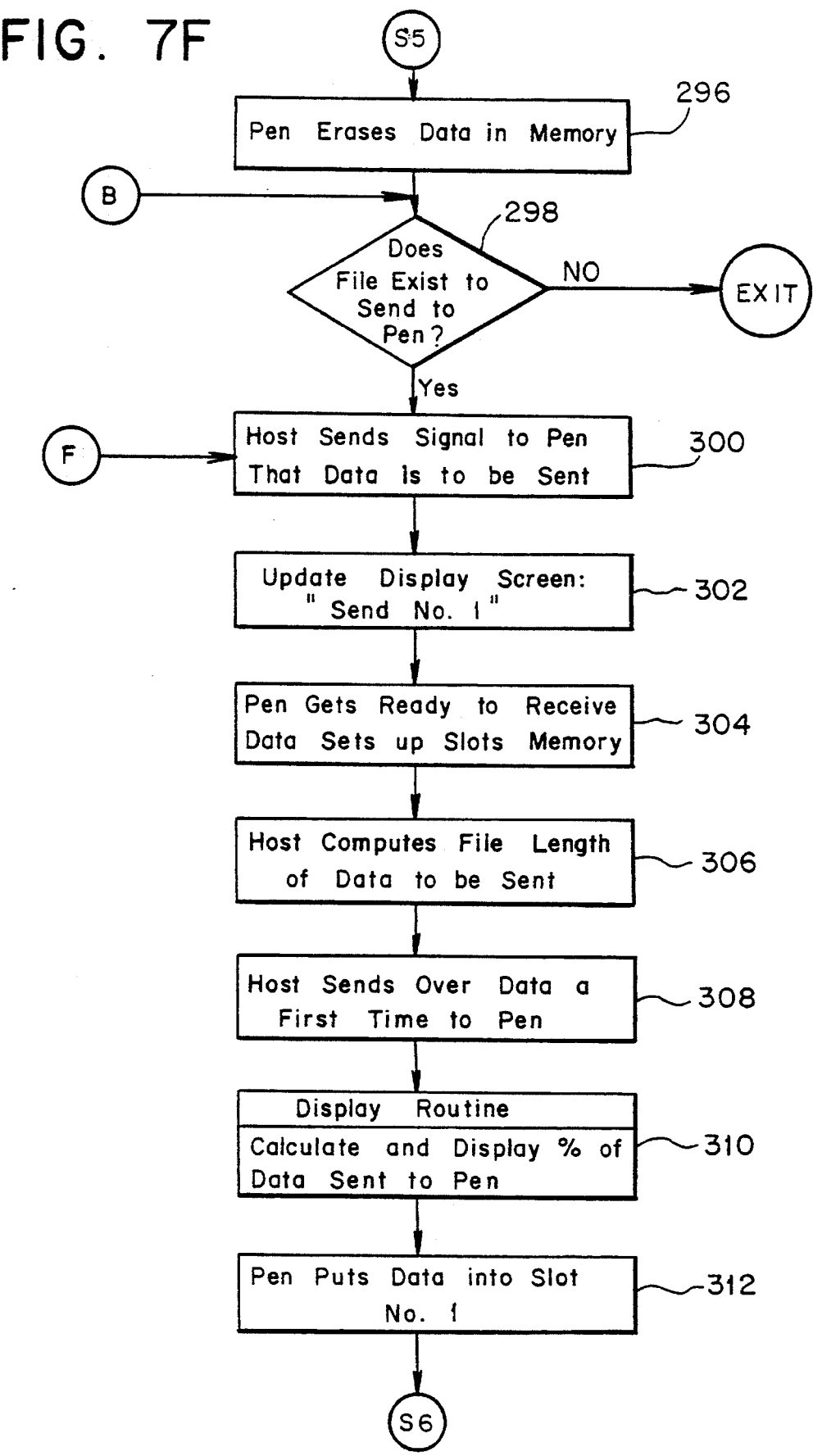
Figure 7G:
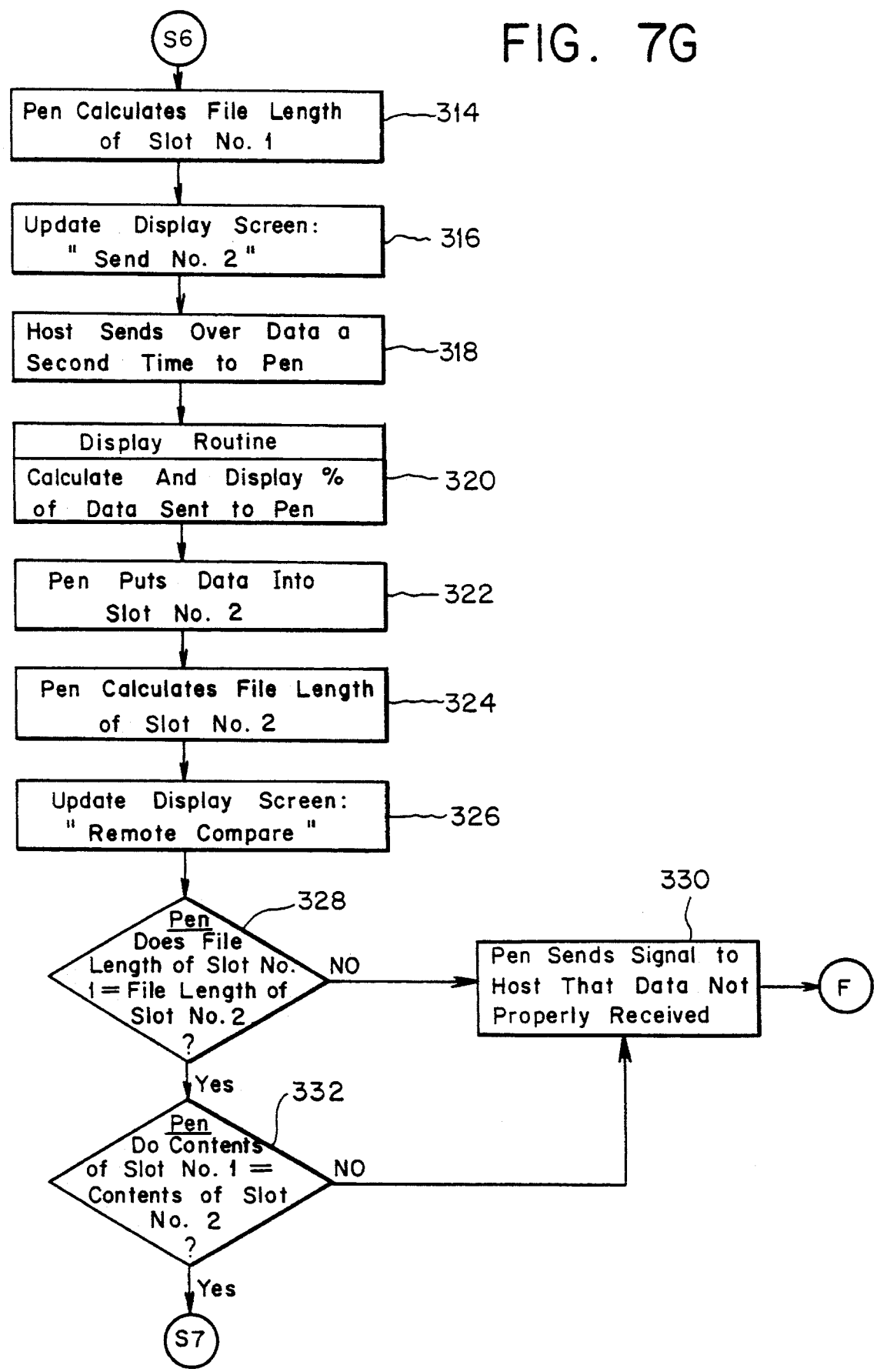
Figure 7H:
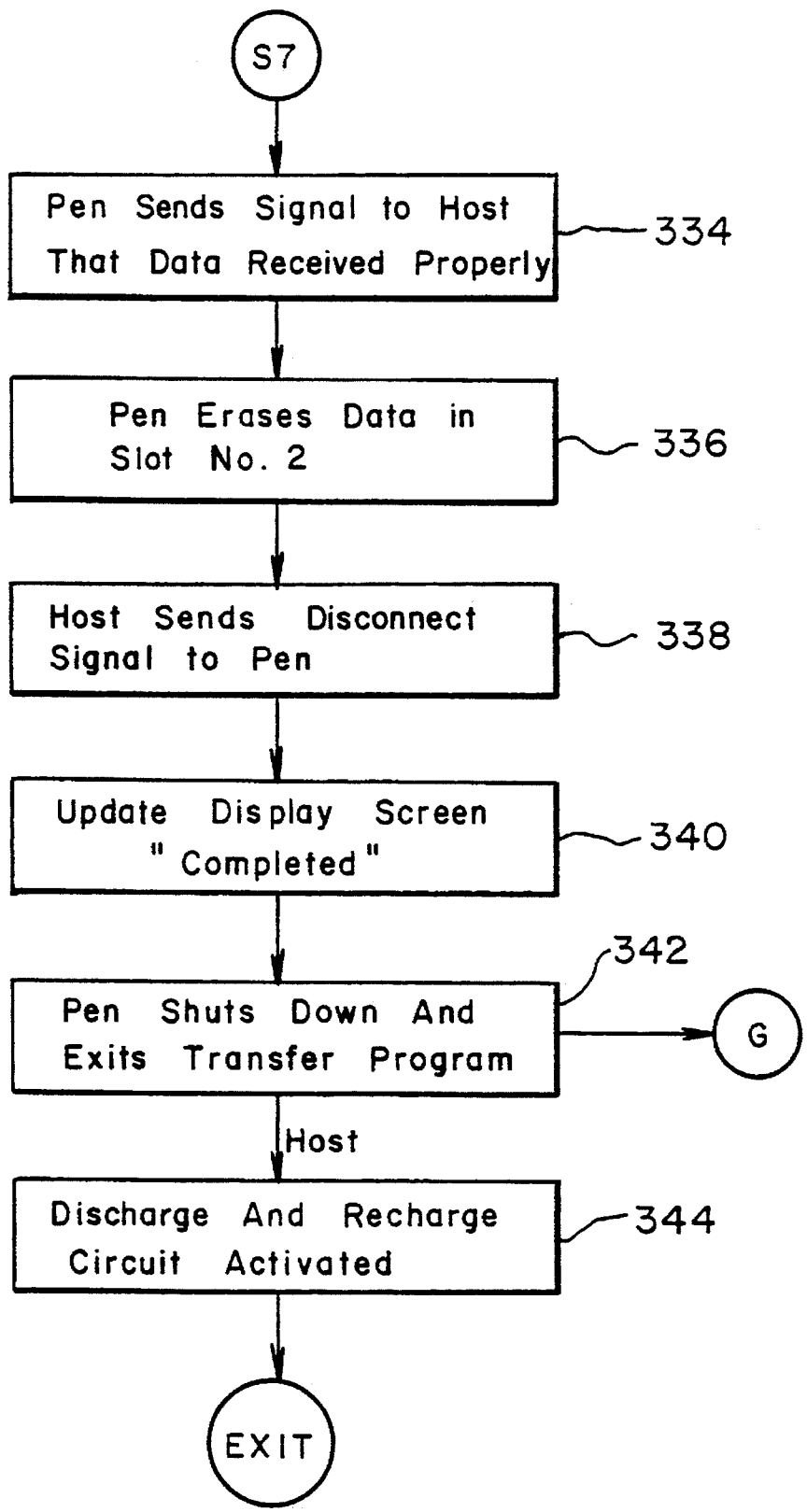

A more preferred form of the electrical system for transferring data between a plurality of pen based computers 12 and a main data gathering and dispatching circuit or host device 2 is illustrated in block diagram form in FIG. 6A–6C. The multiple computer receptacle device 4 more preferably includes a charge and discharge circuit 100, as will be described, which interfaces with the pen based computers mounted in the receptacle device and the main data gathering and dispatching circuit. The receptacle device 4 further includes a first signal generator 102, which may be a switch, as described previously in relation to the embodiment illustrated by FIG. 5. The main data gathering and dispatching circuit 2 includes a first signal receiving circuit 104, which circuit provides an output signal in response to the first signal. As mentioned previously with respect to the embodiment shown in FIG. 5, the first signal indicates that at least one pen based computer is received by the multiple computer receptacle device 4.

After receiving the first signal and in response thereto, the main data gathering and dispatching circuit generates a second signal. For this purpose, the data gathering and dispatching circuit 2 includes a second signal generating circuit 106. The purpose of the second signal is to poll the pen based computers 12 for determining which slot 24 of the multiple computer receptacle device 4 has a pen based computer mounted in it, and for performing a security check. The second signal, which is a polling and security check signal, is preferably an eight bit digital word.

The pen based computers 12 include a second signal receiving circuit 108 and, in response to the second signal, generate an output signal which is provided internally to a third signal generating circuit 110 situated on the pen based computer. The third signal generating circuit 110, in response to the output signal from the second signal receiving circuit 108, generates a third signal and provides the third signal to the main data gathering and dispatching circuit 2. The purpose of the third signal, like the second signal, is for polling the main data gathering and dispatching circuit and for performing a security check with respect thereto. The third signal, like the second signal, is preferably an eight bit word. The second and third signals are, in effect, redundant signals and ensure that the main data gathering and dispatching circuit 2 is communicating with the proper pen based computers 12, and that the pen based computers are communicating with the proper main data gathering and dispatching circuit. Stated another way, the second signal, in effect, informs the pen based computers 12 that the main data gathering and dispatching circuit 2 is communicating with them, and the third signal is effectively a signal to the main data gathering and dispatching circuit 2 that a pen based computer is in one of the slots of the multiple computer receptacle device 4 and communicating with the main data gathering and dispatching circuit. The third signal may have the same, but preferably different, decimal equivalent of the second signal.

The main data gathering and dispatching circuit includes a third signal receiving circuit 112 which will generate an output signal if the third signal is received. The output signal is provided to a display 6 coupled to the main data gathering and dispatching circuit, which display 6 will display the message "logging in" or its equivalent, to inform the operator that there are pen based computers in the receiving slots 24 of the multiple computer receptacle device 4. The display 6 will display a column of slot numbers, and next to each slot number will display either the "logging in" message or an "empty" message, to indicate that a pen based computer 12 is received or not received by a particular slot 24 of the multiple computer receptacle device.

If no third signal is received by the main data gathering and dispatching circuit 2, the main data gathering and dispatching circuit will disconnect electrically from the pen based computer with which it is trying to communicate. This may occur if no pen based computer is mounted in a respective slot 24 of the multiple computer receptacle device. However, the main data gathering and dispatching circuit will continue to send out the second signal to the empty slot 24 until the third signal is received.

In response to the third signal, the third signal receiving circuit 112 generates an output signal and provides that output signal to a fourth signal generating circuit 114. The fourth signal generating circuit 114, situated on the main data gathering and dispatching circuit 2, will generate a fourth signal, preferably a forty bit word, and provide this signal to the pen based computers through the multiple computer receptacle device.

The forty bit fourth signal corresponds to an identification/password code. Each pen based computer 12 is preprogrammed with a particular identification/password code, and communication between the pen based computer and the main data gathering and dispatching circuit will continue only if the two identification/password codes match.

More specifically with regard to the exchange of password/identification codes, the main data gathering and dispatching circuit 116 includes a first look-up table memory circuit which is coupled to the fourth signal generating circuit 114. The first look-up table memory circuit 116 has stored therein logic data corresponding to a plurality of the identification/password codes (the "first" codes). Each of the first identification/password codes corresponds to a respective pen based computer 12. The first look-up table memory circuit 116 essentially includes a list of the first identification/password codes, and the main data gathering and dispatching circuit sends these first identification codes as signals to the multiple computer receptacle device 4 and to each of the pen based computers 12 mounted in the slots of the receptacle device.

Each pen based computer 12 includes a fourth signal receiving and comparator circuit 118, and a second look-up table memory circuit 120. Stored in the second look-up table memory circuit 120 is logic data which corresponds to an identification/password code which is unique for each computer (the "second" code). Each pen based computer is preprogrammed with the second identification/password code. The second look-up table memory circuit 120 is electrically coupled to the fourth signal receiving and comparator circuit 118. The fourth signal receiving and comparator circuit compares the second identification/password code logic data stored in the second look-up table memory circuit 120 with the fourth signal corresponding to the first identification code. If the first and second identification/password codes are the same, the comparator circuit 120 generates an output signal to a fifth signal generating circuit 122 located on the pen based computer.

The fifth signal generating circuit 122 provides a fifth signal in response to the output signal of the fourth signal receiving and comparator circuit 118. The fifth signal corresponds to the second identification/password code logic data stored in the second look-up memory circuit 120.

The fifth signal is received by a fifth signal receiving and comparator circuit 124 situated on the main data gathering and dispatching circuit. The fifth signal receiving and comparator circuit 124 compares the first identification/password code logic data stored in the first look-up table memory circuit 116 with the fifth signal corresponding to the second identification code, and provides an output signal in response thereto. In effect, the second identification/password codes (i.e., the fifth signal) sent by the pen based computers to the main data gathering and dispatching circuit are checked against the list of first identification/password codes stored in the first look-up table memory circuit 116. If a particular pen based computer's identification/password code is not located in the first look-up table memory circuit, communications between that pen based computer and the main data gathering and dispatching circuit will cease, except that the output signal from the fifth signal receiving and comparator circuit 124 is provided to the second signal generating circuit 122 which continues to send out a polling and security check signal (i.e., the second signal) to the pen based computer, in effect, to reinitiate communications between the pen based computer 12 and the main data gathering and dispatching circuit 2.

If the second identification/password code (i.e., the fifth signal) from a particular pen based computer matches a first identification/password code stored in the first look-up table memory circuit 116 of the main data gathering and dispatching circuit, a new identification/password code is selected for that particular pen based computer. An identification/password selection circuit 126 which, for example, may be a random number generator, is situated on the main data gathering and dispatching circuit and is electronically coupled to the first look-up table memory circuit 116. The identification/password selection circuit 126 will replace a previously used second identification/password code in the first look-up table memory circuit 116 with a new identification/password code.

The main data gathering and dispatching circuit includes a sixth signal generating circuit 128 which is coupled to the identification/password selection circuit 126 to provide the sixth signal, which corresponds to the new identification/password code, to a respective pen based computer 12. Each pen based computers includes a sixth signal receiving circuit 130 which provides an output signal in response to the sixth signal which it receives, the output signal corresponding to the new identification/password code. The output signal is provided to the second look-up table memory circuit 120, and the second look-up table memory circuit stores the output signal corresponding to the new identification/password code as logic data in substitution for the second identification/password signal logic data previously stored in the memory circuit 120.

After this initial polling and identification stage in the operation of the electrical system of the present invention, the pen based computers 12 are now ready to transfer data which has been inputted to the pen based computers to the main data gathering and dispatching circuit or host computer 2. To carry out this operation, each pen based computer includes a first data memory circuit 132. The first data memory circuit 132 has stored in it the logic data inputted to the pen based computer by the user.

Each pen based computer also includes a first data transmission circuit 134. The first data transmission circuit 134 is electrically coupled to the first data memory circuit 132 and is provided for transmitting first data signals corresponding to the logic data stored in the first data memory circuit to the main data gathering and dispatching circuit 2. Preferably, the first data signals are transmitted by the first data transmission circuit 134 twice, that is, a first time and a second time.

The main data gathering and dispatching circuit includes a first data receiving circuit 136. The first data receiving circuit 136 receives the first data signals and provides the first data signals to a first data buffer memory circuit 138 situated on the main data gathering and dispatching circuit. The first data buffer memory circuit 138 is coupled to the first data receiving circuit 136 and stores therein the first data signals transmitted twice to the main data gathering and dispatching circuit. Two files are set up in the first data buffer memory circuit 138. The first file contains the logic data corresponding to the first data signals transmitted the first time, and the second file includes the logic data corresponding to the first data signals transmitted the second time.

A first file length and content check circuit 140 is also included in the main data gathering and dispatching circuit 2. The first file length and content check circuit 140 is coupled to the first data buffer memory circuit 138, and compares the logic data in the first file with the logic data in the second file.

Both the file length and the content of the two files are compared. Based upon this comparison, an output signal is provided by the check circuit 140 to the display 6 to present the message "receiving" on the display to indicate that data is incoming from the pen based computers.

The main data gathering and dispatching circuit includes a seventh signal generating circuit 142 which is coupled to the first file check circuit 140. If the file length and content of the two files are the same, the content of the sixth signal is such that it will instruct the particular pen based computer to erase the data stored in its first data memory circuit 132. If the file length or content of the two files are not the same, the particular content of the sixth signal will instruct the pen based computer to retransmit the data stored in the first data memory circuit 132. Accordingly, each pen based computer includes a seventh signal receiving circuit 145 which is coupled to the first data transmission circuit 134 and to the first data memory circuit 132 and which is adapted to receive the seventh signal and to instruct the pen based computer to either erase the data stored in the first data memory circuit or to retransmit the data.

As mentioned previously with respect to the embodiment illustrated by FIG. 5, the present embodiment has the capability of transmitting data from the main data gathering and dispatching circuit or host computer 2 to the individual pen based computers 12 loaded into the multiple computer receptacle device 4. This data is inputted to the host computer or main data gathering and dispatching circuit by a keyboard 8 which is connected through an input/output circuit 144 to a second data memory circuit 146 situated on the main data gathering and dispatching circuit and in which is stored the outgoing data (also referred to herein as the second data). The second data memory circuit 146 is coupled to a second data transmission circuit 148 also situated on the main data gathering and dispatching circuit, which is further coupled to the first look-up table memory circuit 116. As stated previously, the first look-up table memory circuit 116 has stored therein a list of identification/password codes for the pen based computers. Along with each identification/password code may be stored a flag for a particular pen based computer, which flag indicates that data is to be transmitted to that particular pen based computer. The flag will cause the main data gathering and dispatching circuit 2 to transmit data to the particular pen based computer that is flagged.

The outgoing or second data from the main data gathering and dispatching circuit 2 is received by a second data receiving circuit 150 situated on each pen based computer. Each pen based computer also includes a second data buffer memory circuit 152 which is coupled to the second data receiving circuit 150 and which stores as logic data the second data signals transmitted by the second data transmission circuit 148.

In the same manner that the incoming data is transmitted from the pen based computer to the main data gathering and dispatching circuit, the outgoing or second data is transmitted twice, that is, a first time and a second time. Two files are set up in the second data buffer memory circuit 152, the first file storing logic data corresponding to the first transmission of the outgoing data, and the second file storing logic data corresponding to the second transmission of the outgoing data.

A second file length and content check circuit 154 is also included and situated on each pen based computer. The second file length and content check circuit 154 is coupled to the second data buffer memory circuit 152 and compares the length and content of the first file with those of the second file, and provides an output signal in response to this comparison. The output signal is provided to an eighth signal generating circuit 156 situated on the pen based computer. If the length and the content of the files in the second data buffer memory circuit 152 correspond, then the content of the eighth signal is such that it verifies that the outgoing or second data has been correctly received by the pen based computer. If the two files do not correspond, then the content of the eighth signal is such that it signals the main data gathering and dispatching circuit to resend the outgoing data.

The main data gathering and dispatching circuit includes an eighth signal receiving circuit 158 which, in response to the specific content of the eighth signal, will cause the outgoing data to be resent or proceed with the data transfer operation. The output signal is further provided to the display 6 to signal the display to present the message "verifying data", to inform the operator that the outgoing data is being checked to see if it was properly received.

If the first and second files in the second data buffer memory circuit 152 of the pen based computer match each other, then the output signal of the eighth signal receiving circuit 158 of the main data gathering and dispatching circuit is provided to a ninth signal generating circuit 160 on the main data gathering and dispatching circuit. The ninth signal is a "disconnect" signal which is provided to the pen based computer and which is received by a ninth signal receiving circuit 162 situated on the pen based computer. The ninth signal receiving circuit 162 provides an output "disable" signal to the second signal receiving circuit 108 on the pen based computer to disconnect the communication between the particular pen based computer and the main data gathering and dispatching circuit or host computer 2. The ninth signal is also provided to the display 6 so that the display will present the message "complete" to indicate to the operator that the operation of the electrical system for transferring data has been completed.

As mentioned previously, the charge and discharge circuit 100 mounted on the multiple computer receptacle device 4 is coupled to the power supply or battery pack of each pen based computer through the power connectors 30. The circuit is also connected to the first signal generating circuit 102 of the multiple computer receptacle device and to the ninth signal generating circuit 160 of the main data gathering and dispatching circuit. The first signal is provided to the charge and discharge circuit 100. When the pen based computers are mounted in the multiple computer receptacle device 4, the charge and discharge circuit 100 will provide power to the pen based computer in response to the first signal.

Figure 13:
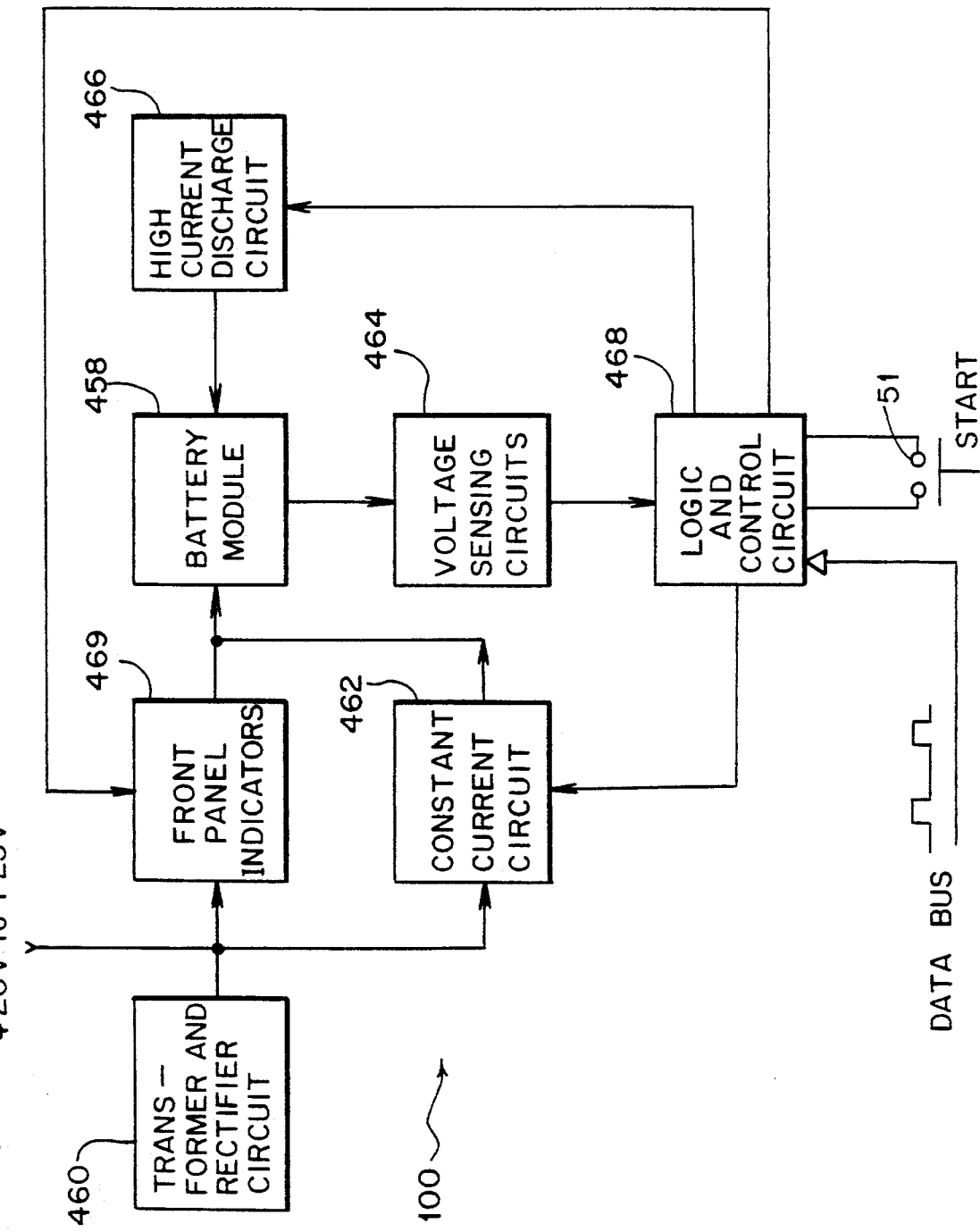
FIG. 13 is a block diagram of a charge and discharge circuit formed in accordance with the present invention and for use with the electrical system of the present invention.

At the end of the transfer of data between the pen based computers 12 and the main data gathering and dispatching circuit 2, the charge and discharge circuit 100 will discharge the power supply or battery pack 164 of each pen based computer in response to the ninth or "disconnect" signal. The purpose is to discharge the nickel-cadmium batteries in the pen based computer battery pack to a predetermined level which is sensed by the discharge and recharge circuit 100. When the nickel-cadmium batteries have been discharged to this level, the charge and discharge circuit will recharge the batteries of the pen based computers until a second predetermined voltage level is sensed by the circuit. Thus, the pen based computers will be fully recharged and ready for use. A preferred form of the charge and discharge circuit is shown in FIGS. 13 and 14 and will be described later in greater detail.

With reference to the flow chart illustrated by FIG. 7, the operation of the system for transferring data concurrently between the pen based computers and the main data gathering dispatching circuit or host computer will now be described.

After the pen based computers 12 are loaded into the multiple computer receptacle device 4, the operator activates the switch on the multiple computer receptacle device, which sends the first signal to the host device 2, indicating that the pen based computers are received by the multiple computer receptacle device (Block 200). The first signal also activates the charging circuit 100 to providing power to the pen based computers mounted in the multiple computer receptacle device (Block 202).

If the first signal is not received by the host device (Block 204), the host computer will wait for the first signal. If the signal is received, the host device sends out the second signal to the pen based computers (Block 206).

The display 6 displays a listing of the slots of the multiple computer receptacle device 4. After the host device sends out the second signal, the message "active" is displayed next to each slot number (Block 208).

The pen based computers received by the multiple computer receptacle device are in a continuous loop waiting for the second signal (Block 210). If the second signal is received by the pen based computers, then each pen based computer will send a third signal to the host device (Block 212).

The host device is in a continuous loop waiting for the third signal (Block 214). If the host device receives the third signal, then it compares the third signal with that which is stored in memory (Block 216). The second and third signals are the polling and security check signals, preferably eight bits each, described previously. In one form of the invention, each of the pen based computers sends out the same polling and security check signal (i.e., the third signal) to the host device. The host device will compare the third signal received from the pen based computers with what it has stored in memory (Block 216). If the third signal does not match that which is stored in memory, the host device will exit the operational routine. If the two match, the host device will update the display screen with the message "logging in" next to the particular pen based computer slot number from which a third signal is received (Block 218).

The host device next sends out a 40 byte identification/password signal to the pen based computers (Block 220). Each pen based computer has its own identification/password code, which the host device looks up from the look-up table and determines if this identification/password code matches that which is received from the host device (Block 222). If there is no match between the two identification/password codes, the pen based computer will exit its operational routine. If there is a match, then the pen based computer will send to the host device a 40 byte user identification/password signal which is particular to each pen based (Block 224).

The host device receives this 40 byte user identification/password signal, and compares it to a list of identification/password codes which are stored in its look-up table memory (Block 226). If the identification/password code received by the host device is not found in the look-up table memory of the host device, the host device will return to that portion of the operational routine where it will send out the second "polling" signal to the pen based computer (Block 206). If the user identification/password code from the pen based computer is included on the list of codes stored in the look-up table memory, the host device will update the look-up table memory to change that particular pen based computer's user identification/password code (Block 228), and will send a new user identification/password code to the pen based computer (Block 230). The pen based computer will update its look-up table with the new user identification/password code (Block 232). This step completes the log-in phase of the operational routine.

The host device then sends a signal to the pen based computer requesting the file length of data which is stored in the pen based computer memory (Block 234). The host device also updates the display so that the message "receive file length" is displayed next to the slot number of the particular pen based computer with which it is communicating (Block 236).

In response to the signal received from the host device, the pen based computer checks the file length of the data stored in its memory, and returns a 16 byte signal in the form of an encoded character string incorporating the file length information (Block 238). The host device decodes the 16 byte word and puts the file length data in a first file length slot of its memory (Block 240).

For redundancy, the pen based computer checks the file length and returns another 16 byte signal, as it did in Block 238 (Block 242), and the host device decodes the second 16 byte word, as it did in Block 240 and puts the file length data extracted from the 16 byte word in a second file length slot of memory (Block 244).

The host device then compares the file length in the first slot of its memory with the file length in the second slot (Block 246). If the two file lengths do not match, the host device will return to Block 234 of its operational routine and will send a signal to the pen based computer again requesting the file length of the data stored in its memory. If the two file lengths are the same, it will then check to see if the file length is equal to zero (Block 248). If the file length is equal to zero, which indicates that there is no data stored in the pen based computer, the host device will skip the data retrieval portion of the operational routine and advance to the routine corresponding to transferring new data to the pen based computer. If the file length is not equal to zero, indicating that there is data to be transferred to the host device, the host device will send out a signal to transfer the data from the pen based computer to the host device (Block 250). The host device will then cause the message "receive 1" to be displayed next to the slot of the particular pen based computer with which it is communicating (Block 252), indicating that data is being transferred from the pen based computer to the host device a first time. The pen based computer then sends the data over to the host device (Block 242).

So that the operator of the system for transferring data can monitor the progress of the data transfer operation, the host device will cause a segment or incremental gauge to be displayed. The host device will compare the data which is being received with the file length, and determines if all the data has been received (Block 256). The host device will then calculate the percentage of the data which has been received (Block 258) and will display the number of segments of the segmented display corresponding to that percentage of the data which is received (Block 260). The host device will continue to update the display in this manner until all the data is received. The host device will then put the data into its buffer memory in what shall be designated for convenience Slot No. 1 (Block 262). The host device will then compute the file length of Slot No. 1 (Block 264), and compare the file length which it just computed with the file length stored in the first file length slot (Block 266). If the file lengths are not the same, the host device will return to that portion of the operational routine where it will send out a signal to the pen based computer to transfer data to the host device (Block 250). If the two file lengths are equal, the host device will send out a second signal to the pen based computer to transfer the data from the pen based computer to the host device a second time (Block 268). The host device will cause the message "receive 2" to be displayed next to the slot number of the particular pen based computer with which it is communicating (Block 270).

The pen based computer will then send its data over to the host device for a second time (Block 270), as it did in Block 254. The host device will again cause a "gas gauge" type of segment display to be shown on the display 6 and calculate the percentage of data being received for a second time, and continually update the display until all of the data is received, as it did in Blocks 256–260 (Blocks 274–278).

The host device will then put the data received the second time into a second slot of its memory (Block 280), and will compute the file length of the second slot (Block 282).

The host device will then compare the file length of the data in Slot No. 2 with the second file length slot (Block 284). If the two file lengths are not equal, the host device will return to that portion of the operational routine where it sends out the second signal to the pen based computer to transfer the data a second time, i.e., Block 268. If the two file lengths are equal, the host device will update the display screen with the message "file compare" next to the slot number of the pen based computer with which it is communicating (Block 286).

The host device will then compare the content of Slot No. 1 with that of Slot No. 2 (Block 288). If the two contents are not the same, the host device will return to that portion of the operational routine where it sends a signal to the pen based computer to transfer the data the first time, i.e., Block 250. If the contents of memory Slot No. 1 and memory Slot No. 2 are the same, the host device will erase the data in memory Slot No. 2 (Block 290), and will update the display so that the message "erase" is displayed next to the slot number of the particular pen based computer with which it is communicating (Block 292), to inform the operator of the system that the data in the second memory slot is being erased.

Because the data has been successfully received by the host device, the host device sends out a signal to the pen based computer to erase the data stored in its memory (Block 294). The pen based computer erases the data in its memory in response to this signal (Block 296).

The data transfer operation, for transferring data from the pen based computer to the host device, has now been completed. The next phase of the operation is to transfer data from the host device to the pen based computers.

As mentioned previously, if there was no data to be transferred from the pen based computer to the host device, that is, the file length decoded by the host device was zero (Block 248), the operational routine skipped the data transfer operation and now returns to the routine at this point, as denoted by reference letter B. The host device determines whether a file exists to send to the particular pen based computer with which it is communicating (Block 298). The host device checks a flag in the look-up table next to the identification/password code stored in the look-up table memory for that particular pen based computer. If no flag exists, which means that no data is to be transferred to the pen based computer, the host device will skip to the discharge/recharge step at the end of the routine. If the check flag does exist for the particular pen based computer with which the host device is communicating, the host device will send a signal to the pen based computer that data is to be sent to the computer (Block 300), and will update the display screen by displaying the message "send No. 1" next to the slot number of the corresponding pen based computer (Block 302).

In response to the signal, the pen based computer gets ready to receive data from the host device; that is, it sets up slots in memory to receive the data (Block 304). The host device then computes the file length of the data to be sent to the pen based computer (Block 306), and sends the data to the pen based computer for a first time (Block 308).

In the same manner that it did when receiving data from the pen based computer, the host device computes the percentage of data being transferred to the pen based computer and provides a "gas gauge" type of segment display, updating the display periodically until all the data is transferred to the pen based computer the first time (shown generally by Block 310).

The pen based computer stores the data in Slot No. 1 of its memory (Block 312), and calculates the file length of the data stored in Slot No. 1 (Block 314).

The host device will then cause the message "send No. 2" to be displayed (Block 316), and sends its data to the pen based computer a second time (Block 318). As it is sending its data to the pen based computer, it again displays a segment gauge of the proportion of data being transferred (Block 320).

The pen based computer stores the data received a second time in Slot No. 2 of its memory (Block 322), and calculates the file length of the data stored in Slot No. 2 (Block 324). The host device will then update the display with the message "remote compare", indicating to the operator of the system that a comparison of the data received both times by the pen based computer is now being made (Block 326). This message is displayed next to each slot number of the pen based computer with which the host device is communicating.

The pen based computer then compares the file length of the data in Slot No. 1 of its memory with the file length of the data in Slot No. 2 (Block 328). If the file length of Slot No. 1 and Slot No. 2 are not equal, the pen based computer will send a signal to the host device indicating that the data has not been properly received (Block 330). The host device will then return to that portion of the operational routine where it will send a signal to the pen based computer that data is to be sent to the computer a first time, that is, Block 302.

If the file lengths of the data in Slot No. 1 and Slot No. 2 are equal, the pen based computer will then compare the contents of Slot No. 1 and Slot No. 2 (Block 332). If the contents of Slot No. 1 and Slot No. 2 are not the same, the pen based computer will send the signal mentioned previously that the data was not received properly (see Block 330), and the host device will resend the data and return to Block 332 in the operational routine.

If the contents of Slot No. 1 equal the contents of Slot No. 2, the pen based computer will send a signal to the host device that the data has been properly received (Block 334). The pen based computer will erase the data stored in the second slot, Slot No. 2 (Block 336), and the host device will send a signal to the pen based computer to disconnect from the host device (Block 338).

The host device will then display next to the slot number of the particular pen based computer with which it is communicating the message "computed" (Block 340), indicating the end of the operational routine. The pen based computer will shut down its power and exit the operational routine (Block 342). The operational routine will then return to Block 206, where the host sends out a polling signal, as denoted by reference letter G. The host device will then activate the charge and discharge circuit 100 in the multiple computer receptacle device (Block 344), which circuit will discharge the batteries of the pen based computers and recharge them to the proper level for future use.

Although the pen based computers and main data gathering and dispatching circuit have been described as including circuitry for carrying out the operation of transferring data between them, as shown in block diagram form in FIGS. 5 and 6, it is envisioned to be within the scope of the invention to carry out the operation and to perform the functions performed by the individual circuits shown in FIGS. 5 and 6 by a computer process. In this regard, the system would include a host computer, such as an IBM PC specifically programmed to generate, transmit and receive the various signals described in relation to the embodiments of FIGS. 5 and 6, and having a memory to store data to be outputted by or inputted to the host computer, the multiple computer receptacle device and a series of pen based computers. The pen based computers include a RAM (random access memory) card which may be programmed so that each pen based computer will generate, transmit and receive the signals described with respect to the embodiments shown in FIGS. 5 and 6, and include a memory for storing the incoming and outgoing data described previously. Accordingly, the electrical system of the present invention may function by using a main data gathering and dispatching circuit composed of discrete circuits or a host computer.

An alternative form of the system for transferring data between a host device and a plurality of pen based computers, formed in accordance with the present invention, will now be described with reference to FIGS. 8–11 of the drawings.

FIG. 8 is an alternative construction for the multiple computer receptacle device of the present invention. In the embodiment shown in FIG. 2, the multiple computer receptacle device 4 included a series of divider panels 22. In the construction shown in FIG. 8, the multiple computer receptacle device 4' omits the divider panels, the anti-friction strip members 42 and the L-shaped brackets 40, and now includes a top plate 350 and a bottom plate 352 mounted on the supporting frame 20 situated in the housing 14. Each of the top plate 350 and bottom plate 352 are formed from an anti-friction material, such as Teflon (TM) or Delrin (TM). The exposed surfaces of each of the top and bottom plates facing into the area of the multiple computer receptacle device 4' in which the pen based computers are housed include a series of spaced apart, parallel channels 354 or recesses formed therein. The channels 354 formed in the bottom plate 352 are opposite to and in alignment with corresponding channels 354 formed in the top plate 350 so that the top and bottom plates define a series of parallel slots for receiving pen based computers 12 in the same manner that the divider panels 22 do in the embodiment of the multiple computer receptacle device 4 shown in FIG. 2. The anti-friction material which the top and bottom plates are made of allows the pen based computers to slide easily into their respective slots in the multiple computer receptacle device. As in the previous embodiment, power and data connectors (not shown) are mounted on the inner back wall 26 of the multiple computer receptacle device within the slots defined by the channels of the top and bottom plates 350, 352 so as to mate with corresponding connectors mounted on the pen based computers 12.

The multiple computer receptacle device 4' further includes a series of light emitting diodes (LEDs) which are preferably positioned above the computer receiving slots of the multiple computer receptacle device 4' and mounted on the top portion of the front wall 356 of the device. Preferably, there are three different colored LEDs 358, 360, 362 situated above each slot, although it is envisioned to have a single LED or other indicator which may be controlled to display different colors.

In the preferred form of the multiple computer receptacle device 4', and as shown in FIG. 8 of the drawings, the three spaced apart LEDs above each slot include a red LED 358, a yellow LED 360 and a green LED 362. The LEDs are provided to inform the operator of the condition of the batteries in the pen based computers 12 and whether the data transferring operation is in progress or has been completed.

More specifically, the red LED 358, when lit, indicates that the data transfer operation is in progress. It effectively warns the operator not to remove the unit. When the red LED light 358 is off, this is an indication to the operator that the data transfer operation is over. In another preferred form of the invention, the red LED will flash on and off when the proper identification/password is not received, as will be described in greater detail.

The yellow LED 360 illuminates when the batteries of the pen based computers, mounted in their respective slots in the multiple computer receptacle device, are being discharged or recharged by the charging circuit 100 in the multiple computer receptacle device 4'. The yellow LED 360, when illuminated, thus indicates to the operator that he may remove the pen based computers from the multiple computer receptacle device 4' but that the batteries in the pen based computers may not be fully charged.

The green LED 362 illuminates when the batteries in the pen based computers are fully charged. This is an indication to the operator that the pen based computers may be removed and that they are fully charged and ready for use. The interconnection of the LEDs 358–362 to the circuitry used in the data transferring system of the present invention will be explained in greater detail.

In the previous embodiments described with respect to FIGS. 1–7, the system of the present invention included a host device or main data gathering and dispatching circuit which was at a remote location and separated from the multiple computer receptacle device and interconnected by a series of data cables. In the embodiment described with respect to FIGS. 8–11, it is envisioned that the host device or main data gathering and dispatching circuit may be incorporated into the multiple computer receptacle device 4'.

Figure 10:
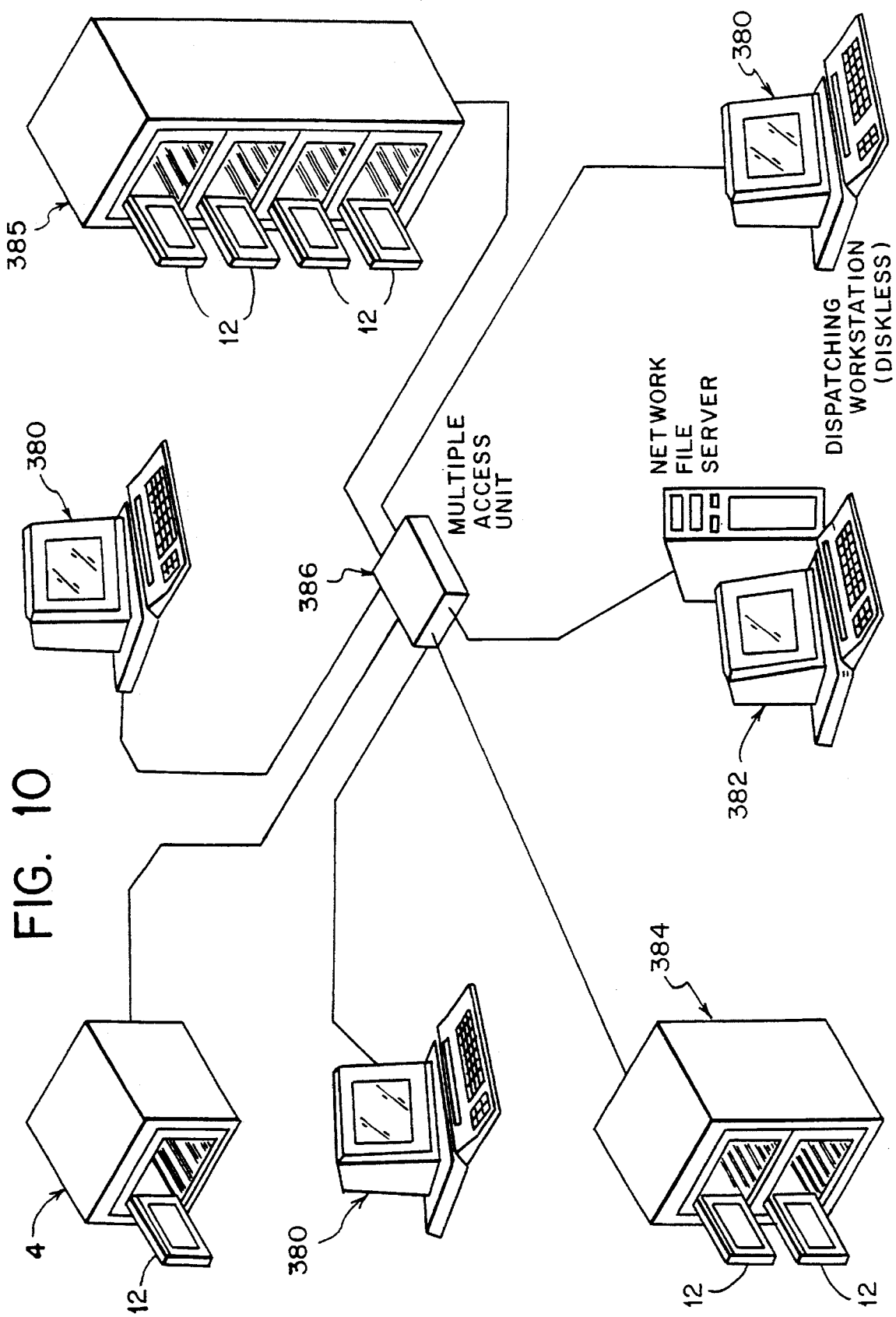
FIG. 10 is a pictorial illustration of an alternative form of an electrical system for transferring data between a plurality of pen based computers and other components, formed in accordance with the present invention.
Figure 11A:
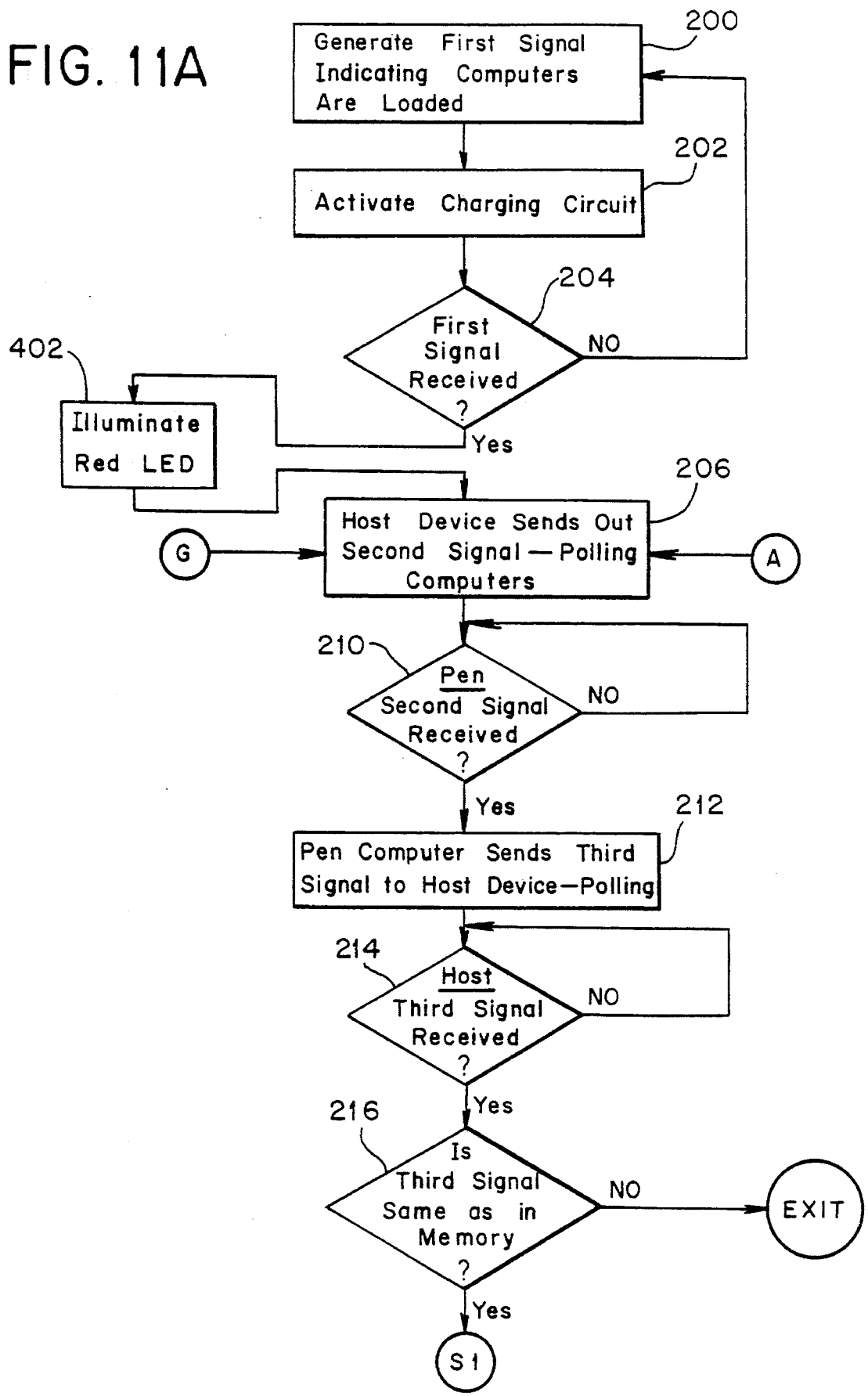
FIGS. 11a–11h are a flow chart illustrating the operation of an alternative form of the electrical system of the present invention.
Figure 11B:
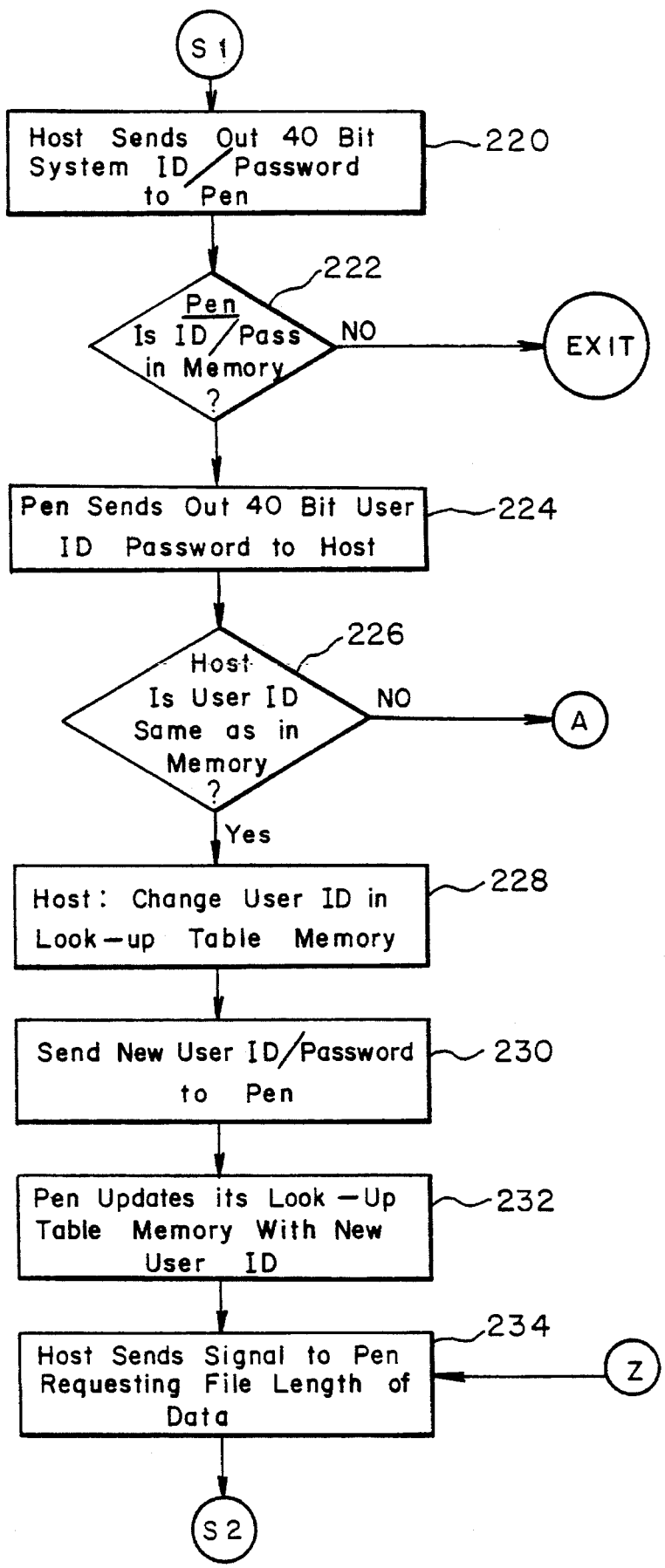
Figure 11C:
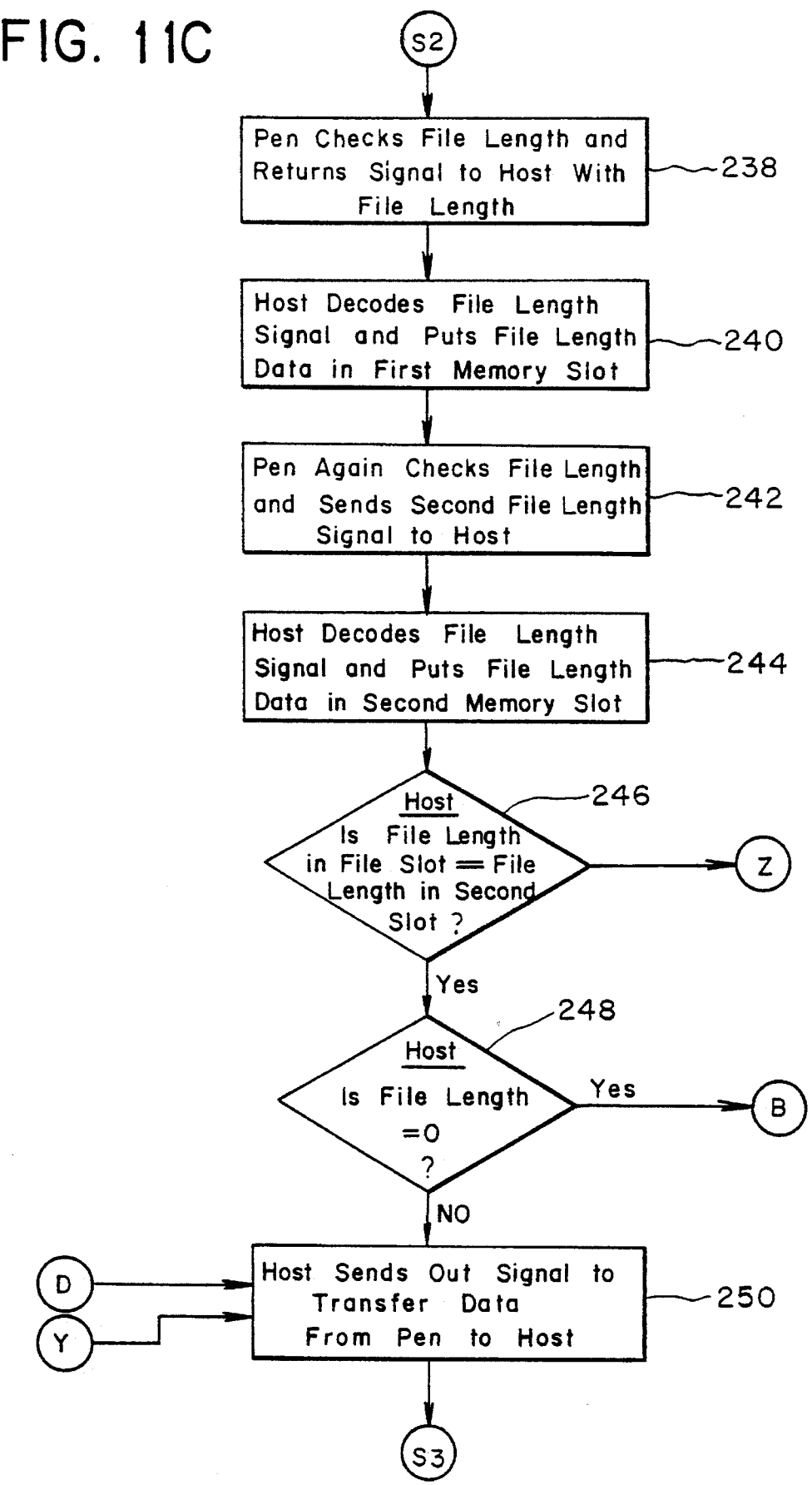
Figure 11D:
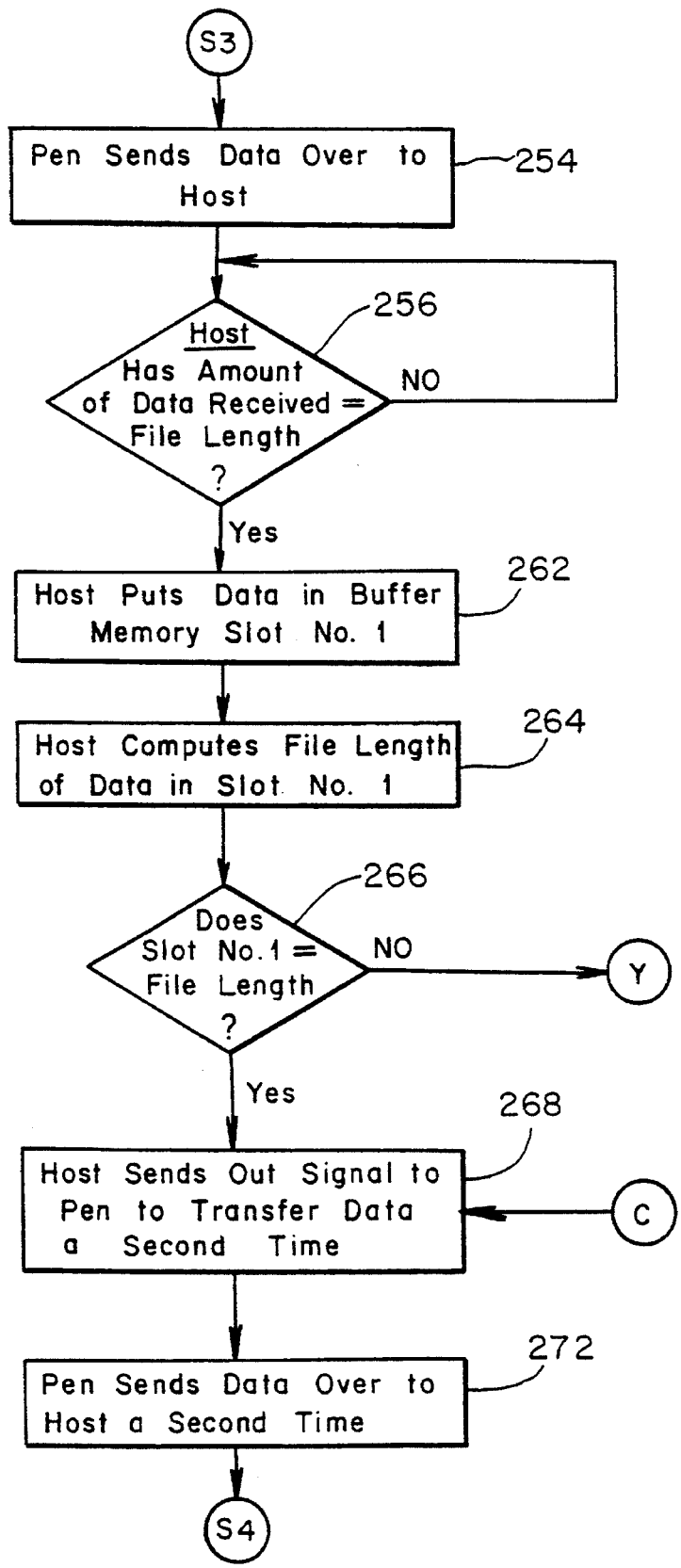
Figure 11E:
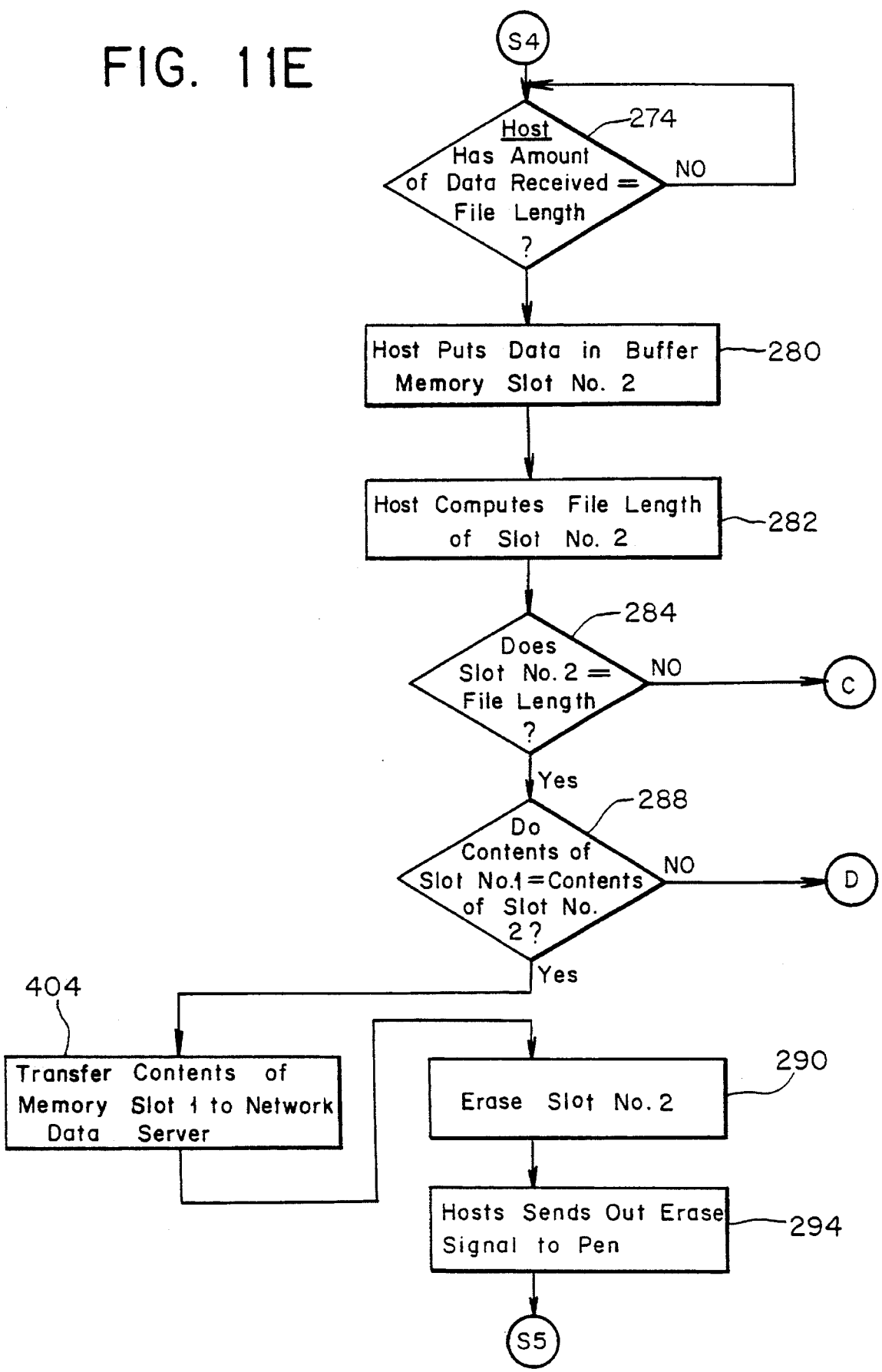
Figure 11F:
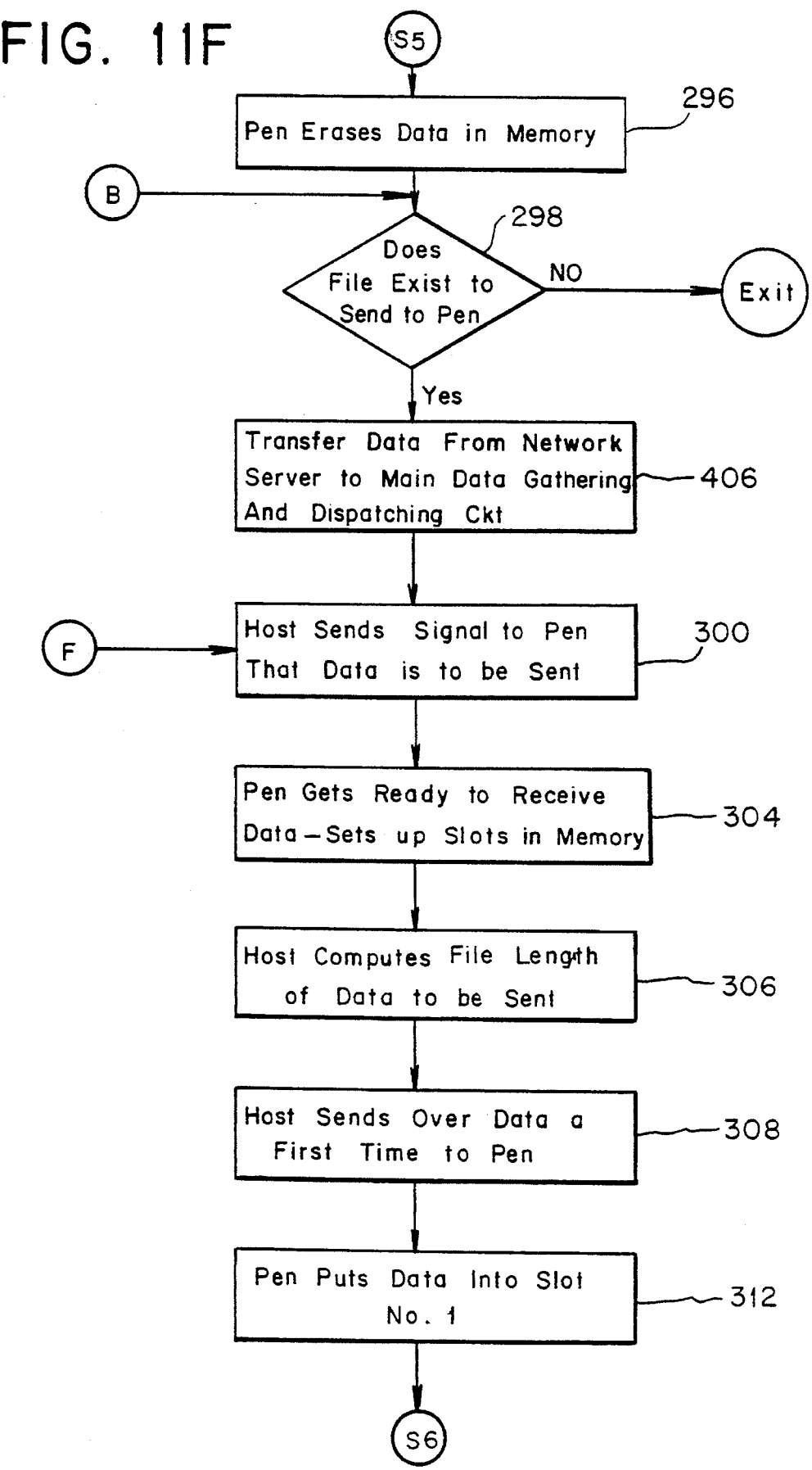
Figure 11G:
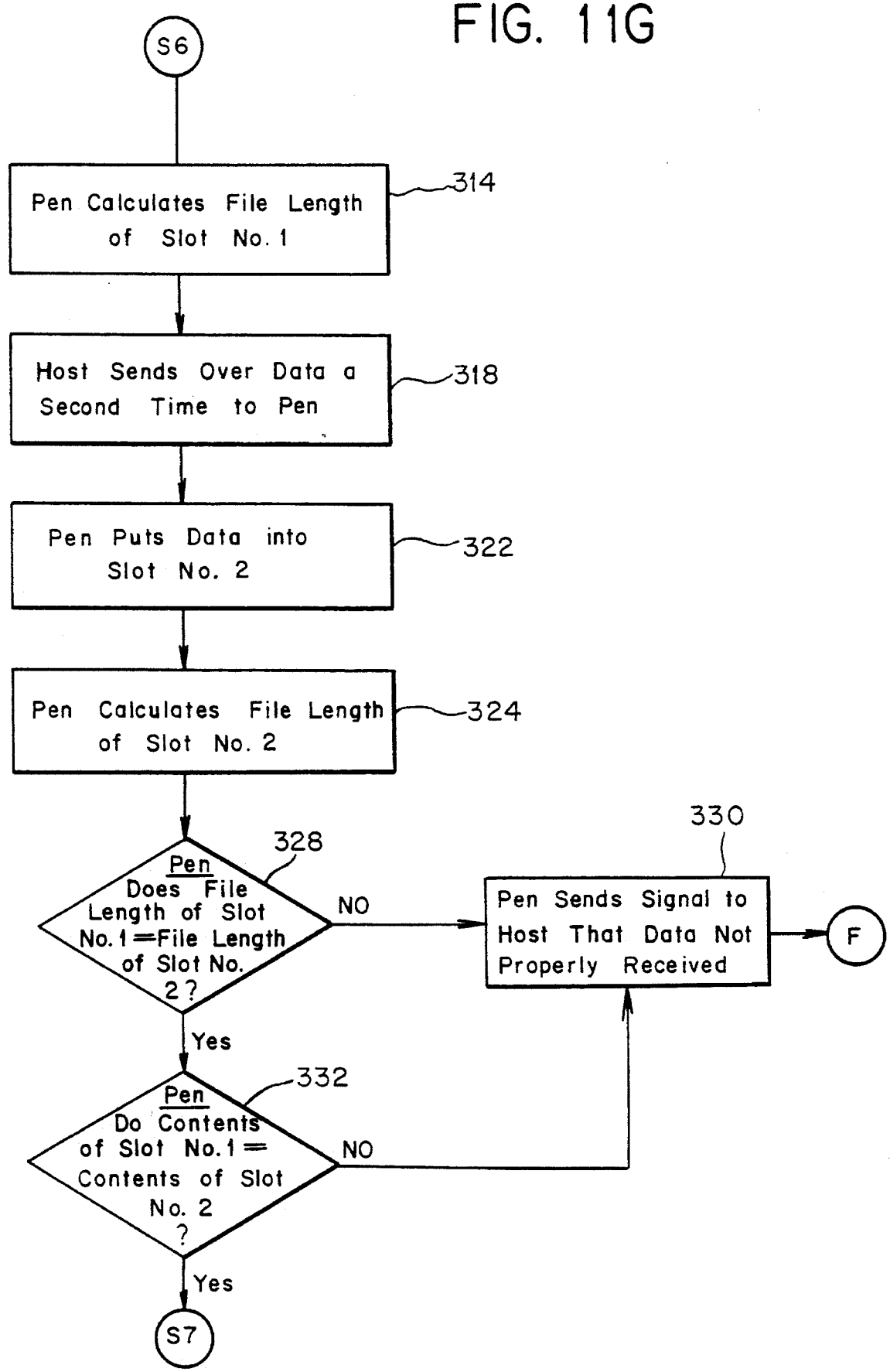
Figure 11H:
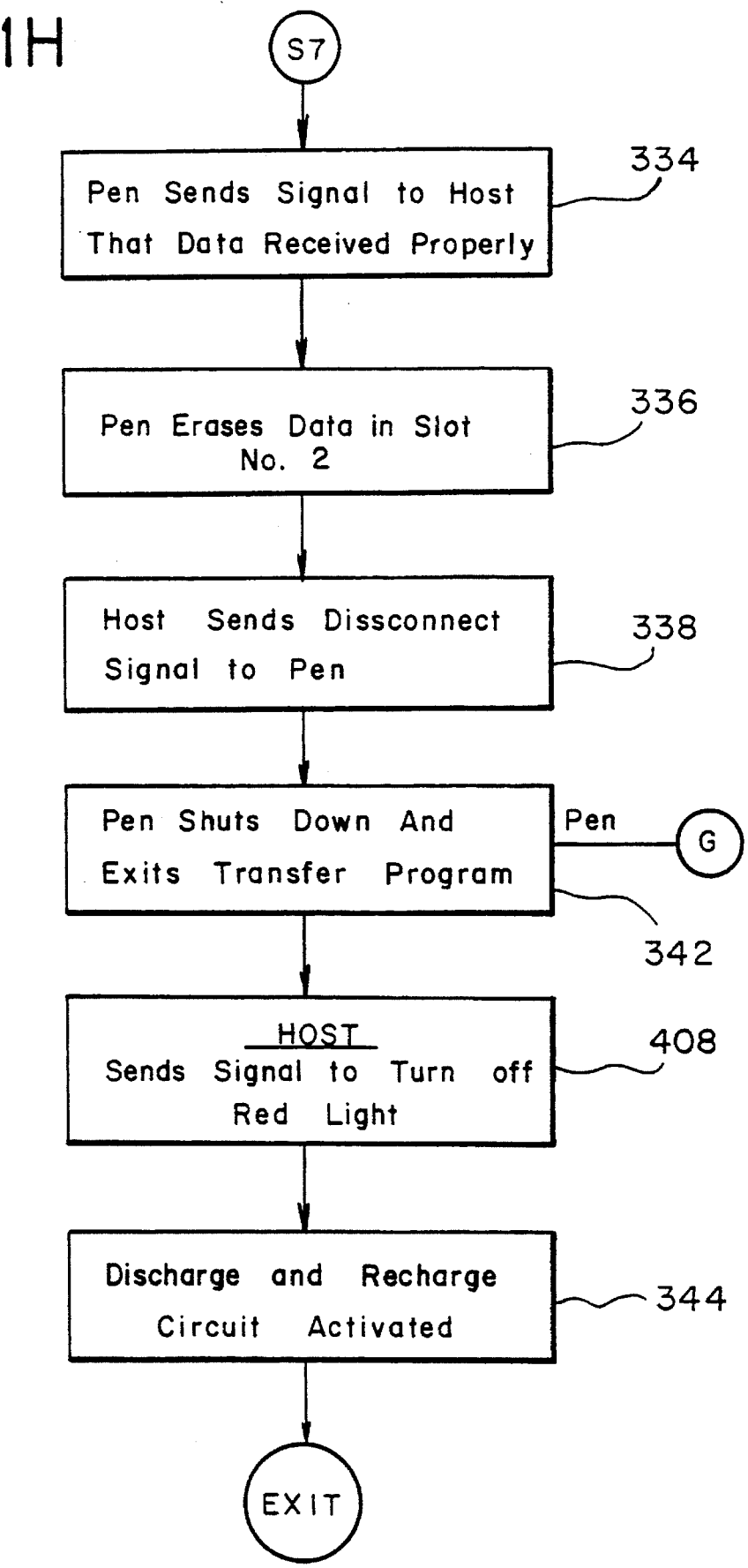

As illustrated by FIG. 8 of the drawings, the main data gathering and dispatching circuit 2 is mounted by sliding brackets 364 in the rear of the housing of the multiple computer receptacle device 4' and preferably below (although it is shown above) the printed circuit board containing the circuitry for the charge and discharge circuit 100. As will be explained in greater detail, the main data gathering and dispatching circuit 2 can interface with various other units and a dispatching work station, as shown in FIG. 10.

Figure 9:
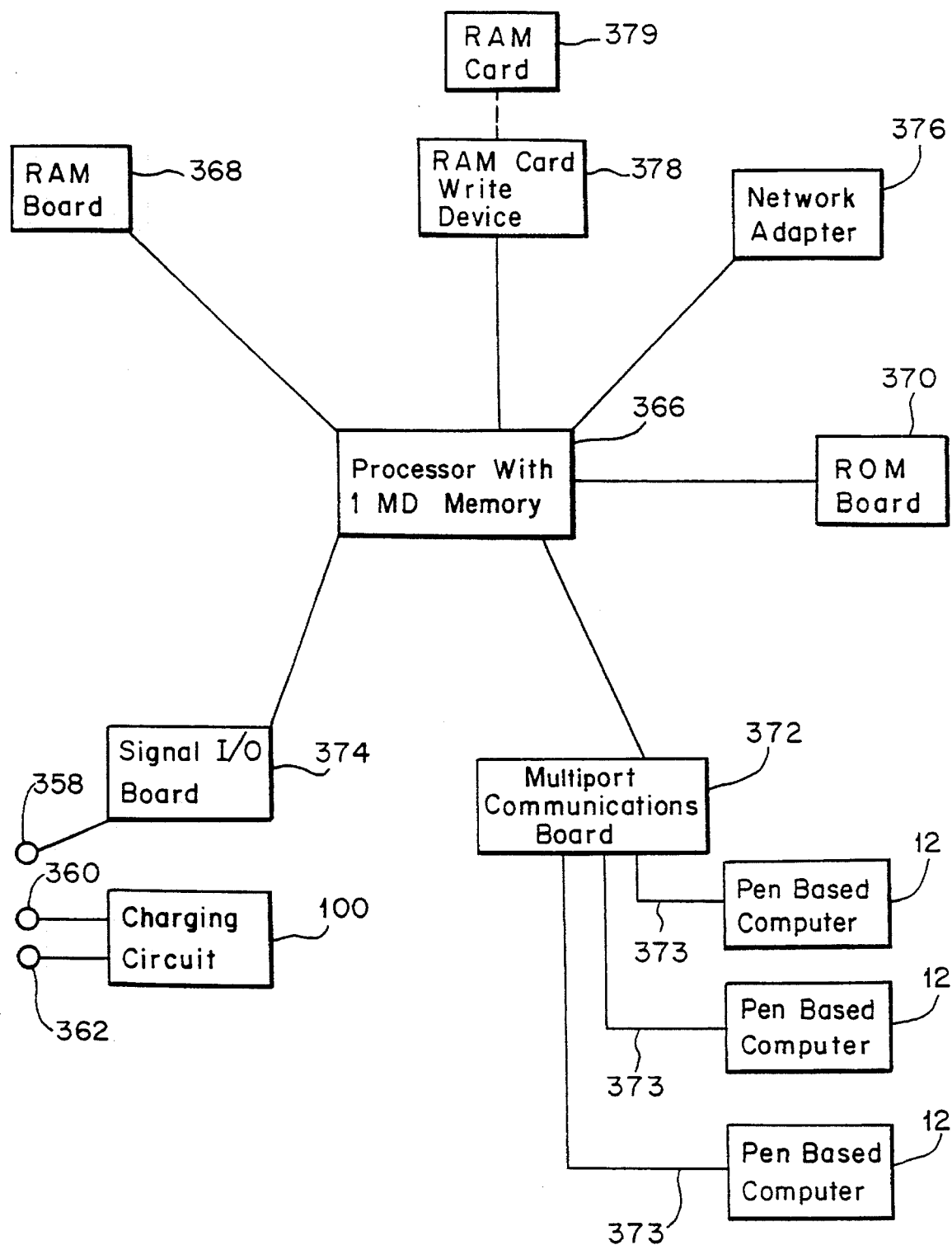
FIG. 9 is a block diagram of an alternative form of a main data gathering and dispatching circuit formed in accordance with the present invention.

The main data gathering and dispatching circuit 2 which is mounted in the multiple computer receptacle device 4' includes a number of components, as shown in block diagram form in FIG. 9. Basically, the circuit includes a processor 366 with preferably a one megabyte memory, which acts as a central processing unit (CPU). Part No. 80386 manufactured by Motorola Semiconductor Company is suitable for use as the processor.

Connected to the processor 366 is a random access memory (RAM) board 368 preferably having about 8 to about 10 megabytes of memory for command processing. The RAM board is where the data to be transferred from the pen based computers to the main data gathering and dispatching circuit, and visa versa, is stored. A suitable RAM board 368 (which includes Part No. 80386 mentioned above) for use in the present invention is Part No. PCA6130 manufactured by American Advantech Corp.

The main data gathering and dispatching circuit 2 further includes a read only memory (ROM) board 370. The ROM board 370 is connected to the processor 366, and stores the operational and communication software for operating the data transferring system of the present invention. A suitable ROM board for use in the present invention is Part No. PCD890 manufactured by American Advantech Corp.

Also included in the main data gathering and dispatching circuit is a multiport communication board 372. The multiport communication board 372 is connected to the processor 366, and is further connected to the pen based computers 12 by a series of data bus cables 373, which cables are interconnected to the data connectors 28 mounted on the inner rear panel 26 of the multiple computer receptacle device. A suitable multiport communication board for use in the present invention is Part No. PC/8 manufactured by Digiboard Inc.

A signal input/output (I/O) board 374 is also included. The signal input/output board 374 is connected between the processor 366, and the charging circuit 100 and the red LEDs 358. The red LED 358 is controlled at least in part by the signal I/O board, and the yellow and green LEDs 360,362 are controlled by the charging circuit, as will be described. A suitable signal I/O board 374 for use in the main data gathering and dispatching circuit of the present invention is Part No. P10-96 manufactured by Keithley Metrabyte Inc.

The main data gathering and dispatching circuit further includes a network adaptor 376. The network adaptor is connected to the processor 366, and is adapted to be connected to a network server or a multiple access unit, as will be described, by a single cable. The network adaptor 376 may be Part No. P1347 manufactured by Proteon Inc.

Optionally, the main data gathering and dispatching circuit may include a RAM card write device 378. The RAM card write device 378 is connected to the processor 366 and is adapted to receive a RAM card 379. The RAM card write device may be mounted on a side wall or on a rear wall of the multiple computer receptacle device, and include a slot for receiving the RAM card.

The RAM card 379, of course, contains a memory which is adapted to store the security identification codes, i.e., the password codes for access to the system which, in the embodiment of FIGS. 1–7, are stored in the memory of the host device. A suitable RAM card write device 378 for use in the main data gathering and dispatching circuit of the present invention is Part No. TCB101-02 manufactured by Databook Inc.

The main data gathering and dispatching circuit 4' in the embodiment of FIG. 9 interfaces with a number of units of the system, as illustrated by FIG. 10. It is envisioned that the system for transferring data includes a number of remotely located dispatching work stations 380 which are diskless. Data to be transferred to the pen based computers may be inputted to the main data gathering and dispatching circuit by the dispatching work stations 380. This data is stored in the RAM board 368 of the main data gathering and dispatching circuit and transferred to the pen based computers 12 during the transfer operation.

The system may further include a network file server 382, which stores data received from the main data gathering and dispatching circuit (which data was previously received from the pen based computers) and can be accessed by the operator to manipulate the data.

Additional multiple computer receptacle devices, such as a two tiered device 384 (having preferably 16 slots for receiving pen based computers) and a four tiered multiple computer receptacle device 385 (having preferably 32 computer receiving slots) may also be interconnected to the dispatching work stations 380 and the network file server 382. Each of the multiple computer receptacle devices communicates with the network file server and the dispatching work stations through a multiple access unit (MAU) 386.

The MAU 386 interconnects to the network adaptor 376 of each main data gathering and dispatching circuit mounted in the multiple computer receptacle devices by a single bus cable. A suitable MAU for use in the present invention is Part No. P2700 manufactured by Proteon Inc.

The operation of the main data gathering and dispatching circuit 4' of the embodiment shown in FIG. 9 is very similar to the operation of the host device or main data gathering and dispatching circuit shown in the embodiments of FIGS. 1–7. A flow chart of the operation of the system is illustrated by FIGS. 11a–11h. The functional blocks which are common to the flow charts of FIGS. 7a–7h are indicated with the same reference number. The basic difference between the two operations is that in the latter embodiment, the host device or main data gathering and dispatching circuit does not include a cathode ray tube (CRT) display of the operation of the system, and only the various colored LEDs 358–362 are used for advising the operator of the conditions of the system. Accordingly, Blocks 208, 218, 236, 252, 258, 260, 270, 276, 278, 286, 292, 302, 310, 316, 320, 326 and 340, which relate to updating the display screen, have been eliminated from the operational flow chart shown in FIG. 11. The other differences in the operation of the system shown in FIG. 11 will now be described.

When the first signal (indicating that the pen based computer is loaded into the receptacle device) is properly received (Block 204), the red LED 358 is illuminated (Block 402). As mentioned previously, the red LED 358 indicates that the data transferring operation is under way. The term "host" referred to in the operational flow chart corresponds to the main data gathering and dispatching circuit of the present invention, and the term "pen" refers to the various pen based computers 12 mounted in the slots of the multiple computer receptacle device.

After the data contained in memory slot no. 1 is compared to the data in memory slot no. 2 (Block 288) during the transfer of data from the pen based computers to the host device or main data gathering and dispatching circuit, the data in the main data gathering and dispatching circuit, and in particular in the RAM board memory, is transferred to the network data server (Block 404).

In the transfer of data from the main data gathering and dispatching circuit to the pen based computers, the main data gathering and dispatching circuit asks the network file server 382 whether a file exists to send to the pen based computer with which the main data gathering and dispatching circuit is communicating (Block 298). If a file does exist, then the data is transferred from the data server to the main data gathering and dispatching circuit and temporarily stored in the memory of the RAM board 368 of the circuit (Block 406). Operation then continues in the manner described previously with respect to the embodiments of FIGS. 1–7.

At the end of the data transferring operation, and after the pen based computer is shut down and exits the transfer program (Block 342), the main data gathering and dispatching circuit turns off the red LED (Block 408) to indicate that the data transferring operation has been completed, and the charge and discharge circuit 100 is then activated (Block 344).

In an alternative form of the invention, the host device may be activated to continuously poll the slots of the receptacle device (Block 206) without the first signal being generated (Block 200). If no pen based computer is mounted in the corresponding slot of the receptacle device, the host device will not receive a return signal and will continue to send out a polling signal. At the end of the data transfer operation, when the pen based computer is removed from the receptacle device, the host device will continue to poll that slot for another pen based computer.

Certain pen based computers 12, such as those manufactured by Grid Systems mentioned previously, include an internal diode which is coupled to the nickel-cadmium (Ni-cad) battery pack, which diode will prevent the Ni-cad batteries from discharging through an external circuit. Accordingly, it may be difficult for the charge and discharge circuit of the present invention to discharge such pen based computer models having a "discharge blocking" diode while the Ni-cad battery pack remains mounted in the pen based computer.

Figure 12:
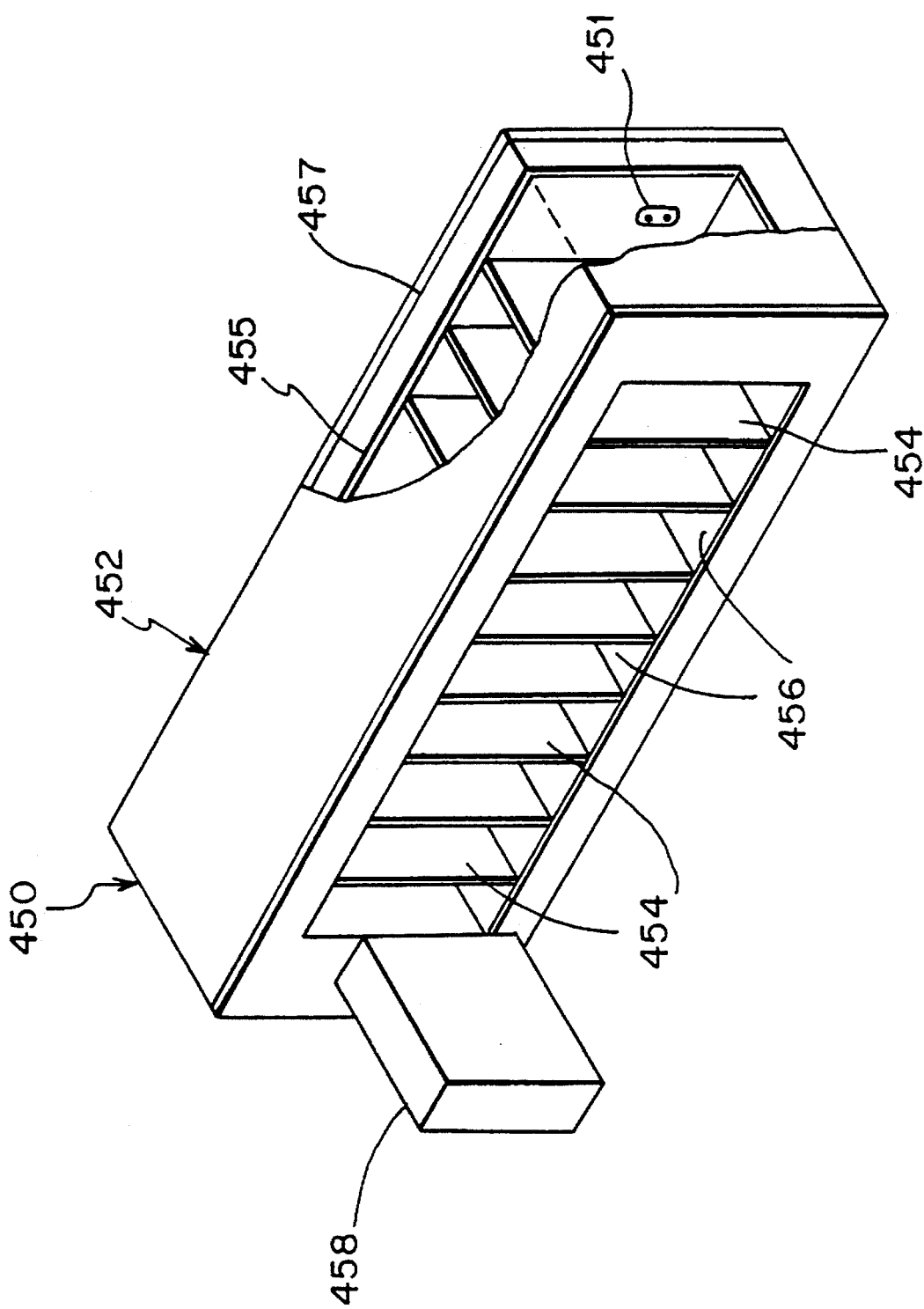
FIG. 12 is a perspective view of a battery pack charging rack formed in accordance with the present invention.

For this reason, and for other reasons, it may be desirable to include a separate battery pack charging rack 450, constructed in accordance with the present invention, for this purpose. One form of a battery pack charging rack is illustrated by FIG. 12 of the drawings.

The battery pack charging rack 450 is similar in construction in many respects to the multiple computer receptacle device 4. The battery pack discharge rack includes a housing 452 having a plurality of parallel, spaced apart divider panels 454, adjacent divider panels defining slots 456. Each slot is dimensioned to receive a respective battery pack 458 of a pen based computer.

An inner rear panel 455 is mounted perpendicularly to the rear edges of the divider panels 454, and has mounted on it a plurality of connectors 451 or contacts which are positioned between the divider panels and within the slots 456 so that they make an electrical connection with corresponding contacts of the battery packs mounted in the receiving slots, in much the same way as the pen based computers 12 are mounted in the slots 24 and make contact with the connectors of the multiple computer receptacle device 4.

The battery pack charging rack 450 also includes an outer rear panel 457, which is spaced apart from the inner rear panel to define a space in which circuitry, which will be described in greater detail, which interfaces with the battery packs mounted in the receiving slots 456 and with the multiple computer receptacle device, is situated.

Once the battery pack 458 is removed from the pen based computer and mounted in the battery pack charging rack 450, it may be freely discharged, as the discharge blocking diode remains in and is part of the circuitry of the pen based computer. The battery pack charging rack is coupled to the multiple computer receptacle device 4 and the charge and discharge circuit 100 mounted in the multiple computer receptacle device by a multi-wire cable.

FIG. 13 illustrates, in block diagram form, one form of the charge and discharge circuit 100 of the present invention. Basically, and as mentioned previously, the charge and discharge circuit includes a transformer and rectifier circuit 460, which provides an unregulated voltage of about 20 to about 25 volts. A regulator is also included, and will be discussed in greater detail, for providing regulated voltage to the various integrated circuits used in the charge and discharge circuit.

The charge and discharge circuit 100 further includes a constant current circuit 462, which provides a constant and regulated current to the battery module or pack 458 of the pen based computers.

The charge and discharge circuit further includes voltage sensing circuits 464 which are coupled to the battery module of the pen based computer, a high current discharge circuit 466, which is also coupled to the battery module to discharge the battery of the pen based computer, and a logic and control circuit 468 which is responsive to an external signal on a data bus from the main data gathering and discharge circuit or host device 2, or, alternatively, from the pushbutton switch 51 (or first signal generator 50) mounted on the multiple computer receptacle device 4. The logic and control circuitry 468 controls the high current discharge circuit 466 as well as the constant current circuit 462. The front panel indicators, (generally designated by reference number 469 in FIG. 13) on the multiple computer receptacle device, that is, the red, yellow and green LEDs 458–462, are also controlled by the logic and control circuit, and are provided with voltages from the transformer and rectifier circuit 460.

The transformer and rectifier circuit 460 is used in common for all of the pen based computers. However, each of the constant current circuit 462, voltage sensing circuits 464, logic and control circuit 468 and the high current discharge circuit 466 of the charge and discharge circuit, as well as a red, yellow and green front panel indicator, are duplicated for each pen based computer of the data transfer system. In other words, if the multiple computer receptacle device 4 is fashioned to accept eight pen based computers, then the charge and discharge circuit 100 will include one transformer and rectifier circuit 460 and eight high current discharge circuits 466, eight voltage sensing circuits 464, eight logic and control circuits 468 and eight constant current circuits 468. Thus, there will be eight data buses from the main data gathering and discharge circuit 2, each data bus controlling a respective logic and control circuit 468 corresponding to one of the pen based computers.

One form of a charge and discharge circuit 100 formed in accordance with the present invention is shown schematically in FIGS. 14A–14D. The actual values and part numbers of the components used in the electronic circuitry shown in FIGS. 14A–14D are for illustrative purposes only and to facilitate an understanding of the invention. However, alternative components, and values for these components, may be substituted by one skilled in the art to provide the same or similar results. The numbers positioned adjacent to the integrated circuits shown in FIGS. 14A–14D represent the pin numbers of the circuits.

The circuit includes a step-down transformer T1, having a center tapped secondary winding, which is connected to a pair of diodes CR1, CR2 to provide full wave rectification. A capacitor C1 is used for filtering. The transformer voltage provides an unregulated voltage of between 20 and 25 volts. The unregulated voltage is provided to a regulator VR1 whose output provides a regulated +15 volts.

The circuit described so far is only repeated once for all of the pen based computers or battery packs of the computers which are powered by the charge and discharge circuit. The remainder of the circuit to be described is repeated for each of the pen based computers received by the multiple computer receptacle device and powered by the charge and discharge circuit.

The charge and discharge circuit 100 includes a constant current circuit 462 for charging the battery pack of a respective pen based computer. The constant current circuit 462 is formed from the combination of transistor Q101, transistor Q102, switch transistor Q103, green LED diode CR101 and series resistor R101. The constant current source is controlled by a first voltage comparator U101B.

More specifically, the inverting input of comparator U101B is connected to the positive side of the pen based computer battery. The negative side is grounded. When the battery of the pen based computer is fully charged, its voltage will be approximately 17 volts. Accordingly, comparator U101B will sense when the voltage falls below 17 volts. The non-inverting input of comparator U101B is connected to a 17 volt zener diode CR105 which is biased on through resistor R113 connected to the +20 volt supply voltage. If, for instance, the voltage on the battery falls to 16 volts, the output of comparator of U101B (which is preferably an open-collector output) will be at a high logic level, pulled up by the +15 volt regulated voltage through pull-up resistor R109. Through resistor R109 and base resistor R110, switch transistor Q103 will be turned on. Transistor Q103 has its collector connected to the base of transistor Q102 through resistor R103 and, when transistor Q103 is turned on, transistor Q102 will be forward biased which, in turn, will turn on transistor Q101 which is connected in a common base configuration with its base connected to the collector of transistor Q102 through resistor R102.

LED CR101 is connected between the base of transistor Q101 and the positive side of the pen based computer battery, and emitter resistor R101 is connected between the emitter of transistor Q101 and the positive side of the battery. LED CR101 provides a 2 volt reference voltage, and also provides an internal indication, for test purposes, of whether the constant current source is operating properly. Assuming that the base-emitter voltage drop of transistor Q101 is 0.7 volts, and that the voltage drop across LED CR101 is 2 volts, then 1.3 volts will be dropped across resistor R101. The value of resistor R101 is chosen to allow a certain amount of current to flow from the constant current source to the battery. If, for example, resistor R101 is chosen to have a value of 10 ohms, then the current flowing from the constant current source is 130 milliamps.

130 milliamps is chosen to be the preferred current for charging the battery. 30 milliamps will be used for running the circuit of the pen based computer during the data transfer operation, and 100 milliamps is, for certain pen based computer models such as those manufactured by Grid Systems Corporation, the recommended maximum charging current for the battery pack used in the computer. Accordingly, when the pen based computers are mounted in the multiple computer receptacle device, the constant current source of the charge and discharge circuit will not only power the unit but also charge the batteries during the data transfer operation and after the operation has been completed.

When the pen based computer battery has been charged to over 17 volts, the output of comparator U101B will go to a low logic level, cutting off switch transistor Q103. This, in turn, will cut off transistor Q102 and transistor Q101, so that current will no longer be provided by the constant current source to the battery. When the voltage on the battery falls slightly below the 17 volt level, comparator U101B will pulse the constant current source on again until the battery voltage again rises to greater than 17 volts. This pulsing or "burbing" of current to the battery will maintain the battery in a fully charged condition.

The charge and discharge circuit is preferably controlled by the main data gathering and dispatching circuit or host device 2 of the present invention. For this purpose, a data bus is provided to the charge and discharge circuit from the main data gathering and dispatching circuit. A signal from the main data gathering and dispatching circuit is provided to each of the logic and control circuits 468 of the charge and discharge circuit for each pen based computer which is mountable in the multiple computer receptacle device 4.

Two time-separated pulses on the bus input control the operation of the charge and discharge circuit. The first pulse is provided through a pair of series connected NAND gates U105A and U105B, configured as inverters and having pull-up resistors R129 and R130, which gates are provided for making the TTL bus input compatible with the CMOS logic preferably used in the circuit, to the inputs of NAND gate U103B configured as an inverter, whose output is provided to the Set input of RS flip-flop U102B. The Q output of flip-flop U102B was, previous to the first pulse, at a low logic level, which level is provided to one input of NAND gate U103A through resistor R117, thereby blocking the first pulse from passing through NAND gate U103A (the output of gate U103A will be at a high logic level).

When flip-flop U102B is set, the Q output will go to a high logic level. This level will be delayed in being provided to the input of gate U103A by passing through the delaying circuit comprising resistor R117 and capacitor C101. Either the pulse width of the first pulse on the bus input or the time constant of the delaying circuit is selected such that the first pulse has ended before the input to gate U103A has gone to a high logic level, enabling the gate.

The Q output of flip-flop U102B is connected to the base of transistor Q109 through base resistor R116. With a high logic level on the Q output of flip-flop U102B, transistor Q109 is turned on to allow current to flow from the 15 volt regulated supply through series resistor R122 and through red LED FP LED1 (i.e., front panel LED1). LED FP LED1 is the red LED indicator 358 mounted on the front panel above the corresponding pen based computer receiving slot on the multiple computer receptacle device which was discussed previously, and is connected to the circuit through connector pins J103-1 and J103-6. The red LED is illuminated when a data transfer operation is underway.

As mentioned previously, in a preferred form of the invention, the red LED 358 will flash on and off when the proper identification/password is not received. For this purpose, integrated circuit U104 is provided. Circuit U104 is a conventional 555 timer configured for a stable operation and whose output (Pin 3) is connected to the base of transistor Q109 through resistor R126. The threshold and discharge inputs (Pins 6 and 7) of timer U104 are connected to the resistors R127 and R128 and capacitor C102, all of which are connected in series, which determine the periodicity of the timer's output signal. Diode CR106 is connected in parallel with resistor R128 and is included to provide the output signal with a 50% duty cycle.

An ERROR DATA IN signal from the host device is provided to the Set input of flip flop U102D through a NAND gate U105C configured as an inverter and having a pull-up resistor R131. When an invalid identification code or password is received by the host device from the pen based computer, a high logic level pulse is received on the ERROR DATA IN input, which sets flip-flop U102D so that its Q output goes to a high logic level. The Q output is connected to the Reset input (Pin 4) of timer U104. When the Q output is at a high logic level, timer U104 is enabled. The positive pulses on the timer's output will turn transistor Q109 on, causing the red LED 358 (FP LED1) situated above the pen based computer which is sending the invalid code to flash.

The output of gate U103B is connected to the Reset input of flip flop U102D. Thus, when the first pulse is received on the bus input, signifying the beginning of the data dump operation, flip-flop U102D will be reset.

When the data transfer operation has been completed, a second pulse is provided to the bus input of the charge and discharge circuit corresponding to a particular pen based computer. The second pulse is provided to the other input of NAND gate U103A, which had been previously enabled when flip-flop U102B was set, which provides a low logic level on the output of the gate. The output of gate U103A is provided to the Reset input of flip-flop U102B through resistor R125, which causes the Q output of flip-flop U102B to go to a low logic level. The low logic level cuts off transistor Q109 and shuts off the red LED FP LED1, indicating that the data transfer operation for this particular pen based computer has been completed. The output of gate U103A is also provided to the Set input of flip-flop U102A, whose Q output goes to a high logic level. The Q output controls the high current discharge circuit 466 of the charge and discharge circuit 100.

More specifically, the Q output of flip-flop U102A is provided to the base of transistor Q108. The high logic level turns on transistor Q108, whose collector is connected to +15 volts through resistor R107. Transistor Q104 has its base connected to the collector of transistor Q108 through base resistor R111 and thus is controlled by transistor Q108. When transistor Q108 turns on, transistor Q104 turns off. The collector of transistor Q104 is connected to the +20 volt supply through resistor R105 and to the cathode of a 5 volt zener diode CR102. The anode of diode CR102 is connected to the base of transistor Q105 and to a yellow LED CR104. The collector of transistor Q105 is connected to the positive terminal of the pen based computer battery, and its emitter is connected to ground through emitter resistor R112. The cathode of LED CR104 and the emitter of transistor Q104 are also connected to ground.

Figure 14A:
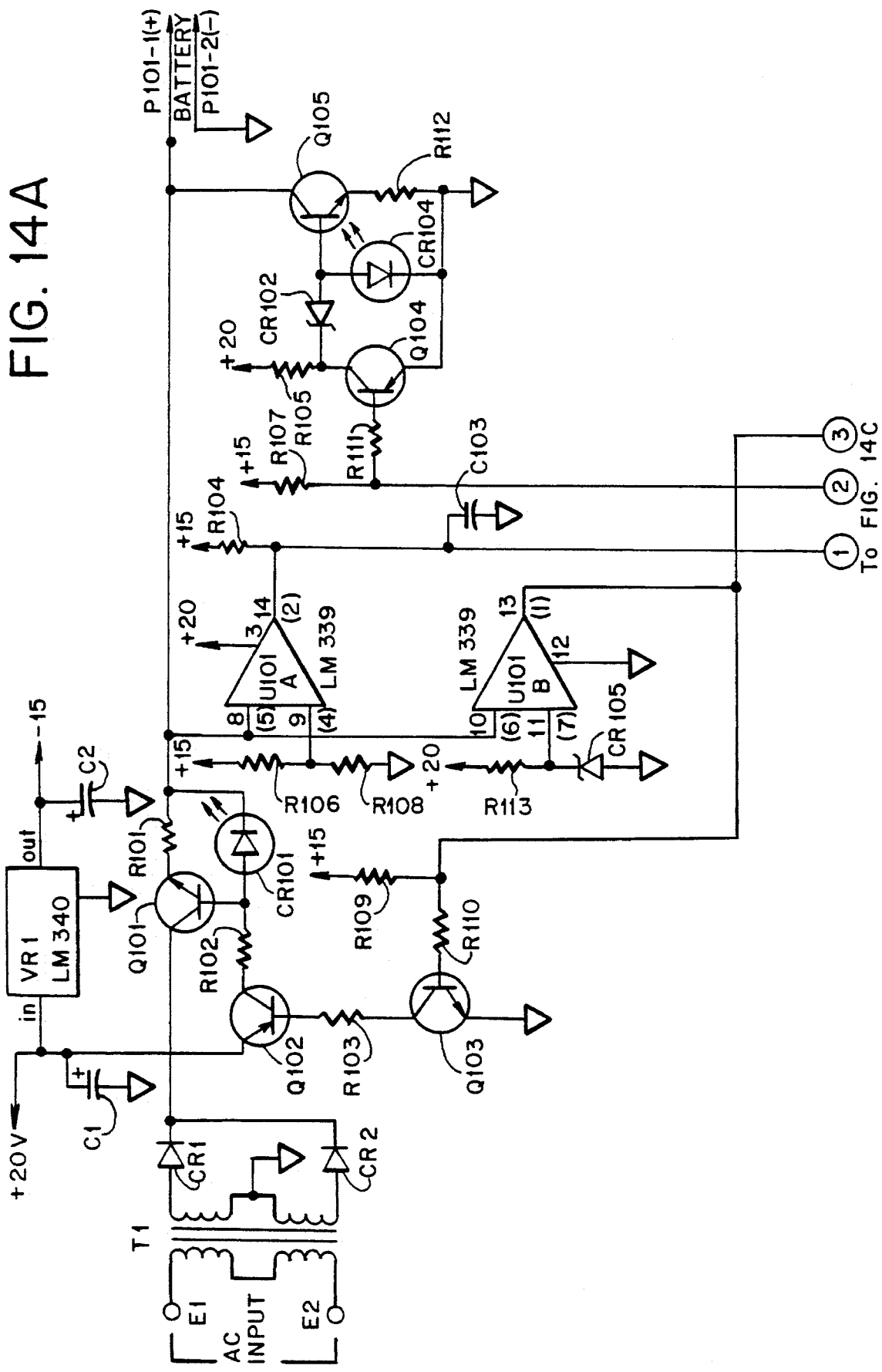
FIGS. 14A–14D are a schematic diagram of the charge and discharge circuit shown in block diagram form in FIG. 13.

As can be seen from the above description and as shown in FIG. 14A, the high current discharge circuit 466 is very similar in structure to the constant current circuit 462 supplying current to the battery. When flip-flop U102A is set, transistor Q108 is turned on which, in turn, turns off transistor Q104. This forward biases transistor Q105 so that current will be quickly drawn from the battery of the pen based computer through transistor Q105 and through emitter resistor R112 to ground. LED CR104 sets up a 2 volt reference voltage between the base of transistor Q105 and ground. Assuming that there is a 0.7 volt base-emitter voltage drop across transistor Q105, then the voltage across resistor R112 will be 1.3 volts. The value of resistor R112 is selected to allow a particular constant current to be drawn from the battery through transistor Q105. If resistor R112 is selected to be 1 ohm, then current will be drawn from the battery (and also from the constant current circuit which remains on) at a constant rate of 1.3 amps, quickly discharging the battery to a particular level.

A second voltage sensing circuit senses the voltage on the battery of the pen based computer. This second voltage sensing circuit includes comparator U101A. The non-inverting input of comparator U101A is coupled to the positive terminal of the battery of the pen based computer. The inverting input is connected to a resistor divider network comprised of resistor R106 and resistor R108. The values of resistors R106 and R108 are selected to provide a 10 volt level on the inverting input of comparator U101A.

When the voltage on the battery is above 10 volts, the output of comparator U101A will be at a high logic level. When the voltage on the battery falls to below a 10 volt level, the output of comparator U101A will go to a low logic level.

The output of comparator U101A, which is connected to resistor R104 to +15 volts and to capacitor C103 to ground, is provided to the Reset input of flip-flop U102A. The low logic level will reset flip-flop U102A so that its Q output will go to a low logic level. The low logic level on the Q output will cut off transistor Q108 which, in turn, will turn on transistor Q104. As a result, transistor Q105 will be cut off so that no more current is drained through transistor Q105 from the battery of the pen based computer. Since no current is being drawn from the battery of the pen based computer, it will now begin to recharge due to the current provided to it by the constant current circuit 462.

As mentioned previously, the second pulse received on the bus input will pass through NAND gate U103A. The output of gate U103A is provided to the reset input of flip-flop U102C, which input is also connected to capacitor C104 to ground. The low level on the output of gate U103A will ensure that flip-flop U102C is reset and that its Q output is at a low logic level. The Q output of flip-flop U102C is connected to the base of transistor Q106 through base resistor R124. The emitter of transistor Q106 is connected to the collector of transistor Q110, and the collector transistor Q106 is connected to LED FP LED3 (i.e., front panel LED3) through connectors J103-3,8, which is the green LED 362 which, when illuminated, indicates that the battery of the pen based computer has been completely recharged. LED FP LED3 is connected to +15 volts through a series resistor R114. The base of transistor Q110 is connected through resistor R121 to the anode of red LED FP LED1, and the emitter is grounded.

When the battery has been recharged so that its voltage is greater than 17 volts, the output of comparator U101B goes to a low logic level, which sets flip-flop U102C. The Q output of flip-flop U102C goes to a high level and turns on transistor Q106. If the red LED FP LED1 is off, the voltage provided to the base of transistor Q110 will be high enough to turn on transistor Q110 so that current is conducted through LED FP LED3 to illuminate the LED.

As mentioned previously, a third LED 360, which is preferably yellow, is also mounted on the front panel of the multiple computer receptacle device 4. The yellow LED, when illuminated, indicates that the data transfer operation is completed but that the battery of the pen based computer may not be in a fully charged state. For this purpose, LED FP LED2 is provided. LED FP LED2 is connected through connector J103-7,2 to +15 volts through a series resistor R120 and to the collector of transistor Q107, whose emitter is connected to ground. The base of transistor Q107 is connected to the output of a NAND gate U103D, functioning as an inverter, through a base resistor R119. The inputs of NAND gate U103D are connected together and to the output of NAND gate U103C having one input which is connected to the anode of green LED FP LED3 and having its other input connected to the anode of red LED FP LED1. Connected in this manner, the yellow front panel LED 360 will only light when both the red LED 358 and the green LED 362 are off.

In another preferred form of the invention, the multiple computer receptical device may include a plurality of switches SW101, one switch for each pen based computer charging circuit. The switches SW101 are preferably mounted on the front panel of the receptacle device above or below each receiving slot. As shown in FIG. 14A, the switch SW101 is a single pole, single throw push button switch. One pole is grounded, and the other pole is connected to the reset inputs of flip-flops U102B and U102C and the set input of U102A. Switch SW101 is provided when it is desired to use the multiple computer receptacle device to just charge the batteries of the pen based computers received in the slots while bypassing the data dump operation. When switch SW101 is pressed, flip-flops U102B and U102C are reset and flip-flop U102A is set. This will energize the high current discharge circuit, and the circuit 100 shown in FIG. 14A will discharge and recharge the battery of the respective pen based computer as if the data dump operation has been completed.

Figure 14B:
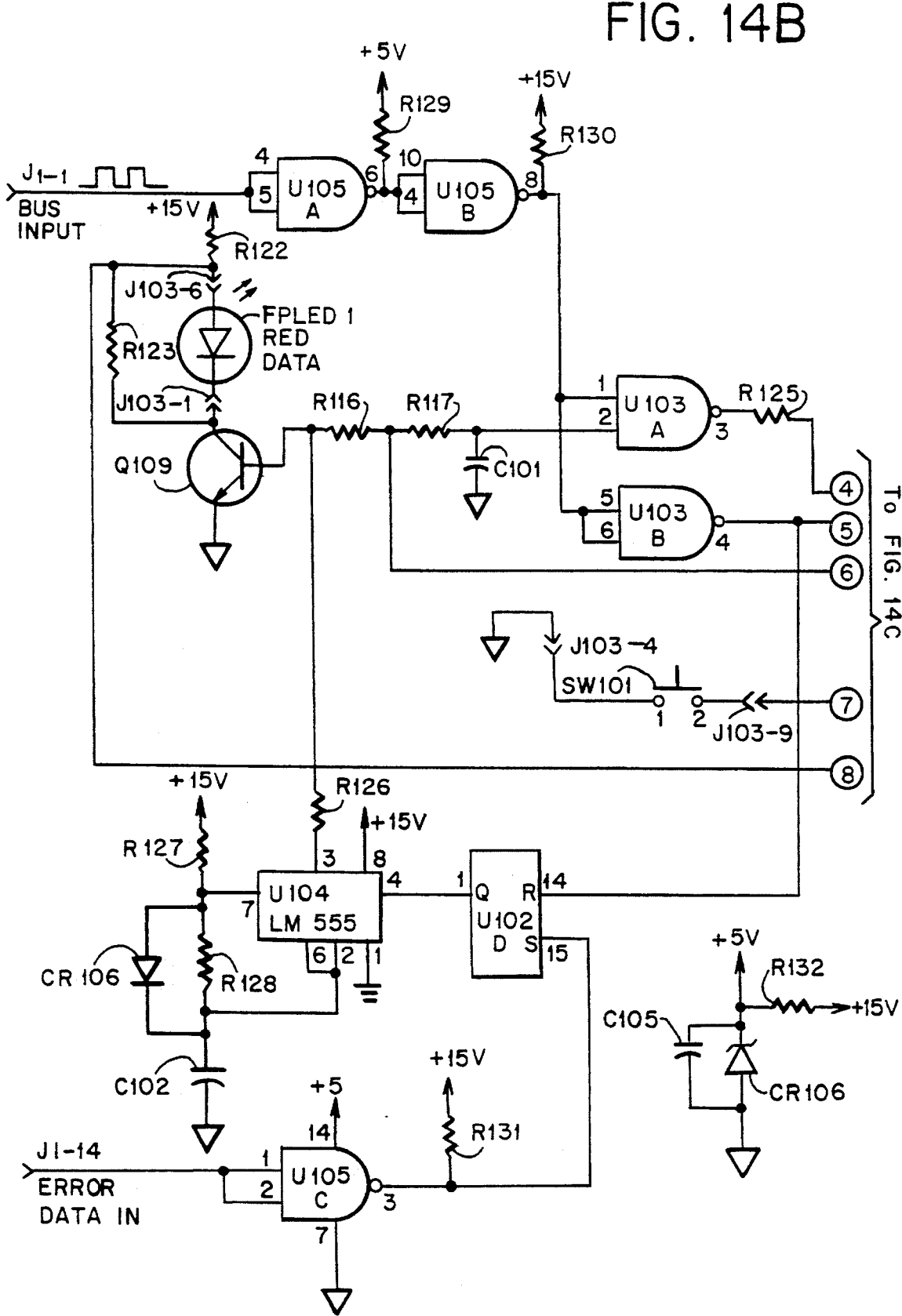
Figure 14C:
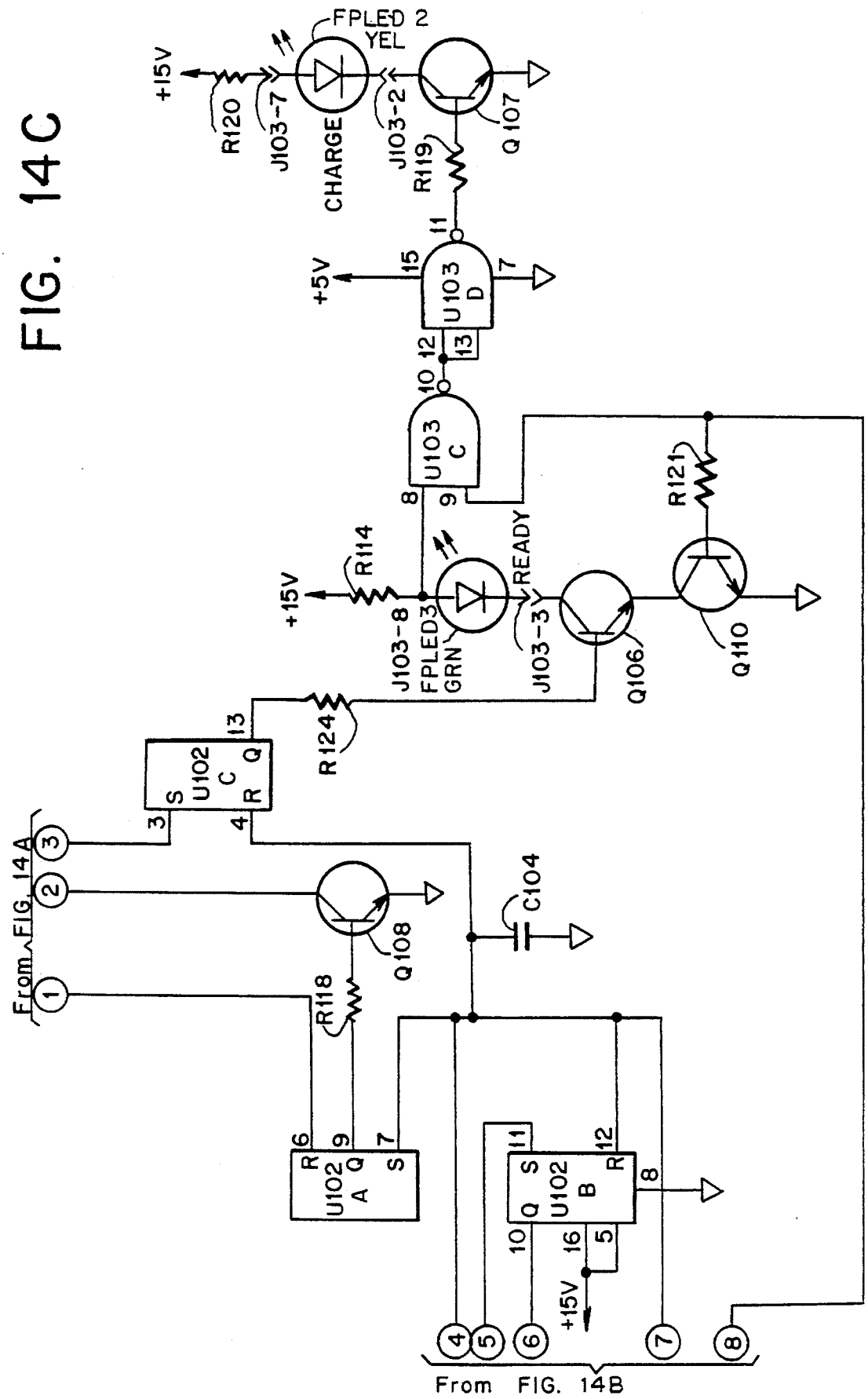

Also shown in FIGS. 14A–14C is a power supply circuit including a 5.1 volt zener diode CR106 coupled between ground and one end of resistor R132, whose other end is connected to +15 volts, and a capacitor C105 connected in parallel with diode CR106. The power supply circuit provides a +5 volt supply to those integrated circuits requiring this voltage.

The positive and negative (ground) outputs of the charge and discharge circuit 100 for each pen based computer are provided on connectors P101-1 and P101-2, respectively. If no battery pack charging rack 450 is included in the system, then the eight pair of connectors P101-1 and P101-2 are connected to respective power connectors of the multiple computer receptacle device.

Figure 14D:
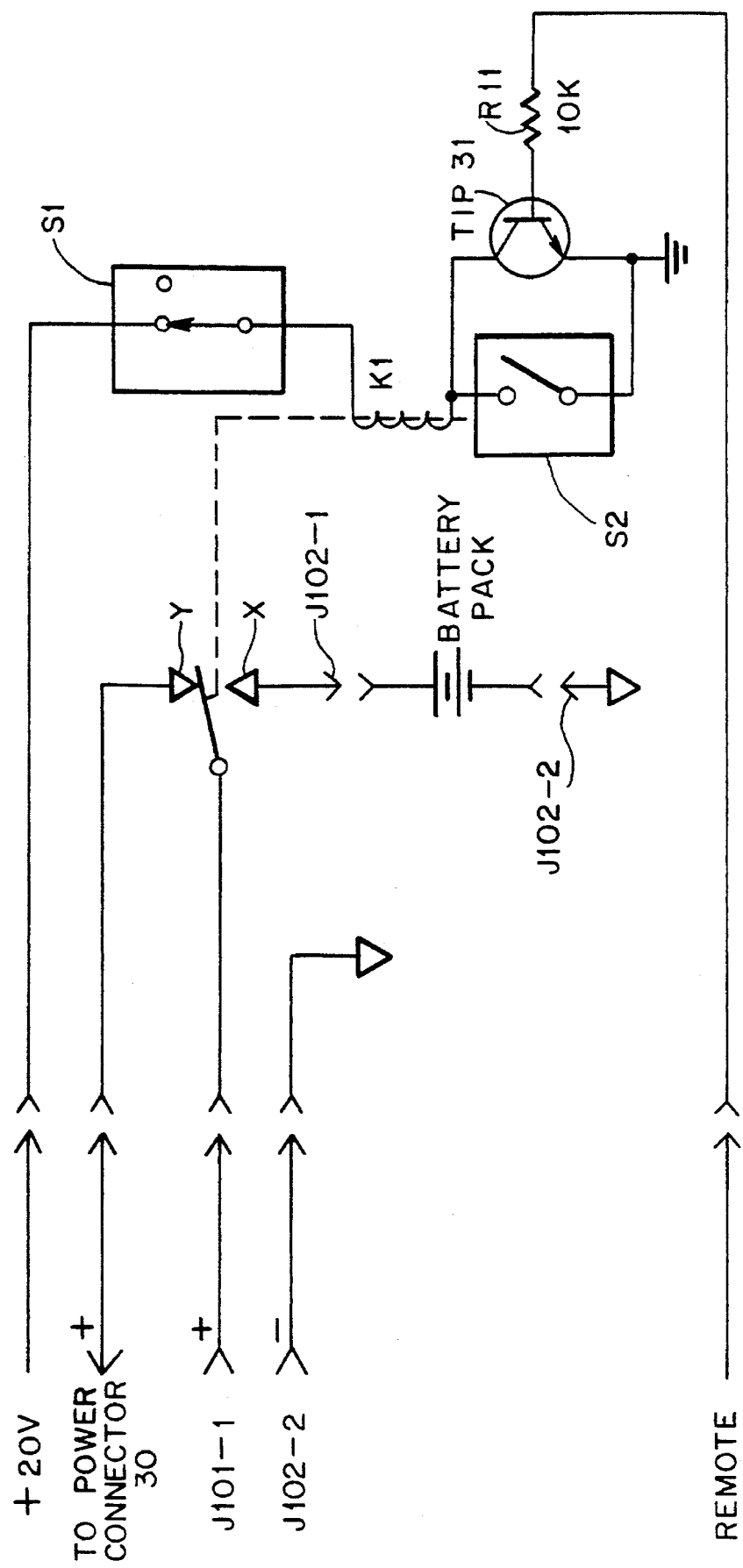

If the battery pack charging rack 450 is to be incorporated in the system, then preferably the positive and ground outputs of the charge and discharge circuit 100 are provided on connector P101-1 and P101-2, respectively, which mates with corresponding connector J101-1 and J101-2, respectively, of the battery pack charging rack 450, as shown in FIG. 14D, which connectors are repeated for each of the batteries capable of being received by the battery pack charging rack. The positive voltage is connected to the wiper of a relay K1, which switches between two relay contacts, one contact X being provided to the positive terminal or contact of the connector J102-1 which mates with the battery pack received by the battery pack charging rack, and the other contact Y being returned to the multiple computer receptacle device 4 through an appropriate cable and provided to the positive terminal of the power connector 30 mounted on the inner rear panel of the multiple computer receptacle device for that respective pen based computer.

As mentioned above, the battery pack charging rack 450 includes a plurality of relays K1, one relay associated with each battery pack capable of being received by the charging rack. One terminal of the relay's coil is connected to the collector of a transistor TIP31, and the other terminal is connected to the wiper of a single pole, single or double throw switch S1, as will be described. The base of the transistor TIP31 is connected through a base resistor R11 to a data line provided to the battery pack charging rack from the main data gathering and dispatching circuit or host device.

The main data gathering and dispatching circuit may provide a REMOTE signal on the data line to transistor TIP31 situated in the battery pack charging rack. Transistor TIP31 has its emitter grounded. The remote signal will turn on transistor TIP31. One pole of switch S1 is connected to a +20 volt source, and the wiper of switch S1 is connected to the other terminal of the coil of relay K1. When transistor TIP31 is turned on by the remote signal, the relay coil is energized, causing the current provided on J101-1 from the constant current circuit 462 to be provided to the battery pack situated in the battery pack charging rack 450. If no remote signal is provided, transistor TIP31 is cut off so that no current flows through the coil of relay K1. Under such circumstances, the constant current provided on connector J101-1 will be returned through the relay contacts to the battery pack which remains in the pen based computer situated in the receiving slots of the multiple computer receptacle device 4.

As mentioned previously, a plurality of switches S1 may be provided, one switch S1 for each receiving slot of the battery pack charging rack 450. Switch S1 is, effectively, an override switch so that if a remote signal is provided by the main data gathering and dispatching circuit, the connection between relay K1 and the +20 volt source may be broken so that current is routed through the contacts of the relay back to the battery pack remaining in the pen based computer.

Alternatively, an additional switch S2 may be provided for each receiving slot of the battery pack charging rack. Switch S2 is a single pole, single throw switch which is positioned between ground and the collector of transistor TIP31. Accordingly, if no remote signal is received by the main data gathering and dispatching circuit, switch S2 may be activated while switch S1 is in the proper position to provide power to the coil of relay K1 to energize relay K1 and to cause current from the constant current circuit to flow into the battery pack removed from the pen based computer and situated in a respective receiving slot of the battery pack charging rack 450. Although not shown in FIG. 12, switches S1 and S2 may be mounted on the front panel of the battery pack charging rack 450 above and below their respective slots.

Another alternative form of the multiple computer receptacle device of the present invention is illustrated by FIGS. 15 through 21A–C. One of the advantages of this alternative embodiment is its modularity which allows it to be quickly and readily adaptable for use with different sized and electrically configured pen based computers of various manufacturers.

Figure 15:
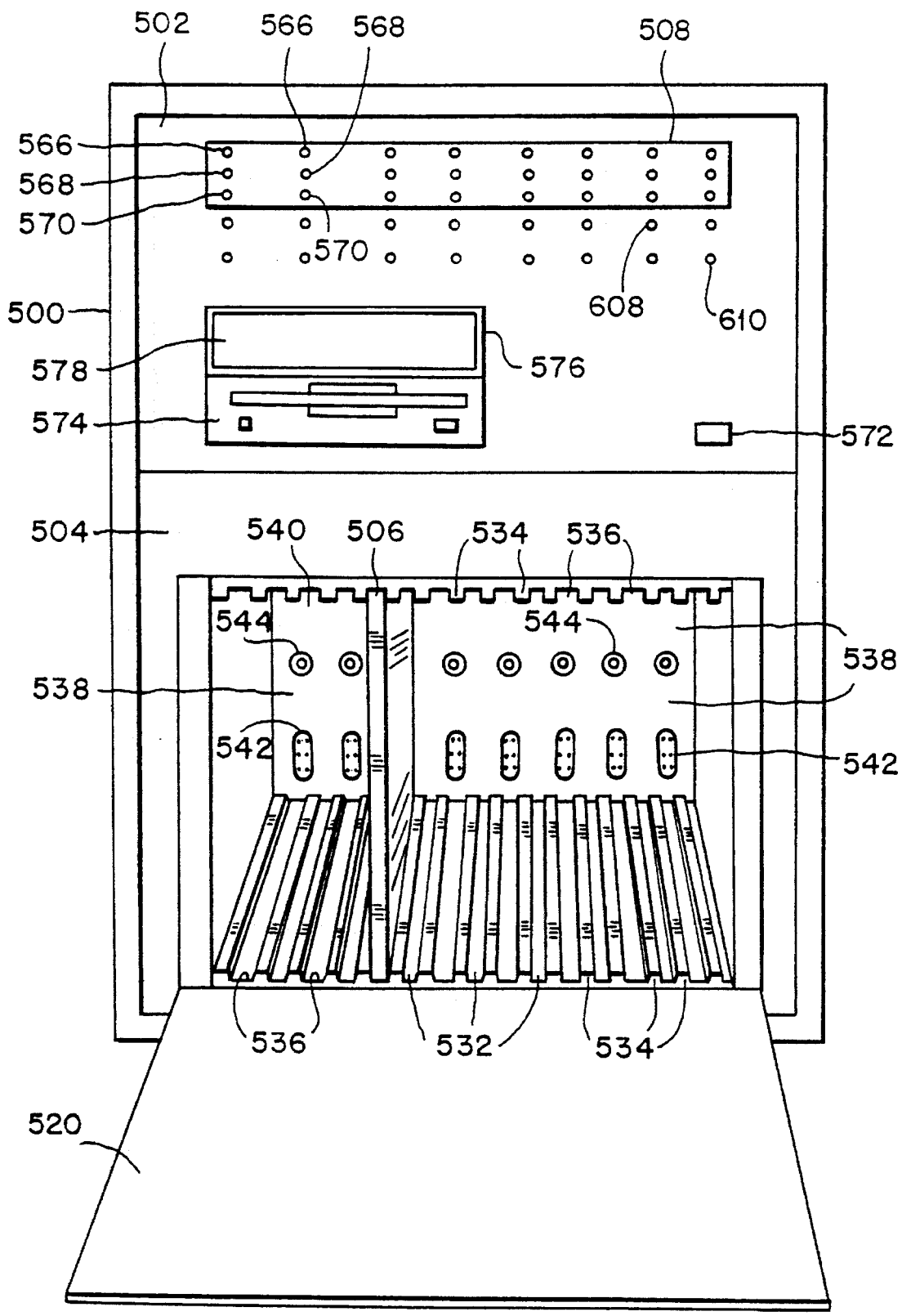
FIG. 15 is a front perspective view of another alternative form of a multiple computer receptacle device formed in accordance with the present invention.

Referring initially to FIG. 15 of the drawings, the multiple computer receptacle device includes an outer housing 500, and an upper and lower unit 502, 504 mounted in the housing. The lower unit 502 houses the pen based computers 506 and the discharge and recharge circuitry for the pen based computers. The upper unit 504 houses the communications processor, an indicator panel 508 which indicates to the operator the status of the data transfer operation and the discharging and charging of the pen based computers, and other related circuitry.

Figure 16:
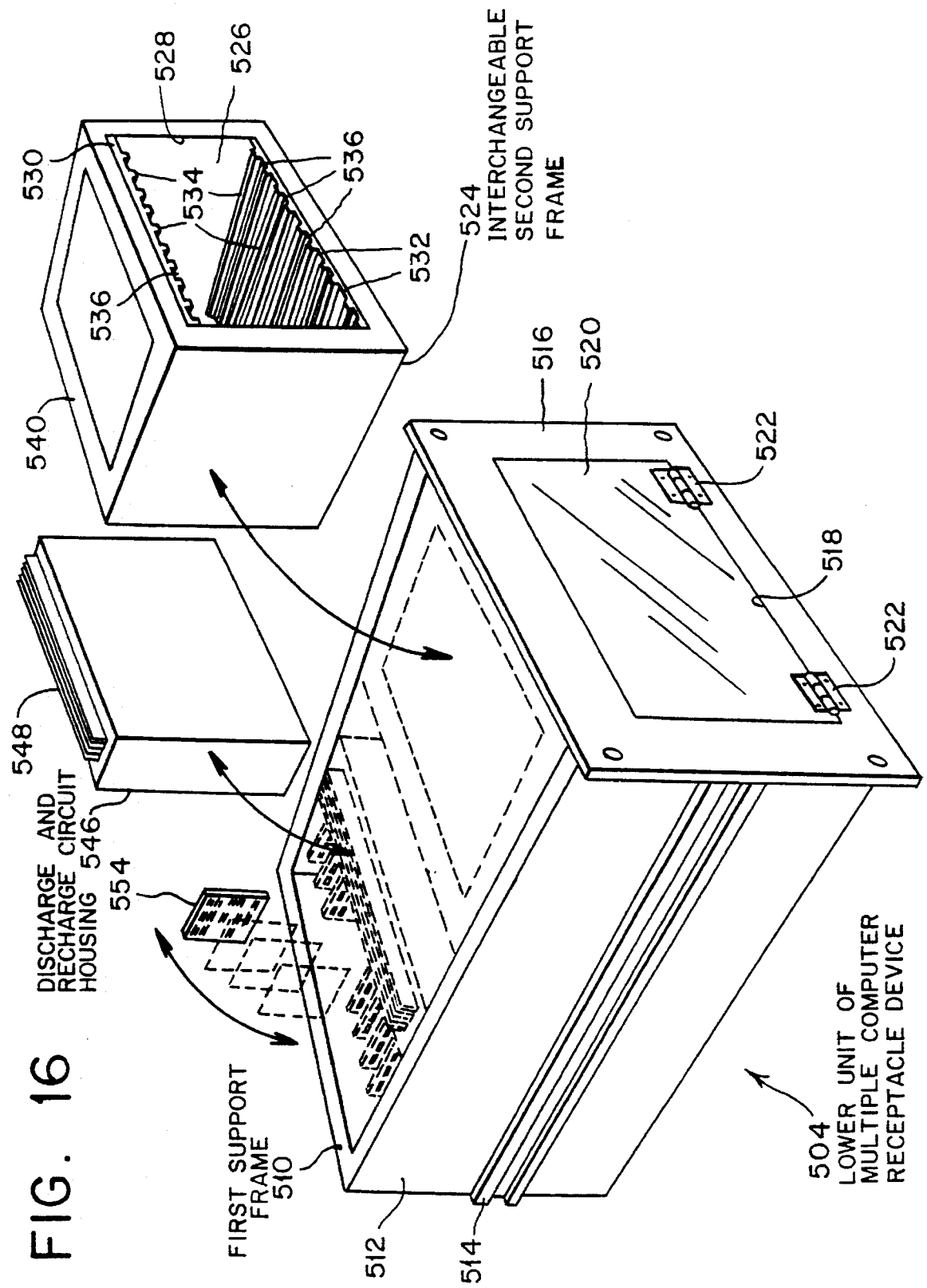
FIG. 16 is a partially exploded view, in perspective, of a first portion of the multiple computer receptacle device shown in FIG. 15.

The lower unit 504 of the multiple computer receptacle device is illustrated by FIG. 16. The lower unit includes a first support frame 510 which is slidably mounted in the housing. The first support frame 510 includes side walls 512 on which are mounted sliding racks 514 which cooperate with mating sliding racks mounted on the inside of the housing 500.

A front panel 516 is mounted on the first support frame 510. The front panel has a front panel opening 518 formed through its thickness to receive the pen based computers. A dust cover 520 may be mounted over the opening and affixed to the front panel by hinges 522.

The lower unit 504 further includes a modular and interchangeable second support frame 524. The second support frame 524 houses the pen based computers 506. The second support frame has a generally rectangular shape, and defines an interior chamber 526 into which the pen based computers are placed, and a frame opening 528 which communicates with the interior chamber.

The second support frame 524 is mounted on the first support frame 510 such that the frame opening 528 is in alignment with the front panel opening 518 so that the pen based computers may be placed through the openings and into the interior chamber of the second support frame.

As in the two previously described embodiments, the multiple computer receptacle device shown in FIG. 16 includes upper and lower plates 530, 532 having exposed surfaces 534 which are facing each other. The exposed surfaces of the upper and lower plates 530, 532 are recessed to form channels 536. The channels of the upper plate 530 are opposite to and in alignment with the channels of the lower plate 532 to define a plurality of spaced apart, parallel slots 538 to receive the pen based computers 506 and to support the pen based computers in a parallel arrangement within the interior chamber 526 of the second support frame 524.

The second support frame 524 also includes a back panel 540 which is disposed in proximity to the upper and lower computer supporting plates 530, 532 and transversely to the channels 536 formed in the plates and the slots 538 defined by the plates. The back panel 540 has mounted on it a plurality of data input/output connectors 542, as with the previous embodiments, where each data connector is mounted on the back panel and positioned in alignment with a respective slot 538 defined by the upper and lower plates so that the data connectors 542 are adapted to mate with corresponding data connectors mounted on the pen based computers 506. A plurality of power connectors 544 are also mounted on the back panel 540. Each power connector 544 is mounted on the back panel and positioned to be in alignment with a respective slot 538 defined by the upper and lower plates so that the power connectors 544 are adapted to mate with corresponding power connectors mounted on the pen based computers.

There are several manufacturers of pen based computers, and each pen based computer has a different electrical configuration, such as the placement of the power connector and the data input/output connector, and a different size and shape. Accordingly, the multiple computer receptacle device of the present invention is designed to be modular in concept so that the second support frame 524 is easily removable as an integral unit from the first support frame 510 and interchangeable with another second support frame having the same outside dimensions (so that it fits into the first support frame 510) but modified with respect to the placement of the power connectors 544 and the data input/output connectors 542 or the configuration of the upper and lower plates 530, 532 (for example, thicker plates so that there is less spacing between the plates, different shaped channels 536 formed in the plates or different spacing between the channels which define the computer receiving slots 538) so that it is designed to accept different electrically configured and sized pen based computers from various manufacturers. The modularity of the multiple computer receptacle device allows the device to be easily and quickly changed so that it may accept and communicate with pen based computers of various manufacturers without requiring an entire change to the electronics and size and shape of the multiple computer receptacle device.

The discharge and recharge circuit for the pen based computers is preferably situated at least partially in a box-like or rectangular housing 546 mounted on the first support frame 510 behind the back panel 540 of the second support frame 524. As will be explained in greater detail, the circuitry and housing 546 are also designed to be modular and interchangeable so that the multiple computer receptacle device may be easily adapted to interface with different pen based computers of various manufacturers.

As shown in FIGS. 16 and 18, the discharge and recharge circuit 546 housing includes a heat sink 548 mounted on one of the walls of the housing, which heat sink 548 is used to dissipate the heat generated by the circuit when discharging the batteries of the pen based computers, and a series of parallel, spaced apart slots 550 formed through the thickness of another side wall of the housing. The housing 546 is dimensioned to receive a primary circuit board 552 of the discharge and recharge circuit, which primary circuit board 552 is also referred to as a "mother board". The slots 550 formed in the wall of the housing are dimensioned to either receive a plurality of secondary circuit boards 554, also referred to as "daughter boards", which form part of the discharge and recharge circuit, so that the daughter boards may be removably mounted on the mother board 552, or are dimensioned to receive connectors 556 into which the daughter boards 554 are removably mounted. Each daughter board corresponds to one of the pen based computers 506 received by the multiple computer receptacle device. Each daughter board 554 contains circuitry which controls the functions of the mother board 552 in discharging and recharging the pen based computer to which it corresponds.

The modularity of the system is evident from the above description and the drawings. When a different pen based computer, having a different electrical configuration or size, is desired to be used in the multiple computer receptacle device, the discharge and recharge circuit housing 546, with the mother board 552 mounted in it and the daughter boards 554 mounted on it, is removed as a unit from the first support frame 510. The mother board 552 is designed so that its circuitry does not have to be changed to interface with different pen based computers of various manufacturers. Only the daughter boards 554 need be changed, and each daughter board is the same as any other daughter board of the group. The daughter boards are removed, and different daughter boards are inserted into the slots 550 of the discharge and recharge circuit housing and electrically coupled to the mother board 552 to change the electrical parameters for discharging and recharging the pen based computer batteries and to control the mother board in carrying out these functions. The discharge and charge circuit housing 546 need not change, nor does the mother board 552 need to be changed when different pen based computers are used in the multiple computer receptacle device of the present invention. Only the daughter boards 554, which control the functions of the discharge and recharge circuit on the mother board, need to be changed. When the daughter boards have been replaced by different daughter boards, the entire unit, including the discharge and recharge circuit housing 546, the mother board 552 in the housing and the new daughter boards 554, are remounted on the first support frame 510. The daughter boards/mother board arrangement considerably facilitates the adaptability of the multiple computer receptacle device of the present invention to different pen based computers of various manufacturers.

Figure 17:
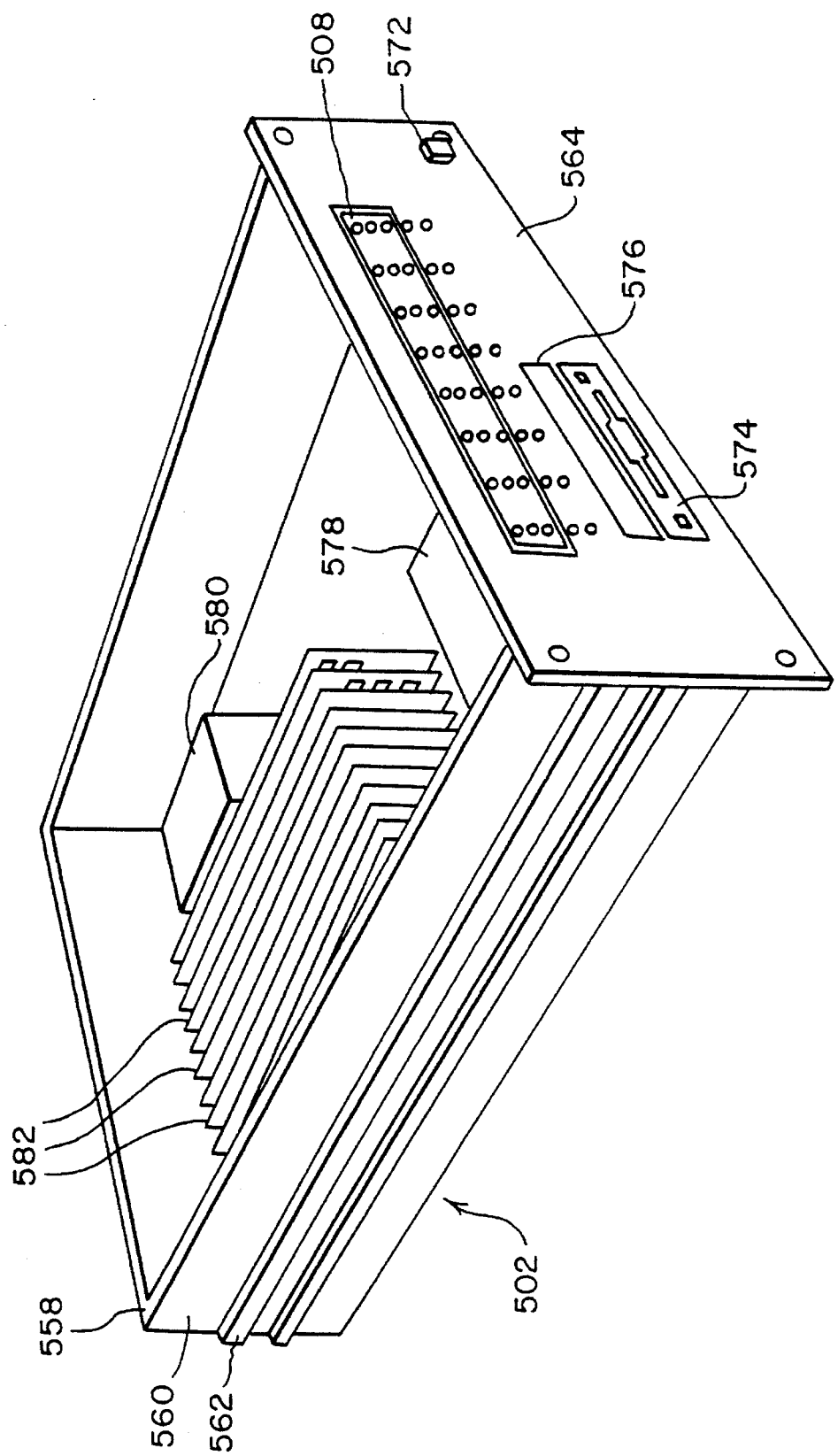
FIG. 17 is a partially exploded view, in perspective, of a second portion of the multiple computer receptacle device shown in FIG. 15.

As mentioned previously, the upper unit 502 of the multiple computer receptacle device is the communications processor. As shown in FIG. 17, the upper unit 502 includes a support frame 558 having side walls 560 on which are mounted sliding racks 562 so that the entire unit may be received by the housing 500 in the same manner as the lower unit 504 is received.

The upper unit 502 includes a front panel 564 mounted on the support frame 558. The front panel 564 includes an arrangement of multi-colored light emitting diodes (LEDs), such as a red LED 566, a yellow LED 568 and a green LED 570, the multi-colored LEDs being arranged in parallel columns on the display 508, in the same manner as described with the previous embodiments.

The front panel 564 also includes an on/off power push button switch 572, a floppy disk drive 574, exposed through a slot formed through the thickness of the front panel, and an optional second slot 576 formed through the thickness of the front panel which may receive another floppy disk drive. Preferably, the communications processor includes a hard drive 578 and a floppy disk drive 574.

The support frame of the upper unit houses the floppy disk drive 574 and hard drive 578, as mentioned previously, a power supply 580 for the multiple computer receptacle device and various circuit boards 582 which contain circuitry to allow the multiple computer receptacle device to communicate with the pen based computers and an operator or external network.

Figure 19:
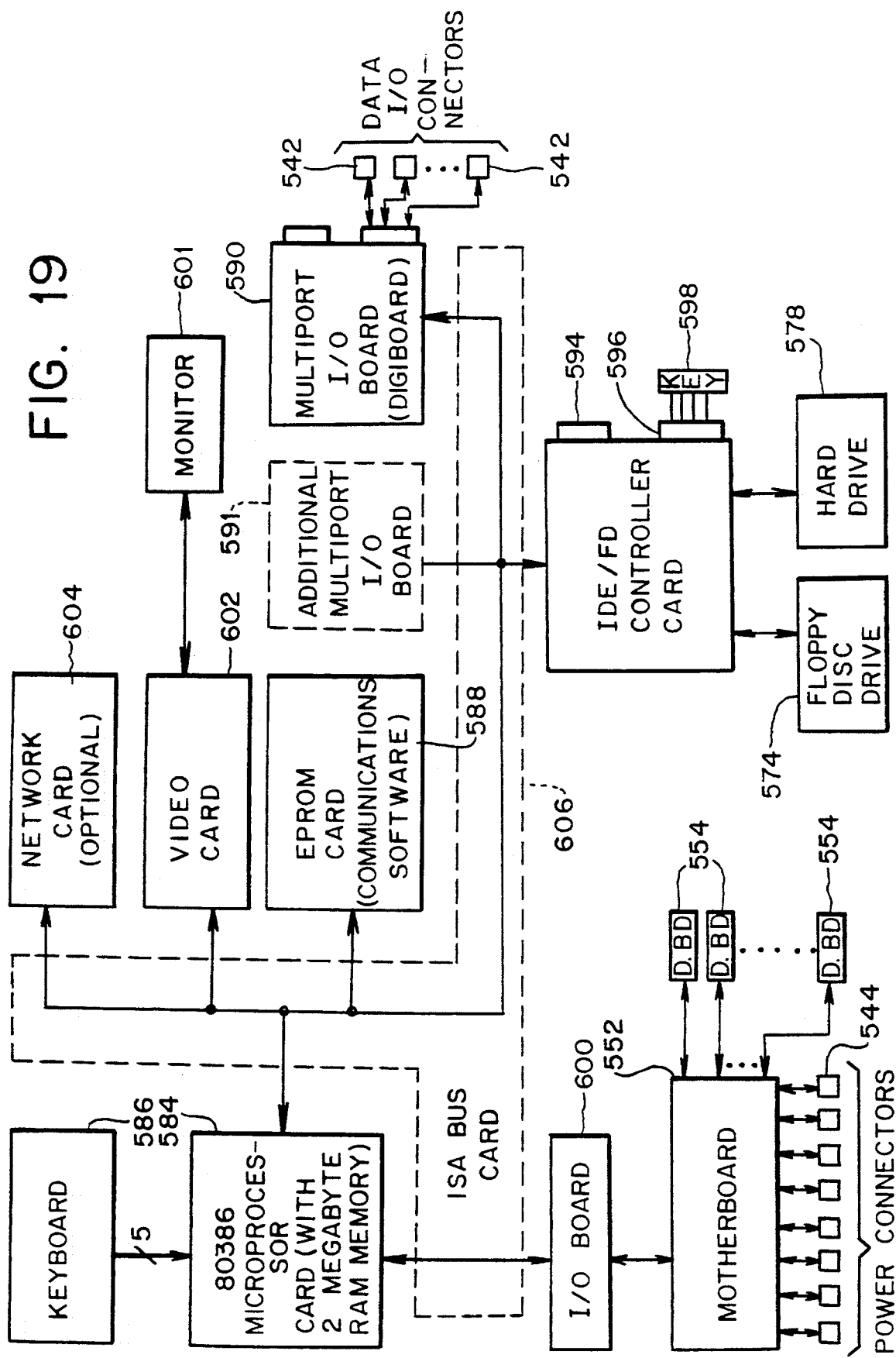
FIG. 19 is a block diagram of an electrical circuit used in the multiple computer receptacle device of the present invention and shown in FIG. 15.
Figure 20B:
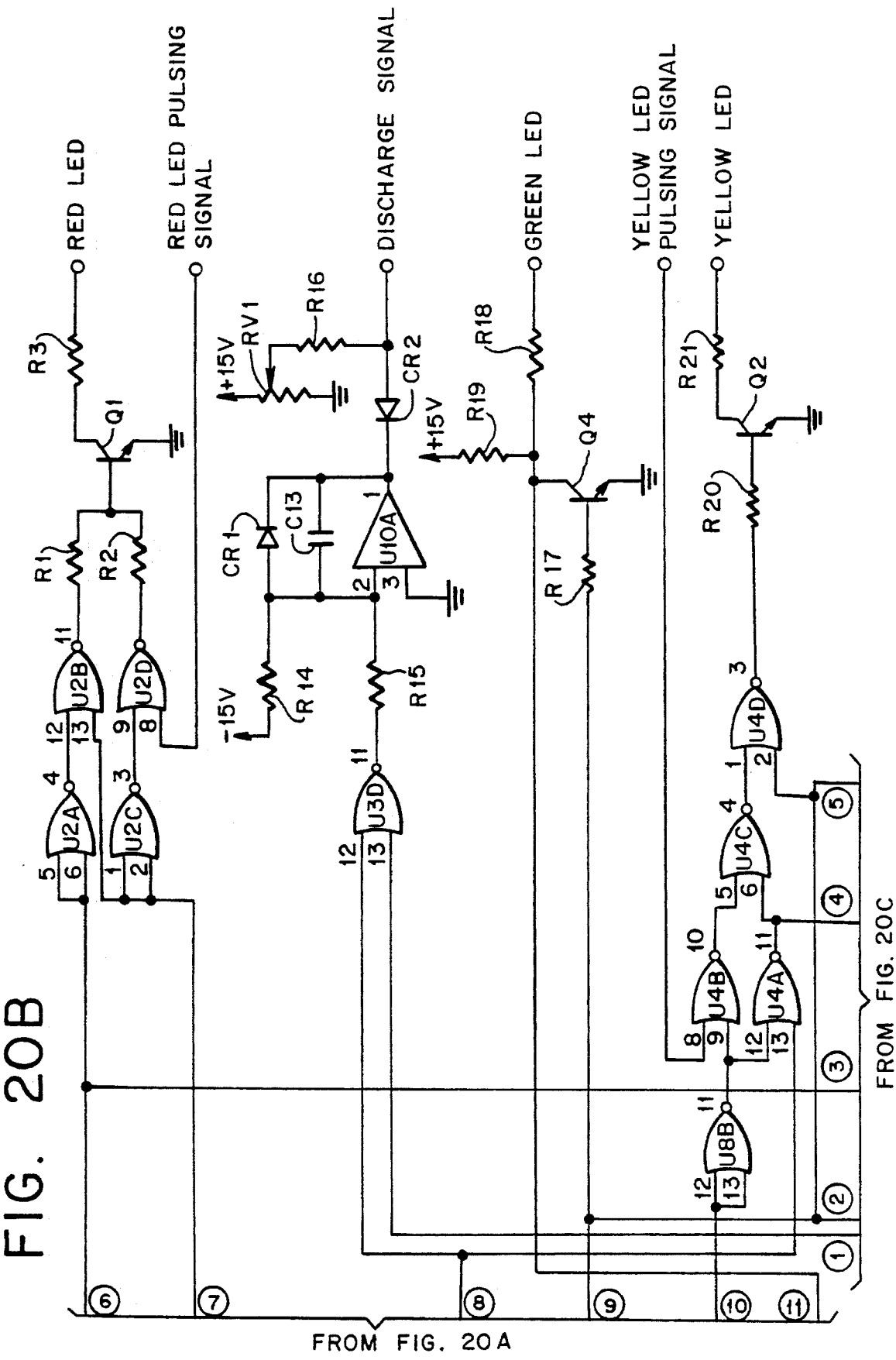
Figure 20C:
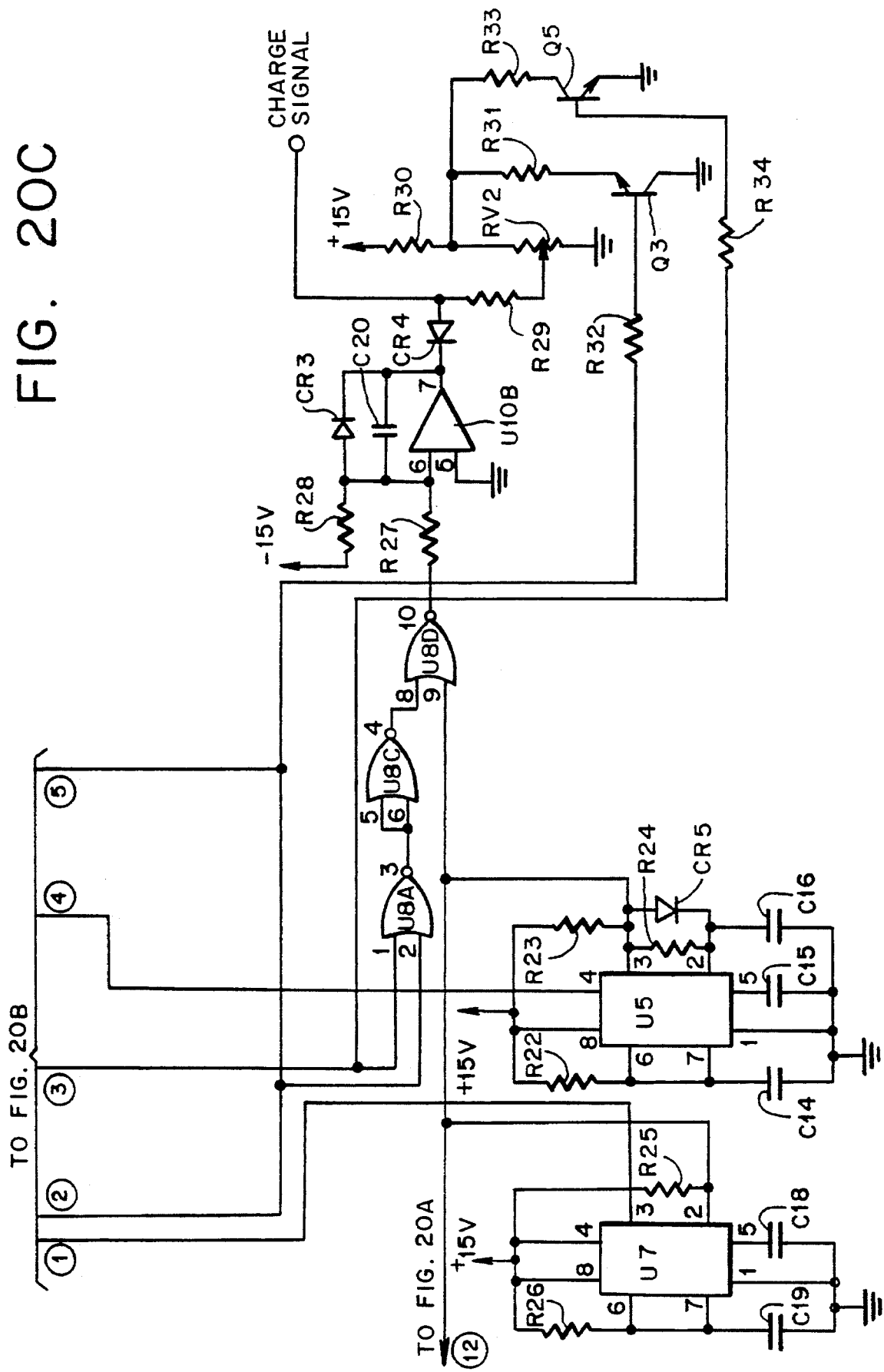
Figure 20D:
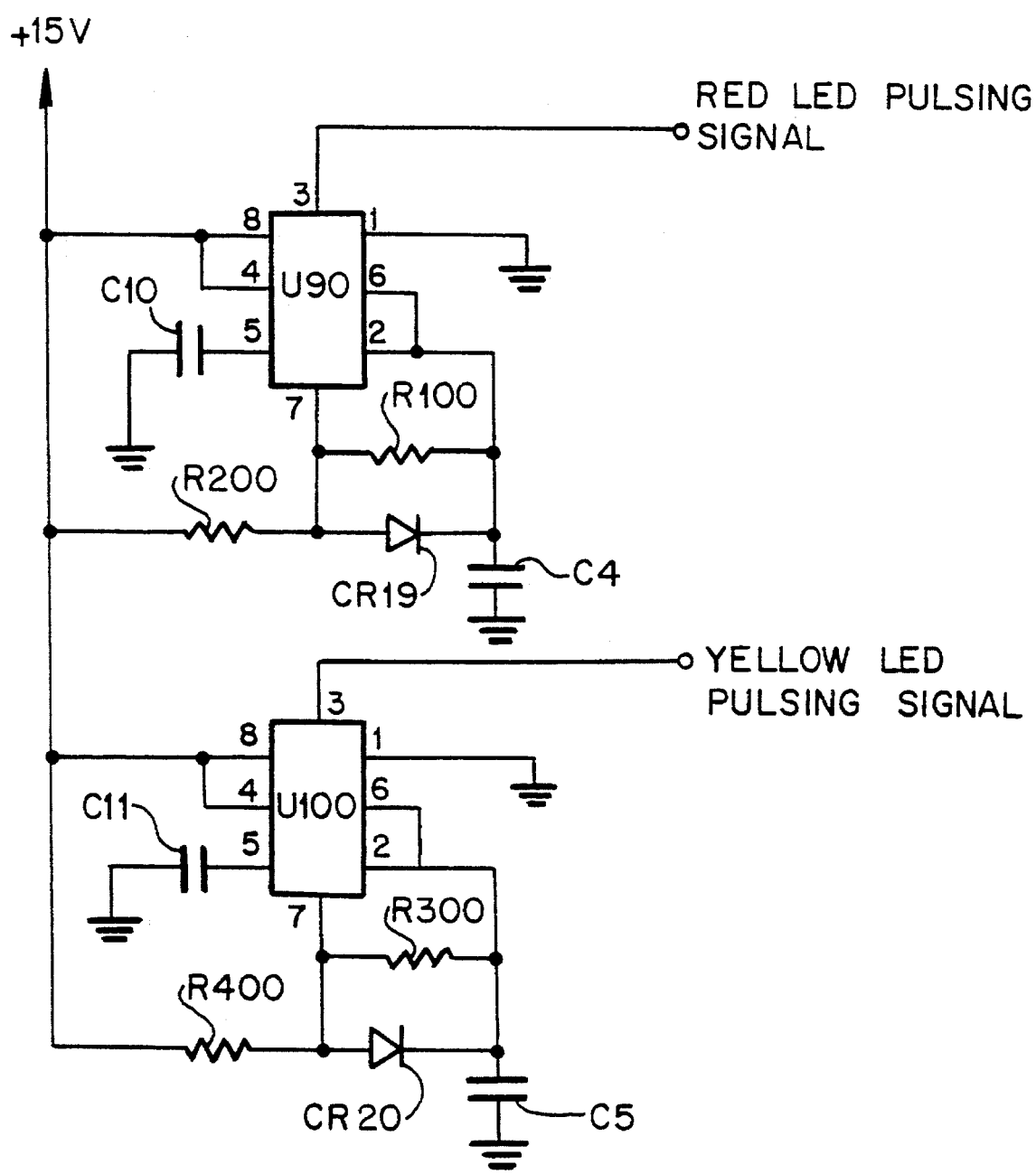
Figure 20E:
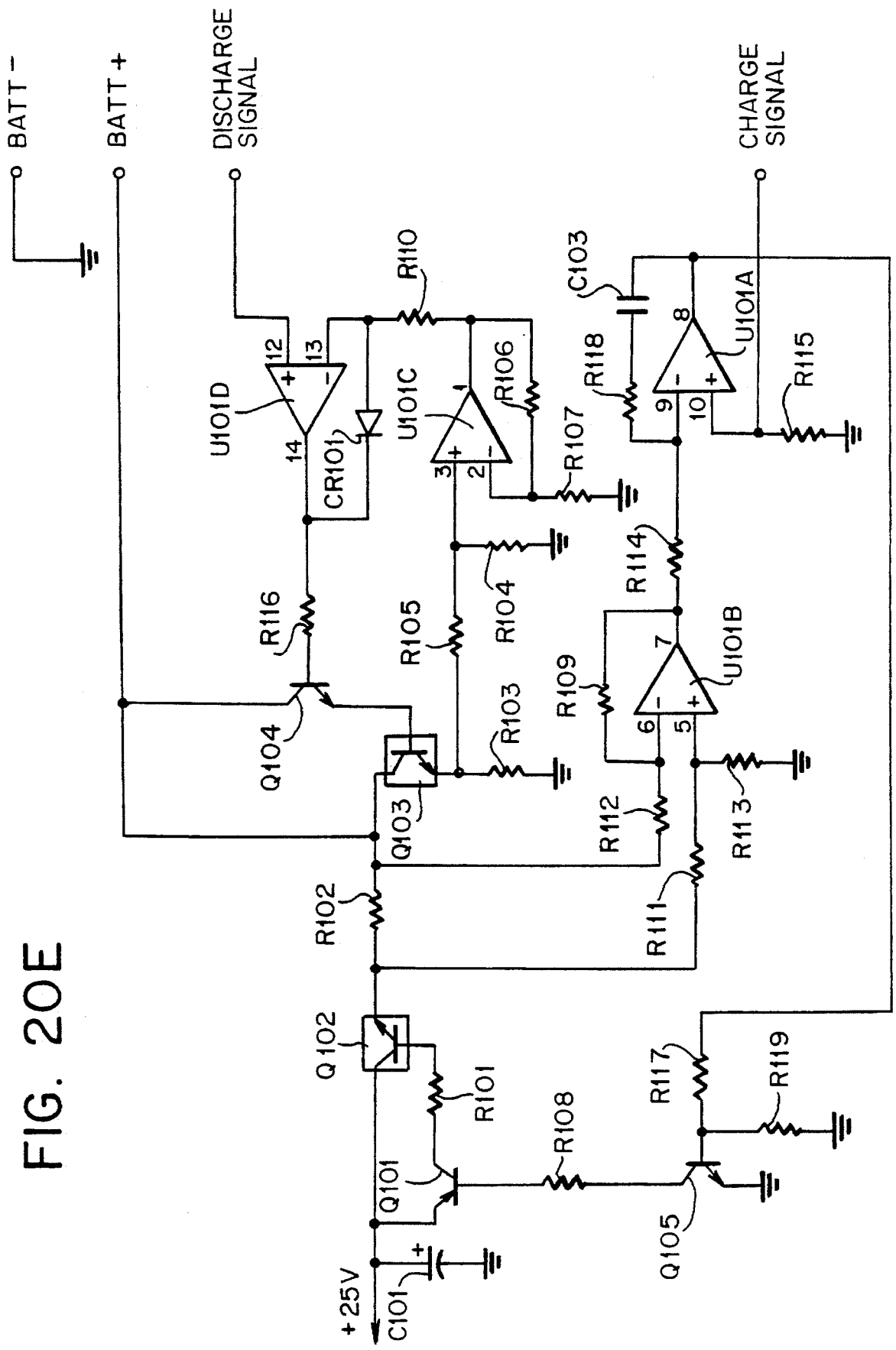

The circuitry used in the multiple computer receptacle device of FIG. 15 is shown in block diagram form in FIG. 19. The circuitry includes an 80386 microprocessor card 584 having two megabytes of random access memory (RAM). A suitable microprocessor card 584 which may be used is manufactured by American Aventech Corporation of San Jose, Calif., having the Part No. PCA6136, which is also known as a CPU card. The microprocessor card 584 is preferably connected to an external keyboard 586 by a five line bus, which keyboard 586 is used to enter data and control the functions of the multiple computer receptacle device. The microprocessor card is also connected to an erasable programmable read only memory (EPROM) card 588, which contains the program for the communications software. A suitable EPROM card 588 for use in the present invention a ROM Disk (TM) PCE/2 EPROM, flash memory and SRAM disk and drive emulator, manufactured by Curtis, Inc. of St. Paul, Minn.

The circuit also includes a multi-port input/output board 590 which is coupled to the microprocessor card 584. The multiport input/output board 590 is coupled to the data input/output connectors 542 mounted on the back panel of the multiple computer receptacle device. As its name implies, the multi-port input/output board 590 interfaces with the pen based computers and provide the data and other communication signals to and from the pen based computers and the processor of the receptacle device. A suitable multi-port input/output board for use in the present invention is a Digichannel PC/16E (TM) board manufactured by Digiboard, Inc. of St. Louis Park, Minn.

The Digiboard multi-port input/output board 590 has the capability of handling 16 pen based computers. Accordingly, more Digiboard multi-port input/output boards 591 may be coupled to the microprocessor card 584 so that the number of pen based computers handled by the multiple computer receptacle device may be expanded.

The microprocessor card 584 is also coupled to an IDE/FD controller card 592. The controller card 592 controls the floppy and hard disk drives 574, 578, and includes a serial port connector 594 and parallel port connector 596. A key 598 is usually inserted into the parallel port connector 596 of the controller card, which allows the controller card to operate only with the particular communication software set up on the EPROM card 588. A suitable IDE/FD controller card 592 for use in the present invention is A-B 229W manufactured by Seagate Technology, Inc. of Scotts Valley, Calif.

The floppy disk drive 574 accepts a floppy disk on which may be stored new data to be inputted to the pen based computers. The hard disk drive 578 stores the data retrieved from the pen based computers, which data may be down loaded to the floppy disk.

The microprocessor card 584 also is electrically coupled to another input/output board 600. This input/output board 600 performs several functions, including controlling the LEDs and instructing the mother board when to start the battery maintenance sequence. A suitable input/output board 600 which may be used in the present invention is Part No. P10-9C manufactured by Keithley Metrabyte of Taunton, Mass. The input/output board 600 is coupled to the mother board 552 of the multiple computer receptacle device. The mother board is connected to the power connectors 544 mounted on the back panel of the receptacle device, and is also coupled to the several daughter boards 554 which are used to control the functions and charging parameters of the mother board.

As mentioned previously, the multiple computer receptacle device may include a monitor 601 (shown in FIG. 1). Accordingly, a video card 602 coupled between the microprocessor card 584 and the monitor may be used to interface the circuit with the monitor. A suitable video card 602 which may be used is an Oak VGA card manufactured by Oak Technologies, Inc. of Sunnyvale, Calif.

The circuit may also include a network card 604 for interfacing the multiple computer receptacle device to the rest of the network, as shown in FIG. 10. The particular network card 604 used depends on the network which is desired to be used with the receptacle device. Such a network card may be an Ethernet adaptor or a main frame emulator.

The microprocessor card 584 interfaces with the other cards through an ISA bus card 606. A typical bus card 606 which may be used is Part No. IPC6010 manufactured by American Avantech Corporation of San Jose, Calif.

The circuit for maintaining the batteries of the pen based computers for the embodiment shown in FIG. 15 is shown in schematic form in FIGS. 20A–E. The battery maintenance circuit for discharging and recharging the batteries of the pen based computers is arranged on the daughter boards 554 and the mother board 552, where the daughter board circuits control the functions of the mother board circuit, so that the multiple computer receptacle device is highly adaptable to interface with pen based computers of various manufacturers. If different pen based computers are used, only the daughter boards 554 need to be changed; the mother board 552, which carries out the function of discharging and recharging the batteries, need not be changed and is controlled by the daughter boards. The preferred form of the daughter board circuit will now be described.

Each daughter board 554 receives a start, end and error signal, which are in the form of negative pulses, from the microprocessor card 584 through the input/output board 600. The start signal indicates that the data transfer operation is beginning. Upon receiving the start signal, as will be explained in greater detail, the discharge and recharge circuit will start a trickle charge to the batteries of the pen based computers to maintain the life of the battery during the data transfer operation. The end signal is received by the circuit on the daughter boards and signifies that the data transfer operation has been completed. Upon receipt of the end signal, the circuit will start the discharge and recharge cycle, as will be explained.

An error signal is also provided to the daughter boards 554. The error signal indicates that an error occurred during the data transfer operation. The battery maintenance circuit will cause the red LED 566 situated above the particular pen based computer where an error in data transfer was detected to flash, indicating to the operator that an error occurred. The error signal will also start the discharge and recharge cycle.

The start and end signals are respectively provided to the set and reset inputs of flip flop U1A. The Q output of flip flop U1A is provided to NOR gate U2A, which acts as an inverter, whose output is provided to one input of a two input NOR gate U2B. The output of gate U2B is provided to the base of NPN transistor Q1 through a base resistor R1. The emitter of transistor Q1 is grounded, and the collector is provided through a collector resistor R3 to the red LED 566 situated above the receiving slot for the pen based computer to which the particular daughter board corresponds. When the start signal is received, flip flop U1A will be set and will turn on transistor Q1 to conduct current through the red LED 566 on the front panel of the multiple computer receptacle device. The red LED 566 will indicate to the operator not to remove the pen based computer, as the data transfer operation is underway.

The Q output of flip flop U1A is also provided to one input of a two input NOR gate U8A. As will be described, when flip flop U1A is set by the start pulse, a high logic output signal on the Q output will be provided to NOR gate U8A which will start the trickle charge circuit to provide current to the pen based computer to maintain the battery life of the pen based computer during the data transfer operation.

The end signal is provided to the reset of flip flop U1A and will reset the flip flop when the data transfer operation is completed. As will be described in greater detail, the end signal is also provided to the input of NOR gate U3A, which acts as an inverter, to start the discharge/recharge cycle for the pen based computer battery.

The error signal is provided to the set input of another flip flop, U1B. The reset input of flip flop U1B is tied to a high logic voltage. The Q output of flip flop U1B is provided to the other input of NOR gate U2B and also to the inputs of NOR gate U2C, which acts as an inverter, whose output is provided to one input of NOR gate U2D. The output of U2D is provided through base resistor R2 to the base of transistor Q1. The other input of NOR gate U2D is provided with a red LED pulsing signal from the mother board (see FIG. 20B). When the error signal is received, flip flops U1B and U1A will cause the output of NOR gate U2B to be low and enable NOR gate U2D to allow the red LED pulsing signal to pass through gate U2D and pulse transistor Q1 on and off. This will cause the red LED 566 above the respective pen based computer receiving slot to flash on and off when an error is detected. Flip flop U1B is reset when the multiple computer receptacle device is repowered after being turned off.

The error signal is also provided to the inputs of NOR gate U3B, which acts as an inverter. The outputs of NOR gates U3A and U3B are provided to the inputs of NOR gate U3C, whose output is provided to the set input of another flip flop U1C. The purpose of flip flop U1C, which will be described in greater detail, is to provide a discharge signal to the mother board circuit to discharge the battery of the respective pen based computer.

Each daughter board circuit includes a low battery voltage threshold circuit and a high battery voltage threshold circuit. The low battery voltage threshold circuit includes comparator U9A. The positive side of the battery of the respective pen based computer (the negative side of the battery is grounded) is connected to the non-inverting input of comparator U9A through a resistor divider network comprising resistor R4 and resistor R5, with one end of resistor R5 connected to ground. The inverting input of comparator U9A is connected to another resistor divider network comprising resistors R6 and R7, with one end of resistor R6 connected to a positive voltage, and one end of resistor R7 connected to ground. Resistors R6 and R7 set up a low voltage threshold for comparator U9A. The output of comparator U9A is provided to the reset input of flip flop U1C and is also connected to a pull-up resistor R8 connected to a positive voltage.

The threshold which is set by resistors R6 and R7 is preferably about 10 volts. If the battery voltage is greater or equal to the 10 volt threshold, the output of comparator U9A will remain at a high logic level and flip flop U1C will not be reset.

Flip flop U1C is set when the end signal pulse is received. The Q output of flip flop U1C is provided to one input of NOR gate U3D whose output is provided to a discharging current slope or ramp generating circuit comprising operational amplifier U10A configured as an integrator with feedback capacitor C13 connected between the output and the inverting input of the operational amplifier, diode CR1 in parallel with capacitor C13, with its anode connected to the inverting input and its cathode connected to the output of the operational amplifier, input resistor R15 connected between the output of NOR gate U3D and the inverting input of operational amplifier U10, and resistor R14 tied between a negative voltage and the inverting input. Diode CR2, having its cathode coupled to the output of amplifier U10 and its anode connected to resistor R16, whose other end is connected to the wiper of potentiometer RV1 whose other legs are connected between a positive voltage and ground, generates a discharge signal and provides the same to the mother board, as will be explained in greater detail. The discharge signal will cause the mother board to discharge the pen based computer battery at a current rate which increases linearly up to a predetermined value set by potentiometer RV1.

When either an end pulse or an error pulse is received, flip flop U1C is set, and its Q output goes to a high logic state, which causes the output of NOR gate U3D to go to a low logic state. This transition is integrated by the discharging current slope circuit comprising operational amplifier U10A, and is inverted, such that the discharge signal is a positive signal which is linearly increasing in voltage up to a predetermined voltage set by potentiometer RV1.

A similar circuit to that described for the low battery voltage threshold circuit is used in the high battery voltage threshold circuit. More specifically, the same resistor divider network consisting of resistors R4 and R5 is used to provide an attenuated battery voltage to the inverting input of another comparator, U9B. The non-inverting input of comparator U9B is connected to a resistor divider network comprising resistors R11 and R12, with resistor R12 connected to ground and resistor R11 connected to a positive voltage, so that a predetermined threshold voltage is provided to comparator U9B. The output of comparator U9B is provided to pull-up resistor R13, which is connected to a positive voltage source, and to the inputs of NOR gate U12A, which acts as an inverter, whose output is connected to one input of another two input NOR gate U12B. The output of U12B is provided to the set input of flip flop U1D.

The threshold which is set by resistors R11 and R12 corresponds to a battery voltage of approximately 16 volts. When the battery is being recharged and the battery voltage increases to equal or exceed 16 volts approximately, the output of comparator U9B will go to a low logic state and set flip flop U1D. The Q output of flip flop U1D is provided to transistor Q4 through base resistor R17. The emitter of transistor Q4 is grounded and the collector is connected to collector resistor R19 which is also connected to a positive voltage source, and to resistor R18. The transistor Q4 is turned on when flip flop U1D is set, and allows current to pass through resistor R18. The other end of resistor R18 is connected to the green LED 570 which is positioned above the receiving slot of the pen based computer to which the particular daughter board corresponds. Accordingly, when the battery is fully recharged, the green LED above the respective pen based computer illuminates, indicating to the operator that pen based computer may be removed for use.

Disposed on the front panel of the first unit, i.e., the communications processor, are a plurality of recessed push button switches. More specifically, a data bypass switch 608 and a discharge bypass switch 610 are situated above and in alignment with each receiving slot for a pen based computer. The data bypass switch 608 is used when it is desirable to omit the data transfer operation and just discharge and recharge the batteries of the pen based computer. The discharge bypass switch 610 is used when the batteries are in a substantially charged state and no discharge of the batteries is necessary. The data bypass switch 608 is coupled to the circuit on the daughter board and in particular to the inputs of NOR gate U3A. In effect, it acts as an end signal, and places the circuit into a discharge and charging mode, as if data transfer had already taken place.

The discharge bypass switch 610 is connected to the output of comparator U9A through a low pass filter comprising resistor R10 and capacitor C21 to ground. When the discharge bypass switch is activated, it effectively provides a low logic state to the reset of flip flop U1C to terminate the discharging of the pen based computer to which the daughter board corresponds.

The discharge and recharge circuit on the daughter boards also includes a reset circuit for resetting the flip flops on the board. The positive side of the battery is provided to one side of capacitor C22, whose other side is provided to resistor R35 and the cathode of zener diode CR7. The other side of resistor R35 is grounded. The anode of diode CR7 is provided to the inverting input of a comparator U9C and to one end of resistor R40 whose other end is connected to ground. A threshold voltage is provided to the non-inverting input of comparator U9C by a resistor divider network comprising resistors R36 and R37, where one end of resistor R37 is connected to ground and one end of resistor R36 is connected to a positive voltage supply. The connection between resistors R36 and R37 is provided to the non-inverting input of comparator U9C.

When a pen based computer is in the respective receiving slot of the multiple computer receptacle device, capacitor C22 charges up to the voltage of the computer battery. When capacitor C22 is fully charged, no current flows through zener diode CR7 and the inverting input of comparator U9C is essentially 0 volts and below the threshold set on the non-inverting input. The output of comparator U9C will be at a high logic level. When the pen based computer is removed from the receiving slot, a relatively high peak-to-peak ripple occurs on the power connector (which ripple was suppressed due to the capacitance of the battery when the pen based computer was mounted in the receiving slot). The ripple voltage passes through capacitor C22, and zener diode CR7 is reverse biased and pulls the inverting input of comparator U9C to a level which is above the threshold voltage level on the non-inverting input of comparator U9C. This causes the output of comparator U9C to go to a low logic level. The comparator output is connected to the reset input of flip flop U11A and to a pull up resistor R38 connected to a positive voltage source. The negative going signal generated on the output of comparator U9C is provided to the reset input of flip flop U11A to reset the flip flop.

The error signal or the end signal passes through NOR gate U3C to not only set flip flop U1C but also to set flip flop U11A. This causes the Q output of flip flop U11A to go to a high logic state. The output of flip flop U11A is provided to the inputs of NOR gate U8B, which acts as an inverter, whose output is provided to one input of each of NOR gates U4A and U4B.

The outputs of NOR gates U4A and U4B are provided to the inputs of NOR gate U4C, whose output is provided to an input of NOR gate U4D. The output of NOR gate U4D is provided to the base of transistor Q2 through a base resistor R20. Transistor Q2 has its emitter grounded and its collector connected to the yellow LED 568 situated above the respective receiving slot corresponding to the particular daughter board, through a collector resistor R21. Accordingly, when flip flop U11A is set by the end or error signal, the yellow LED 568 above the pen based computer to which the particular daughter board corresponds will illuminate, indicating to the operator that the battery maintenance sequence is now under way and, although data transfer has been completed, the pen based computer is still not ready to be removed as the batteries must be discharged and recharged.

When the pen based computer is removed from the multiple computer receptacle device, comparator U9C will reset flip flop U11A which, in turn, will shut off the yellow LED 568 above the pen based computer which is removed. The Q output of flip flop U11A is provided to the reset of flip flop U1D, and thus flip flop U1D is also reset, which causes the green LED 570 above the pen based computer to also shut off when the pen based computer is removed from the receptacle device. The output of flip flop U1C is provided to the other input of NOR gate U4A, and a yellow LED pulsing signal is provided to the other input of NOR gate U4B.

When the discharging current slope circuit is activated to discharge the battery of the pen based computer, the yellow LED 568 above the pen based computer is illuminated. The yellow LED will flash during discharge and will remain steady during recharge due to the gating of NOR gates U4A–D. The yellow LED 568 will be turned off when the green LED 570 illuminates, indicating that recharging has been completed, as the output of flip flop U1D is provided to an input on NOR gate U4D.

There is a particular wave shape of battery discharge and recharge current which is preferably used when charging the batteries of the pen based computers. As stated previously, most pen based computers employ nickel-cadmium (NI-CAD) batteries. It is advantageous to provide charging pulses to the NI-CAD batteries, where each charging pulse is followed by a shorter duration discharge pulse. The particular wave shape of the current signal provided to the batteries of the pen based computers is illustrated by FIG. 21 of the drawings. Each daughter board includes circuitry for generating this particular wave shape.

More specifically, each daughter board includes a charging and discharging current pulse generating circuit. The charging and discharging current pulse generating circuit includes an astable multivibrator U5, which preferably is a 555 timer, and its associated external circuitry including resistors R22, R23, R24, capacitors C14, C15, C16 and diode CR5. The output signal on Pin 3 of the 555 timer circuit U5 is preferably in the form of about a five second positive pulse with an approximately 7.5 second period. The output signal is provided to one input of a two input NOR gate U8D, whose output is provided to a charging current slope or ramp generator circuit. As with the discharging current slope circuit, the charging current slope circuit includes an operational amplifier U10B having a capacitor C20 and diode CR3, in parallel with each other, in the feedback loop of the operational amplifier. Resistor R28 is included in the charging current slope circuit and is connected between a negative voltage source and the anode of diode CR3, which is connected to the inverting input of amplifier U10B. The output of NOR gate U8D is connected to the inverting input of amplifier U10B through an input resistor R27. The non-inverting input of amplifier U10B is grounded. Operational amplifier U10B and its associated external components act as an integrator to provide a positive pulse having a sloped leading edge to the charging circuit on the mother board, as will be described in greater detail.

The charging current slope circuit is also connected to a charging current adjustment and trickle charge circuit. The charging current adjustment and trickle charge circuit includes transistor Q5, having its emitter grounded and a collector resistor R33; transistor Q3, having its emitter grounded and having a collector resistor R31; and base resistors R32 and R34 respectively coupled to the bases of transistors Q3 and Q5. Resistor R32 is coupled to the Q output of flip flop U1D, and resistor R34 is coupled to the Q output of flip flop U1A.

The other end of collector resistors R31 and R33 are tied together and to one end of a potentiometer RV2, whose other end is grounded, and to resistor R30 whose other end is connected to a positive voltage source. The wiper of potentiometer RV2 is provided through resistor R29 to the anode of diode CR4, whose cathode is tied to the output of operational amplifier U10B.

A positive pulse from circuit U5 will result in a negative pulse on the output of NOR gate U8D. Amplifier U10B will integrate and invert the pulse and provide a sloped leading edge, the slope being determined by the time constant derived from the values of resistor R28 and capacitor C20. The voltage increases linearly to a predetermined voltage level adjusted by potentiometer RV2, at which level it is clamped. Preferably, the leading edge of the pulse generated by circuit U10 and provided as the charging signal on the anode of diode CR4 rises from about 0 V to about 2 V (at which level it is clamped) in about 1 second.

Figure 21A:
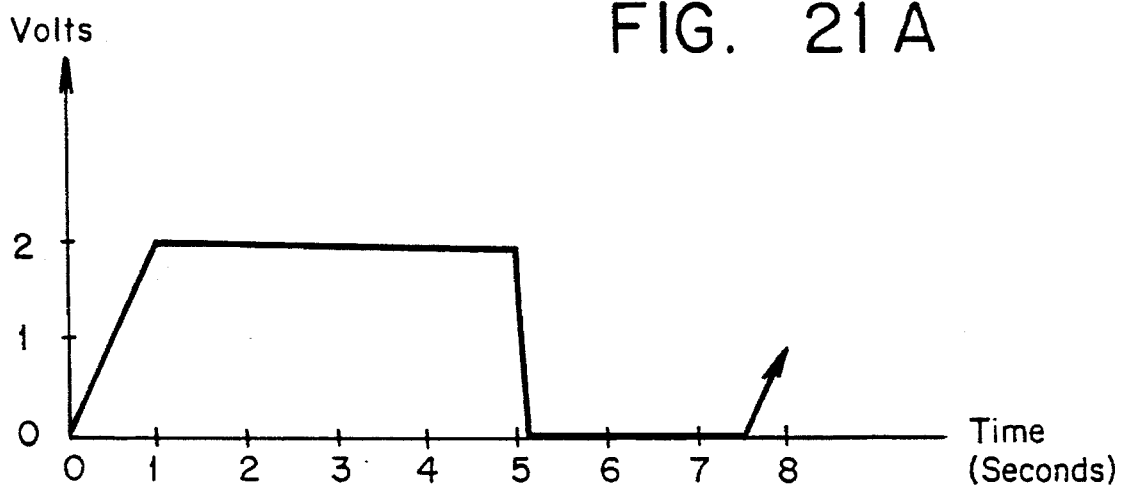
FIGS. 21A–C are diagrams of waveforms of various signals generated by the circuit shown in FIGS. 20A–D.

When the positive pulse from timer circuit U5 terminates, the trailing edge of the resulting pulse on the output of gate U8D is also integrated and inverted by amplifier U10B. The waveform of the charging signal decreases linearly from the 2 V clamped level to 0 V at rate which is determined by the time constant corresponding to the values of input resistor R27 and capacitor C20, which is preferably a drop of 2 V in 0.1 second. The waveform of the charging signal is shown in FIG. 21A.

The output of circuit U5 is also provided to the input (Pin 2) of a monostable multivibrator U7, which is preferably also a 555 timer. Timer circuit U7, with its associated external circuitry, including resistors R25 and R26 and capacitors C18 and C19, generates a positive output pulse which has a duration of approximately 0.5 seconds. The positive output pulse generated on the output (Pin 3) of the timer circuit U7 is provided to the other input of NOR gate U3D, which effectively turns on the discharging current slope circuit comprising operational amplifier U10A and its associated external components.

Figure 21B:
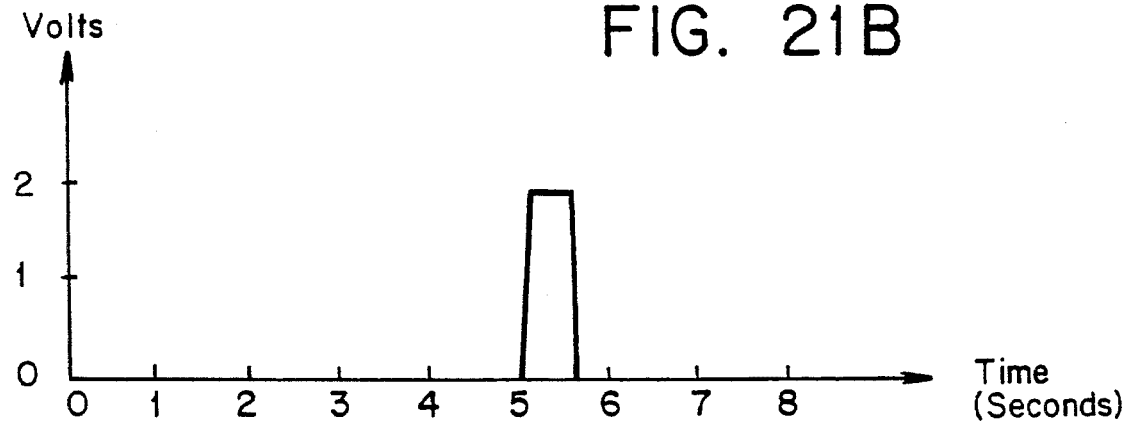

The positive output pulse from timer U7 is inverted by NOR gate U3D, and again inverted and integrated by amplifier U10A. The resulting discharge signal provided to the mother board is shown in FIG. 21B. The pulsed discharge signal is clamped at preferably a 2 V level, which is determined by adjusting potentiometer RV1. The leading edge of the pulses is sloped in accordance with the time constant determined by the values of resistor R14 and capacitor C13, which pulse edge preferably increases from about 0 V to about 2 V in 0.1 seconds. The trailing edge of the pulses of the discharge signal, which occurs approximately when the pulse from timer U7 terminates, is also sloped and decreases from 2 V to about 0 V in preferably 0.01 seconds, which is the time constant determined by the values of input resistor R15 and capacitor C13.

Figure 21C:
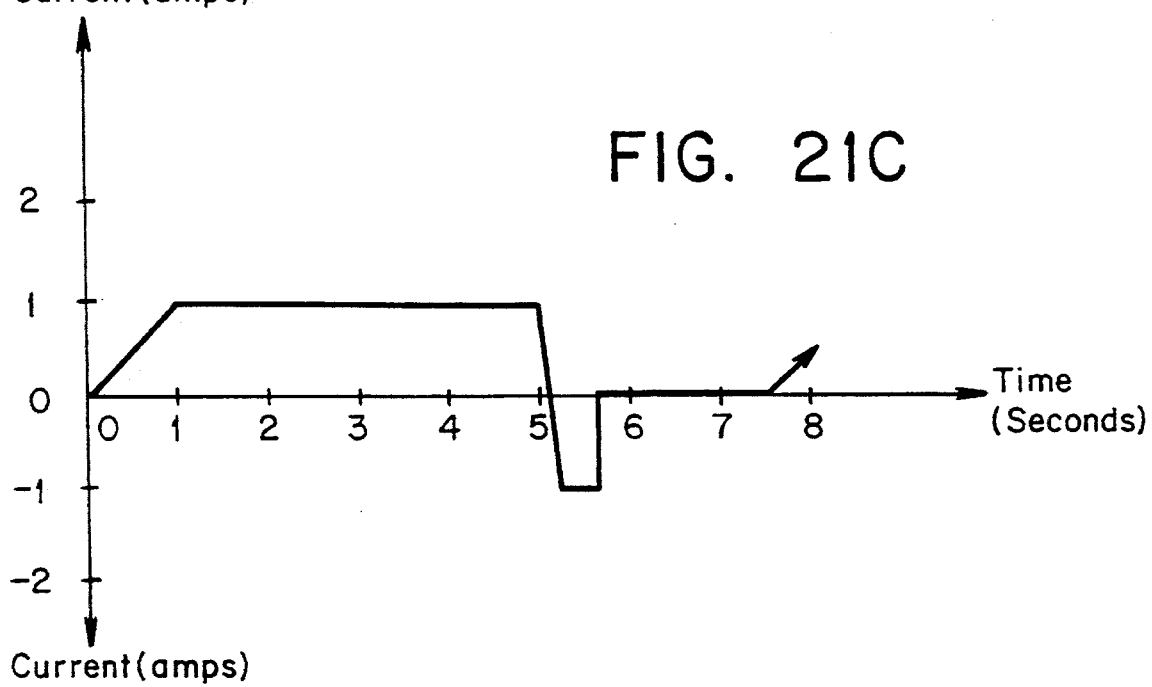

The composite waveform of the charging and discharging current provided to the batteries of the pen based computers as a result of the specific waveforms of the charge signal and discharge signal is shown in FIG. 21C. The charge current linearly ramps up from about 0 amps to about a 1 amp level in approximately 1 second, maintains the level for about 4 seconds, falls in about 0.2 seconds to a −1 amp level, maintains that level for about 0.5 seconds, returns to 0 amps and maintains 0 amps current for about 1.6 seconds before repeating the sequence.

The particular waveform of the charging and discharging current, with its sloped edges, substantially minimizes the formation of hydrogen gas bubbles in the NI-CAD batteries during charging. The sloped edges to the current pulses soften the stress on the battery and prolongs the life of the battery. The internal resistance of the battery remains low when the current having a waveform shown in FIG. 21C is applied and, accordingly, the batteries may be charged at a high current rate. The rest period provided after the discharge pulse allows any bubbles which may have formed to settle out. Also, because of the slopes provided on the transition edges of the wave form, the emission of transients in the circuit due to the high currents employed in discharging and recharging the batteries, which transients may have affected the operation of the circuit, is minimized.

Transistor Q5 determines the amount of trickle current used for charging the batteries during the data transfer operation. The trickle charge current during the data transfer operation is preferably 20% of the maximum current used for charging, or more specifically, 0.2 amps.

Transistor Q3 also determines the trickle charge current, but after the batteries have been recharged but the pen based computers have not yet been removed from the multiple computer receptacle device. Transistor Q3 and its associated components preferably adjust the trickle charge after the batteries have been completely recharged to approximately 10% of the maximum current used for charging, or more specifically, 0.1 amps.

The output of NOR gate U8A is inverted by NOR gate U8C, whose output is provided to the other input of NOR gate U8D. The other input of NOR gate U8A is connected to the Q output of flip flop U1D.

The output of NOR gate U4A provides an enable signal to the astable multivibrator U5 on its enable input (Pin 4). This enable signal allows circuit U5 to generate its free running pulsed output signal. The negative edge of the positive pulses produced by circuit U5 triggers monostable multivibrator U7 to produce the positive pulse having a predetermined duration which is provided to the discharge circuit during the charging operation.

Circuits U5 and U7 may be implemented by using a 555 timer manufactured by National Semiconductor or other companies, and the configuration of the external components is well known in the art and found in the specifications and the application notes for the 555 timer, the disclosure of which is incorporated herein by reference.

The circuit found on the daughter boards may also include a timer circuit, which limits the charging of the batteries of the pen based computers. The timer circuit includes counter U6, which is triggered by the pulsed output signal from astable multivibrator U5, which signal is provided to the clock input (Pin 3) of counter U6.

Counter U6 is preferably configured to be a two hour timer, and produces a pulse on its output (Pin 8), which is inverted by NOR gate U12C, and provided to the other input of NOR gate U12B. After two hours, counter U6 will produce a pulse which will cause flip flop U1D to set, turning on the green LED associated with the pen based computer to which the daughter board corresponds and putting the circuit into a low trickle charge mode using transistor Q3.

When the green LED 570 is illuminated, transistor Q4 causes the timer to reset by providing a low logic level to the reset pin (Pin 9) of counter U6. The operation of the circuit of the daughter board, previously described in detail, will now be summarized.

When the daughter board receives a start pulse, flip flop U1A will be set, and the Q output, through NOR gates U2A and U2B, will turn on the transistor Q1 which will illuminate at a steady rate the red LED 566. If an error signal is received during data transfer, the error signal will set flip flop U1B, and the Q output of flip flop U1B will effectively disable NOR gate U2B and enable NOR gate U2D to which is provided a pulsing signal for flashing the red LED. The pulsing signal will pass through NOR gate U2D and pulse transistor Q1 on and off. This will cause the red LED 566 to flash.

Flip flop U1A will also turn on transistor Q5 and cause a trickle current to be provided to the battery of the pen based computer during the data transfer operation.

When the end pulse is received by the daughter board, which signifies the end of the data transfer operation, it will reset flip flop U1A, which shuts off the red LED 566, unless an error has occurred. If an error has occurred during data transfer, flip flop U1B remains latched and continues to allow the pulsing signal to pass through NOR gate U2D to pulse transistor Q1 on and off, which will flash the red LED.

The end pulse and the error pulse pass through NOR gates U3A, U3B and U3C to set flip flops U1C and U11A. When flip flop U1C is set, it will provide a high logic level to the input of NOR gate U3D, which will turn on the discharging circuit comprising operational amplifier U10A. Amplifier U10A, in conjunction with potentiometer RV1, will produce a discharge signal which controls the discharge current (i.e., the rate of discharge of the pen based computer battery), which discharge signal is effectively a reference voltage controlled by potentiometer RV1 (or pulses during charging). Operational amplifier U10A will also integrate the leading edge of any pulses provided to its input, which is particularly useful in avoiding transients during charging and to prolong the life of the battery.

Flip flops U1C and U11A, when set, also turn on transistor Q2 to conduct current through the yellow LED 568 associated with the pen based computer corresponding to the respective daughter board. Flip flop U11A effectively allows the pulsing signal for flashing the yellow LED to pass through NOR gate U4B, and flip flop U1C allows the pulsing signal to pass through NOR gate U4C. The Q output of flip flop U1D, which is at a low level, allows the pulsing signal to pass through NOR gate U4D to pulse transistor Q2 on and off. The yellow LED 568 thus flashes on and off during the discharge phase.

When the battery of the pen based computer has discharged to a level which is below the threshold set by resistors R6 and R7, comparator U9A will change state to a low level, causing flip flop U1C to reset. The Q output of flip flop U1C will go to a low logic level. The output of monostable multivibrator U7 was at a low logic level, as no pulses are being generated during the discharge phase, so that the output of NOR gate U3D is at a high level, effectively disabling the discharge circuit comprising operational amplifier U10A until pulses from circuit U7 are generated. Flip flop U1C, which has been reset, and flip flop U11A, which is still set, effectively prevent the yellow LED pulsing signal from passing through NOR gate U4C and turn on transistor Q2 so that the yellow LED 568 is illuminated continuously.

When flip flop U1C is also reset, the charging circuit and multivibrators U5 and U7 are also enabled. More specifically, the combination of the low logic level on the Q output of flip flop U1C and the high logic level on the Q output of flip flop U11A (which has not yet been reset) provides a high logic level on the output of NOR gate U4A, enabling astable multivibrator U5. Circuit U5 triggers monostable multivibrator U7. The output of astable multivibrator U5 is provided to NOR gate U5D which pulses the charging circuit on the daughter board comprising operational amplifier U10B and its associated components.

Amplifier U10B generates a positive pulse having a sloped rising edge for the charge signal. The amplitude of the pulse of the charge signal is controlled by potentiometer RV2. The trailing edge of the pulse on the output of circuit U5 triggers circuit U7, which generates a narrower positive going pulse and which provides this pulse to NOR gate U3D. The positive pulse on NOR gate U3D will turn on the discharge circuit on the daughter board comprising operational amplifier U10A and its associated components. Amplifier U10A will generate a discharge signal comprising a positive pulse having a sloped leading edge. Accordingly, during the recharge cycle, the battery of the pen based computer will be continually pulsed with a charging current followed by a discharge of lesser duration.

When the pen based computer battery has been fully charged, the battery voltage will rise above the threshold set by resistors R11 and R12. The output of comparator U9B will go to a low logic state, which signal will pass through NOR gates U12A and U12B and set flip flop U1D. Flip flop U1D will turn on transistor Q4, causing current to conduct through the green LED 570 associated with the respective pen based computer to which the daughter board corresponds, illuminating the green LED. Flip flop U1D will also turn on transistor Q3 which will cause a particular voltage level to be generated as the charge signal so that a low trickle charge will be provided to the battery of the pen based computer until such time as the pen based computer is removed from the multiple computer receptacle device.

The high logic level on the Q output of flip flop U1D will also disable NOR gate U4D, causing the output of gate U4D to go to a low logic level, turning off transistor Q2 and the yellow LED. Flip flop U1D will also effectively disable amplifier U10B through the NOR gates U8A, U8C and U8D. The pulsed output signal from circuit U5 is effectively blocked from passing through NOR gate U5D. It should be noted that the pulsed output signal from circuit U7 is still provided to the discharge circuit comprising amplifier U10A during trickle charge. This has little or no affect on the charged batteries, as the 0.5 second discharge pulse occurs only once in 7.5 seconds of trickle charge. If it is desired to block the output signal of circuit U7 from being provided to amplifier U10A, appropriate gating may be employed after NOR gate U3D, for example, as would be well known to one skilled in the art.

When a pen based computer is removed from the multiple computer receptacle device, the output signal from comparator U9C will go to a low logic level, resetting flip flop U11A. Flip flop U11A, in turn, will reset flip flop U1D. The green LED 570 will also then go off.

The previously described circuitry is incorporated onto each daughter board 554, and one daughter board may be provided for each pen based computer. The circuitry which will now be described is incorporated onto the mother board 552, which need not be changed when pen based computers having a different electrical configuration are used in the multiple computer receptacle device.

The mother board circuit includes a red LED pulsing signal circuit and a yellow LED pulsing signal circuit. The red LED pulsing signal circuit includes a 555 timer U90 configured as a free running, astable multivibrator. The external components associated with timer U90 includes resistors R100 and R200, diode CR19 and capacitors C10 and C4.

The yellow LED pulsing signal circuit includes a 555 timer U100, which is configured in the same manner as timer U90 to be an astable multivibrator. Circuit U100 has external components, including resistors R300 and R400, diode CR20 and capacitors C11 and C5. Each of timer circuits U90 and U100 generates a pulsed signal having an approximately 50% duty cycle. The particular configuration of the 555 timers U90 and U100 is well known in the art and described in many application notes and specifications for the 555 timer, such as those manufactured by National Semiconductor. The red LED pulsing signal and the yellow LED pulsing signal are provided to each of the daughter boards, and cause the red LED 566 and yellow LED 568 associated with each pen based computer to flash under the control of the corresponding daughter board.

The mother board includes the following circuit which is repeated on the mother board for each pen based computer which the multiple computer receptacle device accommodates.

The mother board circuit includes a controlled current charging circuit, controlled by feedback, for charging the battery of the pen based computer. The charging circuit includes an amplifier circuit, preferably having a gain of 10, comprising operational amplifier U101A and capacitor C103 and resistor R118 connected together in series in the feedback loop of the operational amplifier. Resistor R115 is connected from the non-inverting input of amplifier U101A to ground. The charging signal from the corresponding daughter board is provided to the non-inverting input of amplifier U101A for each of the circuits repeated on the mother board.

The output of amplifier U101A is provided to the base of transistor Q105 through a resistor divider network consisting of base resistor R117 and grounded leg resistor R119. The emitter of transistor Q105 is grounded and the collector is coupled to the base of transistor Q101 through a base resistor R108. The emitter of transistor Q101 is connected to a positive voltage source which is used for charging the battery, and the collector is connected to the base of charging transistor Q102 through a base resistor R101 in a Darlington configuration. Capacitor C101 connected to ground and to the charging voltage source is used for filtering. Transistors Q101 and Q102 provide a constant or pulsed charge current to the battery of the pen based computer, which current is controlled by transistor Q105 in conjunction with operational amplifier U101A. The charge current is provided through a sensing resistor R102 to the positive side of the battery (the negative side is grounded). The voltage impressed across sensing resistor R102 due to the charge current flowing through it is measured by a difference amplifier comprising operational amplifier U101B having feedback resistor R109, a first input resistor R112 connected to the inverting input of amplifier U101B, a second input resistor R111 connected to the non-inverting input, and resistor R113 connected between the non-inverting input and ground. The difference amplifier preferably provides a gain of 10 and amplifies the voltage across sensing resistor R102. The output of the difference amplifier U101B is provided through input resistor R114 to the inverting input of amplifier U101A.

Effectively, the charging signal from the daughter board affects the output of amplifier of U101A and, by controlling the bias on transistor Q105, controls the amount of charging current generated by Darlington coupled transistors Q101 and Q102. The current is monitored by using sensing resistor R102 and difference amplifier U101B, through feedback, so that a particular charging current is maintained. Preferably, a 1 amp charging current is used to charge the batteries of the pen based computer during the recharge cycle, a 0.2 amp current is used during data transfer, and 0.1 amp current is used after the batteries have been fully recharged and before the batteries are removed from the multiple computer receptacle device.

The circuit on the mother board also includes a controlled current discharge circuit, which current is controlled by feedback. The controlled current discharge circuit includes an operational amplifier U101D which receives the discharge signal from the corresponding daughter board on its inverting input. Amplifier U101D includes diode CR101 in its feedback loop between its output and its inverting input, and is used to bias transistor Q104 through base resistor R116. Transistor Q104 has its collector connected to the positive side of the battery and its emitter connected to the base of discharge transistor Q103 in a Darlington configuration. Transistor Q103 has its collector connected to the positive side of the battery and its emitter connected to a discharge current sensing resistor R103, which is connected to ground. The voltage impressed across resistor R103 by the discharging current flowing through it to ground is provided to the non-inverting input of another difference amplifier comprising operational amplifier U101C. An input resistor R105 is connected between the emitter of transistor Q105 and the non-inverting input of amplifier U101C, and resistor R104 is connected to ground and to the non-inverting input. Operational amplifier U101C further includes a feedback resistor R106, and resistor R107 connected from the inverting input to ground, and its output is provided through resistor R110 to the inverting input of amplifier U101D. Amplifier U101C is thus configured to be a difference amplifier preferably with a gain of approximately 10.

Amplifier U101D, in conjunction with the discharge signal from the daughter board, effectively sets a reference voltage level or pulse for controlling the discharge current to be drawn from the battery. Amplifier U101D biases transistor Q104 which, in turn, biases the discharge transistor Q103 and the amount of current flowing through the discharge transistor. The current being discharged from the battery is sensed by resistor R103 and difference amplifier U101C, and is fed back to amplifier U101D so that a constant or pulsed current, controlled by the discharge signal provided to amplifier U101D from the daughter board, is being drawn from the battery to discharge it.

A parts list for the circuit shown in FIG. 20 is provided below. Also, the pin numbers shown in FIG. 20 for the operational amplifiers, flip flops, NOR gates and comparators relate to the parts specified in the list, although, of course, it is envisioned that components comparable to those listed below, connected differently from that shown in FIG. 20, may be suitable for use.

| PARTS LIST FOR CIRCUIT SHOWN IN FIG. 20 | |
|---|---|
| Part Description | Reference Designation |
| Resistor 4.7KΩ | R1 |
| Resistor 4.7KΩ | R2 |
| Resistor 1.5KΩ | R3 |
| Resistor 10KΩ | R4 |
| Resistor 10KΩ | R5 |
| Resistor 10KΩ | R6 |
| Resistor 5.1KΩ | R7 |
| Resistor 1MΩ | R8 |
| Resistor 10KΩ | R9 |
| Resistor 1KΩ | R10 |
| Resistor 10KΩ | R11 |
| Resistor 10KΩ | R12 |
| Resistor 4.7KΩ | R13 |
| Resistor 1MΩ | R14 |
| Resistor 100KΩ | R15 |
| Resistor 100KΩ | R16 |
| Resistor 4.7KΩ | R17 |
| Resistor 1.5KΩ | R18 |
| Resistor 10KΩ | R19 |
| Resistor 4.7KΩ | R20 |
| Resistor 1.5KΩ | R21 |
| Resistor 1.5MΩ | R22 |
| Resistor 1KΩ | R23 |
| Resistor 3.3MΩ | R24 |
| Resistor 10KΩ | R25 |
| Resistor 1MΩ | R26 |
| Resistor 100KΩ | R27 |
| Resistor 1MΩ | R28 |
| Resistor 100KΩ | R29 |
| Resistor 5.1KΩ | R30 |
| Resistor 510Ω | R31 |
| Resistor 10KΩ | R32 |
| Resistor 1KΩ | R33 |
| Resistor 10KΩ | R34 |
| Resistor 10KΩ | R36 |
| Resistor 2.7KΩ | R37 |
| Resistor 10KΩ | R38 |
| Resistor 10KΩ | R40 |
| Resistor 750KΩ | R100 |
| Resistor 680KΩ | R200 |
| Resistor 750KΩ | R300 |
| Resistor 680KΩ | R400 |
| Resistor 470Ω | R101 |
| Resistor 0.2Ω | R102 |
| Resistor 0.2Ω | R103 |
| Resistor 10KΩ | R104 |
| Resistor 1KΩ | R105 |
| Resistor 10KΩ | R106 |
| Resistor 1KΩ | R107 |
| Resistor 10KΩ | R108 |
| Resistor 10KΩ | R109 |
| Resistor 10KΩ | R110 |
| Resistor 1KΩ | R111 |
| Resistor 1KΩ | R112 |
| Resistor 10KΩ | R113 |
| Resistor 10KΩ | R114 |
| Resistor 10MΩ | R115 |
| Resistor 10KΩ | R116 |
| Resistor 10KΩ | R117 |
| Resistor 100KΩ | R118 |

-continued

| PARTS LIST FOR CIRCUIT SHOWN IN FIG. 20 | |
|---|---|
| Part Description | Reference Designation |
| Resistor 1KΩ | R119 |
| Potentiometer 10KΩ | RV1 |
| Potentiometer 10KΩ | RV2 |
| Capacitor 0.22 μf | C4 |
| Capacitor 0.22 μf | C5 |
| Capacitor 0.01 μf | C10 |
| Capacitor 0.01 μf | C11 |
| Capacitor 0.2 μf | C13 |
| Capacitor 10 μf | C14 |
| Capacitor 0.01 μf | C15 |
| Capacitor 1 μf | C16 |
| Capacitor 0.01 μf | C18 |
| Capacitor 1 μf | C19 |
| Capacitor 1 μf | C20 |
| Capacitor 1 μf | C21 |
| Capacitor 1 μf | C22 |
| Capacitor 100 μf | C101 |
| Capacitor 100 pf | C103 |
| Diode 1N4148 | CR1 |
| Diode 1N4148 | CR2 |
| Diode 1N4148 | CR3 |
| Diode 1N4148 | CR5 |
| Diode 1N4742 | CR7 |
| Diode 1N4148 | CR19 |
| Diode 1N4148 | CR20 |
| Diode 1N4148 | CR101 |
| Transistor 2N2222A | Q1 |
| Transistor 2N2222A | Q2 |
| Transistor 2N2222A | Q3 |
| Transistor 2N2222A | Q4 |
| Transistor 2N2222A | Q5 |
| Operational Amplifier TL084 | U101 |
| Flip Flop MC14044BCN | U1 |
| NOR Gate CD4001B | U2 |
| NOR Gate CD4001B | U3 |
| NOR Gate CD4001B | U4 |
| Counter MC14541 | U6 |
| NOR Gate CD4001B | U8 |
| Comparator LM339 | U9 |
| Operational Amplifier TL082P | U10 |
| Flip Flop MC14044BCN | U11 |
| NOR Gate CD4001B | U12 |
| Timer LM555 | U90 |
| Timer LM555 | U100 |

The advantage of having separate daughter board circuits and the mother board circuit, as described above, is that the arrangement contributes to the modularity and adaptability of the multiple computer receptacle device to accommodate pen based computers of various manufacturers and having different electrical configurations. All that need to be changed when a different pen based computer is used is the selection of different daughter boards 554. The mother board circuitry need not change. The charging parameters are all controlled and set by the daughter board, and may be easily changed for different pen based computers. The daughter boards 554 may be removed from the connectors 556 mounted on the wall of the discharge and recharge circuit housing 546 and decoupled from the mother board 552, and different daughter boards, which are electrically configured to be compatible to the different pen based computer desired to be used in the multiple computer receptacle device, may be inserted into the connectors without requiring a change of the mother board or the circuitry on the mother board.

The multiple computer receptacle device conveniently allows a plurality of pen based computers to "dump" or transmit data inputted to the pen based computers to a host computer or main data gathering and dispatching circuit concurrently and automatically. The system of the present invention provides a multiple connection between the host computer and the plurality of pen based computers. The operator need not connect one pen based computer to the host computer at a time to dump data from the pen based computer, disconnect the pen based computer and reconnect another pen based computer, in a time consuming process.

Also, the present invention automatically tends to housekeeping functions, such as discharging and recharging the battery packs of the pen based computers. This is automatically done after the data has been transferred from the pen based computers to the host computer.

The present invention also has the capability of transferring data from the host computer concurrently to a plurality of pen based computers loaded into the multiple computer receptacle device, rather than the time consuming process of transferring data from the host computer to each pen based computer individually.

The operator need not be present for the data transfer operation—the present invention will transfer the data automatically. Also, the operator need not be a trained technician. The users of the pen based computers merely have to slide the pen based computers into the multiple computer receptacle device and, when all of the pen based computers are loaded, press the start switch (i.e., the first signal generator 102) on the multiple computer receptacle device. The present invention will take over the operation after that point.

The multiple computer receptacle device may also include a timer 180 connected to the first signal generating circuit such that the data transfer operation and battery pack recharge operation may be automatically performed at a predetermined time, such as after regular business hours.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. Apparatus for transferring data from a plurality of pen based computers, each pen based computer including a battery, a display and an unlighted pen for handwritten input of information on the display, which comprises:

a housing;

a first support frame mounted in the housing;

a front panel, the front panel being mounted on the first support frame, the front panel having a front panel opening formed through the thickness thereof to receive the plurality of pen based computers;

a modular and interchangeable second support frame, the second support frame having a generally rectangular shape and defining an interior chamber and a frame opening communicating with the interior chamber, the second support frame being mounted on the first support frame such that the frame opening is in alignment with the front panel opening to allow the pen based computers to pass therethrough and into the interior chamber, the second support frame including means for supporting in parallel a plurality of pen based computers, the plural computer supporting means defining a plurality of parallel slots for receiving respective pen based computers, the second support frame further including a first back panel, the first back panel being situated in proximity to the plural computer supporting means;

a plurality of data input/output connectors, each data connector being mounted on the first back panel and positioned thereon in alignment with a respective slot defined by the plural computer supporting means so that the data connectors are adapted to mate with corresponding data connectors mounted on the pen based computers;

a plurality of power connectors, each power connector being mounted on the first back panel and positioned thereon in alignment with a respective slot defined by the plural computer supporting means so that the power connectors are adapted to mate with corresponding power connectors mounted on the pen based computers;

the data input/output connectors, power connectors and plural computer supporting means being specifically situated on the second support frame to conform to the connector placement, size and shape of the pen based computers;

the second support frame being removable from the first support frame for replacement by another second support frame so that the apparatus is adapted to accommodate pen based computers of different dimensions and electrical configurations; and a discharge and recharge circuit, the discharge and recharge circuit being electrically coupled to the power connectors mounted on the first back panel, the discharge and recharge circuit including a primary circuit board and a plurality of interchangeable and replaceable secondary circuit boards, the primary circuit board generating electrical signals which control the discharge and recharge of the pen based computers, the secondary circuit boards being electrically coupled to the primary circuit board and generating electrical signals which control the electrical signals generated by the primary circuit board and therefore effect the discharging and recharging of the pen based computers, the secondary circuit boards being replaceable by corresponding other secondary circuit boards so as to allow the apparatus to be electrically compatible with pen based computers having different electrical configurations.

2. Apparatus as defined by claim 1, which further comprises:

a discharge and recharge circuit housing, the circuit housing defining an interior space for receiving the primary circuit board, and including a side wall, the side wall having a plurality of slots formed through the thickness thereof, the slots being dimensioned to receive the secondary circuit boards therethrough so that the secondary circuit boards may electrically interface with a primary circuit board disposed in the interior space of the circuit housing.

3. Apparatus as defined by claim 1, which further comprises:

a discharge and recharge circuit housing, the circuit housing defining an interior space for receiving the primary circuit board, and including a side wall, the side wall having a plurality of slots formed through the thickness thereof, and a plurality of secondary circuit board connectors, the secondary circuit board connectors being mounted in the slots and being adapted to receive the secondary circuit boards so that the secondary circuit boards may electrically interface with a primary circuit board disposed in the interior space of the circuit housing.

4. Apparatus as defined by claim 1, which further comprises:

a discharge and recharge circuit, the discharge and recharge circuit being electrically coupled to the power connectors, the discharge and recharge circuit including:

a feedback controlled charge current circuit, the feedback controlled charge current circuit being coupled to one of the back panel power connectors, the feedback controlled charge current circuit providing a charge current for delivery to the battery of a pen based computer;

a feedback controlled discharge current circuit, the feedback controlled discharge current circuit being coupled to one of the back panel power connectors, the feedback controlled discharge current circuit controlling the amount of discharge current to be drawn from the battery of a pen based computer; and charge current ramp generating means, the charge current ramp generating means being coupled to the feedback controlled charge current circuit, and generating a charge signal and providing the charge signal to the feedback controlled charge current circuit, the charge signal controlling the feedback controlled charged current circuit to generate a pulsed charge current comprising pulses of current, each current pulse having at least a sloped leading edge.

5. Apparatus as defined by claim 4, wherein the discharge and recharge circuit further includes:

a low battery voltage comparator circuit, the low battery voltage comparator circuit being responsive to the battery voltage of a battery of a pen based computer and to a predetermined low battery voltage threshold signal and providing an output signal in response to the comparison thereof, the feedback controlled discharge current circuit being responsive to the output signal thereof and terminating a discharge of the battery of a pen based computer when the battery voltage is at most equal to the predetermined low battery voltage threshold signal; and a high battery voltage comparator circuit, the high battery voltage comparator circuit being responsive to the battery voltage and to a predetermined high battery voltage threshold signal and providing an output signal in response to the comparison thereof, the feedback controlled charge current circuit being responsive to the output signal of the high battery voltage comparator circuit and terminating a charge of the battery of a pen based computer when the battery voltage is at least equal to the predetermined high battery voltage threshold signal.

6. Apparatus as defined by claim 4, wherein the charge current ramp generating means includes an integrator circuit, the integrator circuit generating the charge signal, the charge signal being in the form of a series of pulses, each pulse having a predetermined pulse width, the integrator circuit forming each pulse of the charge signal with at least a sloped leading edge.

7. Apparatus as defined by claim 4, wherein the feedback controlled charge current circuit includes a charge current sensing resistor and a difference amplifier circuit coupled to the charge current sensing resistor, at least a portion of the charge current generated by the feedback controlled charge current circuit flowing through the charge current sensing resistor and causing a voltage drop across the sensing resistor, the difference amplifier being responsive to the voltage drop across the sensing resistor and providing an output signal in response thereto for controlling the charge current generated by the feedback controlled charge current circuit.

8. Apparatus as defined by claim 4, wherein the discharge and recharge circuit further includes:

discharge current ramp generating means, the discharge current ramp generating means being coupled to the feedback controlled discharge current circuit, and generating a discharge signal and providing the discharge signal to the feedback controlled discharge current circuit, the discharge signal controlling the feedback controlled discharge current circuit to generate a pulsed discharge current to be drawn from the battery of a pen based computer, the pulsed discharge current comprising pulses of current, each current pulse having at least a sloped leading edge.

9. Apparatus as defined by claim 8, wherein the discharge current ramp generating means includes an integrator circuit, the integrator circuit generating the discharge signal, the discharge signal being in the form of a series of pulses, each pulse having a predetermined pulse width, the integrator circuit forming each pulse of the discharge signal with at least a sloped leading edge.

10. Apparatus as defined by claim 8, wherein the feedback controlled discharge current circuit includes a discharge current sensing resistor and a difference amplifier circuit coupled to the discharge current sensing resistor, at least a portion of the discharge current controlled by the feedback controlled charge current circuit flowing through the discharge current sensing resistor and causing a voltage drop across the sensing resistor, the difference amplifier being responsive to the voltage drop across the sensing resistor and providing an output signal in response thereto for controlling the discharge current to be controllably drawn by the feedback controlled discharge current circuit from the battery of a pen based computer.

\* \* \* \* \*